(12) United States Patent
Ikonin et al.

(10) Patent No.: US 12,160,578 B2
(45) Date of Patent: Dec. 3, 2024

(54) METHOD AND APPARATUS FOR SIGNALING OF MAPPING FUNCTION OF CHROMA QUANTIZATION PARAMETER

(71) Applicant: HUAWEI TECHNOLOGIES CO., LTD., Guangdong (CN)

(72) Inventors: Sergey Yurievich Ikonin, Moscow (RU); Roman Igorevich Chernyak, Moscow (RU); Timofey Mikhailovich Solovyev, Moscow (RU); Alexander Alexandrovich Karabutov, Moscow (RU); Jianle Chen, San Diego, CA (US); Elena Alexandrovna Alshina, Munich (DE)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 118 days.

(21) Appl. No.: 17/509,324

(22) Filed: Oct. 25, 2021

(65) Prior Publication Data
US 2022/0070462 A1    Mar. 3, 2022

Related U.S. Application Data

(63) Continuation of application No. PCT/CN2020/086924, filed on Apr. 26, 2020.
(Continued)

(51) Int. Cl.
*H04N 19/17* (2014.01)
*H04N 19/124* (2014.01)
(Continued)

(52) U.S. Cl.
CPC ......... *H04N 19/126* (2014.11); *H04N 19/124* (2014.11); *H04N 19/132* (2014.11);
(Continued)

(58) Field of Classification Search
CPC .. H04N 19/126; H04N 19/124; H04N 19/132; H04N 19/172; H04N 19/174;
(Continued)

(56) References Cited

U.S. PATENT DOCUMENTS 5,686,962 A * 11/1997 Chung ................. H04N 19/117
375/E7.218
6,654,418 B2 * 11/2003 Haskell ............... H04N 19/126
375/240.03
(Continued)

FOREIGN PATENT DOCUMENTS

CN    104584560 A    4/2015
CN    105284112 A    1/2016
(Continued)

OTHER PUBLICATIONS

ITU-T, H.265—High efficiency video coding (Year: 2016).*
(Continued)

*Primary Examiner* — Philip P. Dang
(74) *Attorney, Agent, or Firm* — WOMBLE BOND DICKINSON (US) LLP

(57) ABSTRACT

A method of obtaining a chrominance quantization parameter (QP) for chrominance components based on a luminance QP for luminance component, wherein the method is performed by a decoder, comprising parsing a received bitstream to obtain the luminance QP and information of a mapping function (f) which associates a QP index (QPi) to the chrominance QP (QPc); obtaining the QPi based at least in a part on the luminance QP; obtaining the mapping function based on the obtained information; and obtaining a QPc based on the obtained mapping function and the obtained QPi.

29 Claims, 15 Drawing Sheets

Related U.S. Application Data

(60) Provisional application No. 62/872,238, filed on Jul. 9, 2019, provisional application No. 62/871,197, filed on Jul. 7, 2019, provisional application No. 62/839,607, filed on Apr. 26, 2019.

(51) Int. Cl.

| | |
|---|---|
| *H04N 19/126* | (2014.01) |
| *H04N 19/132* | (2014.01) |
| *H04N 19/172* | (2014.01) |
| *H04N 19/174* | (2014.01) |
| *H04N 19/184* | (2014.01) |
| *H04N 19/186* | (2014.01) |
| *H04N 19/44* | (2014.01) |

(52) U.S. Cl.
CPC ......... *H04N 19/172* (2014.11); *H04N 19/174* (2014.11); *H04N 19/184* (2014.11); *H04N 19/186* (2014.11); *H04N 19/44* (2014.11)

(58) Field of Classification Search
CPC .... H04N 19/184; H04N 19/186; H04N 19/44; H04N 19/70
See application file for complete search history.

(56) References Cited

U.S. PATENT DOCUMENTS

| | | | | |
|---|---|---|---|---|
| 7,272,181 | B2* | 9/2007 | Bayazit | H04N 19/149 |
| | | | | 375/E7.157 |
| 7,295,609 | B2* | 11/2007 | Sato | H04N 19/186 |
| | | | | 382/250 |
| 7,630,435 | B2* | 12/2009 | Chen | H04N 19/46 |
| | | | | 375/240.03 |
| 7,738,555 | B2* | 6/2010 | Haskell | H04N 19/176 |
| | | | | 375/240.03 |
| 7,889,790 | B2* | 2/2011 | Sun | H04N 19/126 |
| | | | | 375/240.03 |
| 7,894,523 | B2* | 2/2011 | Jeon | H04N 19/187 |
| | | | | 375/240.03 |
| 8,199,821 | B2* | 6/2012 | Jeon | H03M 7/4006 |
| | | | | 382/235 |
| 8,320,453 | B2* | 11/2012 | Jeon | H04N 19/105 |
| | | | | 341/107 |
| 8,396,309 | B2* | 3/2013 | Rasmusson | H04N 19/14 |
| | | | | 382/238 |
| 8,588,536 | B2* | 11/2013 | Dikbas | H04N 19/147 |
| | | | | 382/232 |
| 9,219,916 | B2* | 12/2015 | Su | H04N 19/90 |
| 9,363,509 | B2* | 6/2016 | Lim | H04N 19/46 |
| 9,571,828 | B2* | 2/2017 | Okawa | H04N 19/154 |
| 9,674,531 | B2* | 6/2017 | Gamei | H04N 19/523 |
| 9,872,040 | B2* | 1/2018 | Pu | H04N 19/583 |
| 9,967,561 | B2* | 5/2018 | Tu | H04N 19/126 |
| 10,075,735 | B2* | 9/2018 | Deshpande | H04N 19/44 |
| 10,123,021 | B2* | 11/2018 | Hiwatashi | H04N 19/154 |
| 10,165,275 | B2* | 12/2018 | Lu | H04N 19/17 |
| 10,356,413 | B1* | 7/2019 | Sim | H04N 19/197 |
| 10,362,333 | B2* | 7/2019 | Pu | H04N 19/127 |
| 10,404,990 | B2* | 9/2019 | Hendry | H04N 19/51 |
| 10,477,212 | B2* | 11/2019 | Lu | H04N 19/126 |
| 10,491,899 | B2* | 11/2019 | Galpin | H04N 19/463 |
| 10,542,257 | B2* | 1/2020 | Kalevo | H04N 19/46 |
| 10,609,371 | B2* | 3/2020 | Lim | H04N 19/61 |
| 10,834,400 | B1* | 11/2020 | Topiwala | H04N 19/46 |
| 11,019,338 | B2* | 5/2021 | Hsiang | H04N 19/124 |
| 11,032,553 | B2* | 6/2021 | Yin | H04N 19/182 |
| 11,631,199 | B2* | 4/2023 | Ikai | H04N 19/119 |
| | | | | 382/232 |
| 2007/0147497 | A1* | 6/2007 | Bao | H04N 19/126 |
| | | | | 375/240.03 |
| 2013/0028322 | A1* | 1/2013 | Fujibayashi | H04N 19/82 |
| | | | | 375/240.12 |
| 2013/0156311 | A1* | 6/2013 | Choi | H04N 9/67 |
| | | | | 382/166 |
| 2014/0003497 | A1* | 1/2014 | Sullivan | H04N 19/174 |
| | | | | 375/240.03 |
| 2015/0195554 | A1* | 7/2015 | Misra | H04N 19/30 |
| | | | | 375/240.25 |
| 2015/0373327 | A1* | 12/2015 | Zhang | H04N 19/176 |
| | | | | 375/240.03 |
| 2016/0316206 | A1* | 10/2016 | Sullivan | H04N 19/124 |
| 2018/0103253 | A1* | 4/2018 | Lu | H04N 19/157 |
| 2020/0162735 | A1* | 5/2020 | Ueno | H04N 19/124 |
| 2021/0021820 | A1* | 1/2021 | Ikai | H04N 19/124 |

FOREIGN PATENT DOCUMENTS

| | | | | |
|---|---|---|---|---|
| CN | 105359521 | A | | 2/2016 |
| CN | 107846591 | A | | 3/2018 |
| CN | 107852512 | A | | 3/2018 |
| EP | 3-158-748-81 | | * 6/2015 | ............. H04N 19/30 |
| EP | 3026908 | A1 | | 6/2016 |
| GB | 2506852 | A | | 4/2014 |
| KR | 3-688-986-81 | | * 5/2019 | ........... H04N 19/124 |

OTHER PUBLICATIONS

Dolby Laboratories, Inc., Chroma Quantization Parameter QpC Table for HDR Signal, JVET-N0221, oint Video Experts Team (JVET), of ITU-T SG 16 WP 3 and ISO/IEC JTC 1/SC 29/WG 11, 14th Meeting: Geneva, CH, 19 Mar. 27, 2019, 6 pages.

LG Electronics USA, AHG15: Chroma Quantization QpC Parameter Signalling , JVET-O0298-r1, Joint Video Experts Team (JVET)of ITU-T SG 16 WP 3 and ISO/IEC JTC 1/SC 29/WG 11, 15th Meeting: Gothenburg, SE, 3 Jul. 12, 2019, 9 pages.

Document: JVET-O0650-v2, Adarsh K. Ramasubramonian et al, AHG15: On signalling of chroma QP tables, Joint Video Experts Team (JVET) of ITU-T SG 16 WP 3 and ISO/IECJTC 1/SC 29/WG11, 15th Meeting: Gothenburg, SE, Jul. 3-12, 2019, total 4 pages.

Yang Tong et al, Visual perception based rate distortion optimization method for high dynamic range video coding, Opto-Electronic Engineering, 2018, with an English Abstract, total 11 pages.

Document: JVET-N1001-v10, Benjamin Bross et al, Versatile Video Coding (Draft 5), Joint Video Experts Team (JVET) of ITU-T SG 16 WP 3 and ISO/IEC JTC 1/SC 29/WG 11, 14th Meeting: Geneva, CH, Mar. 19-27, 2019, total 408 pages.

Document: JVET-M1001-v7, Benjamin Bross et al, Versatile Video Coding (Draft 4), Joint Video Experts Team (JVET) of ITU-T SG 16 WP 3 and ISO/IEC JTC 1/SC 29/WG 11, 13th Meeting: Marrakech, MA, Jan. 9-18, 2019, total 299 pages.

ISO/IEC JTC1/SC29/WG11 MPEG2019/M48933, Roman Chernyak et al, Suggested improvements for WD and TM, Jul. 2019,Gothenburg, SE, International Organisation for Standardisation Organisation Internationale De Normalisation ISO/IEC JTC1/SC29/WG11 Coding of Moving Pictures and Audio, total 5 pages.

Document: JVET-N0221, Taoran Lu et al, Chroma Quantization Parameter QPC Table for HDR Signal, Joint Video Experts Team (JVET) of ITU-T SG 16 WP 3 and ISO/IECJTC 1/SC 29/WG11, 14th Meeting: Geneva, CH, Mar. 19-27, 2019, total 6 pages.

Document: JVET-O0186, Sergey Ikonin et al, AHG15: Signalling of chroma Qp mapping table, Joint Video Experts Team (JVET) of ITU-T SG 16 WP 3 and ISO/IECJTC 1/SC 29/WG11, 15th Meeting: Gothenburg, SE, Jul. 3-12, 2019, total 9 pages.

Document: JVET-O0186-v2, Sergey Ikonin et al, AHG15: Signalling of chroma Qp mapping table, Joint Video Experts Team (JVET) of ITU-T SG 16 WP 3 and ISO/IECJTC 1/SC 29/WG11, 15th Meeting: Gothenburg, SE, Jul. 3-12, 2019, total 12 pages.

Document: JVET-O0562-v2, Frank Bossen et al, AHG15: Flexible luma-to-chroma quantization parameter tables, Joint Video Experts Team (JVET) of ITU-T SG 16 WP 3 and ISO/IECJTC 1/SC 29/WG11, 15th Meeting: Gothenburg, SE, 3 Jul. 12, 2019, total 7 pages.

Stephan , AHG17: Signalling zero or more Sub-Profiles, JVET-O0044, 3 Jul. 12, 2019,2 pages.

(56) References Cited

OTHER PUBLICATIONS

Han (Qualcomm) Y et al: "Cu level chroma QP control for VVC", 15. JVET Meeting; Jul. 3, 2019-Jul. 12, 2019; Gothenburg; (The Jointvideo Exploration Team of 1S0/IEC JTC1/SC29/WG11 and ITU-T SG.16 ), No. JVET-O1168 Jul. 10, 2019 (Jul. 10, 2019), XP030293914.

Flynn D et al: "RExt: CU-adaptive chroma QP offsets", 15. JCT-VC Meeting; Oct. 23, 2013-Nov. 1, 2013; GENEVA. (Joint Collaborative Team On Video Coding of ISO/IEC JTC1/SC29/WG11 and ITU-T SG.16), No. JCTVC-O0044, Oct. 31, 2013 (Oct. 31, 2013), XP030238892, total 4 pages.

\* cited by examiner

METHOD AND APPARATUS FOR SIGNALING OF MAPPING FUNCTION OF CHROMA QUANTIZATION PARAMETER

CROSS-REFERENCE TO RELATED APPLICATIONS

This application is a continuation of International Application No. PCT/CN2020/086924, filed on Apr. 26, 2020, which claims priority to U.S. Provisional Patent Application No. U.S. 62/839,607, filed Apr. 26, 2019, International Patent Application PCT/RU2019/000444, filed Jun. 21, 2019, U.S. Provisional Patent Application No. U.S. 62/871,197, filed Jul. 7, 2019, and U.S. Provisional Patent Application No. 62/872,238, filed Jul. 9, 2019. All of the aforementioned patent applications are hereby incorporated by reference in their entireties.

TECHNICAL FIELD

Embodiments of the present application (disclosure) generally relate to the field of image and/or video decoding and more particularly to apparatus and method for chroma quantization parameter signaling BACKGROUND Video coding (video encoding and decoding) is used in a wide range of digital video applications, for example broadcast digital TV, video transmission over internet and mobile networks, real-time conversational applications such as video chat, video conferencing, DVD and Blu-ray discs, video content acquisition and editing systems, and camcorders of security applications.

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever-increasing demands of higher video quality, improved compression and decompression techniques that improve compression ratio with little to no sacrifice in picture quality are desirable.

SUMMARY

Embodiments of the present application provide apparatuses and methods for encoding and decoding according to the independent claims.

The foregoing and other objects are achieved by the subject matter of the independent claims. Further implementation forms are apparent from the dependent claims, the description and the figures.

The present disclosure provides a method of obtaining a chrominance quantization parameter (QP) for chrominance components based on a luminance QP for a luminance component, where the method is performed by a decoder.

The method includes:
receiving a bitstream;
parsing the bitstream to obtain the luminance QP and information on a chroma QP mapping table which associates a QP index (QPi) to the chrominance QP (QPc);
obtaining the QPi based at least in a part on the luminance QP;
obtaining the chroma QP mapping table based on the obtained information;
obtaining a QPc based on the obtained chroma QP mapping table and the obtained QPi; and
obtaining chrominance quantization parameter based on the obtained QPc.

In an embodiment, qPCb, qPCr and qPCbCr may be derived as follows:

$qP_{Chroma} = \text{Clip3}(-QpBd\text{Offset}, 63, QpY);$ $qP_{Cb} = \text{Chroma}Qp\text{Table}[0][qP_{Chroma}];$ $qP_{Cr} = \text{Chroma}Qp\text{Table}[1][qP_{Chroma}];$ $qP_{CbCr} = \text{Chroma}Qp\text{Table}[2][qP_{Chroma}];$ where the chroma quantization parameters for the Cb and Cr components, $Qp'_{Cb}$ and $Qp'_{Cr}$, and joint Cb-Cr coding $Qp'_{CbCr}$ may be derived as follows:

$Qp'_{Cb} = \text{Clip3}(-QpBd\text{Offset}, 63, qP_{Cb} + \text{pps\_cb\_qp\_offset} + \text{slice\_cb\_qp\_offset} + CuQp\text{Offset}_{Cb}) + QpBd\text{Offset};$ $Qp'_{Cr} = \text{Clip3}(-QpBd\text{Offset}, 63, qP_{Cr} + \text{pps\_cr\_qp\_offset} + \text{slice\_cr\_qp\_offset} + CuQp\text{Offset}_{Cr}) + QpBd\text{Offset};$ $Qp'_{CbCr} = \text{Clip3}(-QpBd\text{Offset}, 63, qP_{CbCr} + \text{pps\_joint\_cbcr\_qp\_offset\_value} + \text{slice\_joint\_cbcr\_qp\_offset} + CuQp\text{Offset}_{CbCr}) + QpBd\text{Offset};$ where ChromaQpTable is the chroma QP mapping table;
where QPi correspond to $qP_{Chroma}$;
where QPc corresponds to $qP_{Cb}$, $qP_{Cr}$ and $qP_{CbCr}$;
where QpBdOffset is the bit depth offset calculated based on the bit depth of the samples of the luma and chroma arrays using the formula:

$QpBd\text{Offset} = 6 * \text{bit\_depth\_minus8},$ where bit_depth_minus8 shall be in the range of 0 to 8, inclusive;
where pps_cb_qp_offset and pps_cr_qp_offset specify the offsets to the luma quantization parameter $Qp'_Y$ used for deriving $Qp'_{Cb}$ and $Qp'_{Cr}$, respectively;
where pps_joint_cbcr_qp_offset_value specifies the offset to the luma quantization parameter $Qp'_Y$ used for deriving $Qp'_{CbCr}$;
where slice_cr_qp_offset specifies a difference to be added to the value of pps_cr_qp_offset when determining the value of the $Qp'_{Cr}$ quantization parameter;
where slice_cb_qp_offset specifies a difference to be added to the value of pps_cb_qp_offset when determining the value of the $Qp'_{Cb}$ quantization parameter;
where slice_joint_cbcr_qp_offset specifies a difference to be added to the value of pps_joint_cbcr_qp_offset_value when determining the value of the $Qp'_{CbCr}$;
where variables CuQpOffsetCb, CuQpOffsetCr, and $CuQp\text{Offset}_{CbCr}$, specify values to be used when determining the respective values of the $Qp'_{Cb}$, $Qp'_{Cr}$, and $Qp'_{CbCr}$ quantization parameters for the decoder.

In an embodiment, the chroma QP mapping table may associate each element x of a set X, where the set X may correspond to QPis in an allowed QPi range supported by the decoder, or any subset of the set X, to one element y of a set Y, where the set Y may correspond to QPcs in an allowed QPc range supported by the decoder.

In an embodiment, the values of the chroma QP mapping table may satisfy a mapping function.

In an embodiment, the mapping function may be a monotonically increasing function.

In an embodiment, the set X may include a subset A on which the mapping function $f$ is non-increasing, i.e.:

$f(x)-f(x-1)0$ for any $x$ of the subset $A$.

In an embodiment, the set X may include a subset B, on which the mapping function $f$ is increasing, i.e.: $f(x)-f(x-1)=c$ for any x of the subset B, where A+B=X and c is a natural number no less than 1.

In an embodiment, the information of the mapping function may be signaled in the bitstream using any of the following codes: binary, fixed length, unary, truncated unary, truncated binary, Golomb or Exp-Golomb code.

In an embodiment, the mapping function may be obtained using a defined functional behavior on subsets A and B, i.e.

for any input argument x from subset B, the mapping function increases by an integer value equal to or larger than one, and for any input argument x from subset A, the mapping function is flat such as, $f(x)-f(x-1)0$;

where it is assumed that the first value of mapping function corresponding to x=0 is 0;

In an embodiment, the functional behavior may be implemented iteratively using the following pseudo code:

```
chroma_qp_mapping_table[0] = 0;              // initialization
for (i = 1; i <= maxQP; i++)                 // maxQP is maximum QP supported by decoder
{
  int incStep = 1;                           // function increment for set B
  for (j = 0; j < cQpFlatSize; j++) // cQpFlatSize is size of set A
  {
    if (i == cQpFlat[j])                     // cQpFlat array with elements of set A
    {
      incStep = 0;                           // zero function increment for set A (flat)
      break;
    }
  }
  chroma_qp_mapping_table[i] = chroma_qp_mapping_table[i-1] + incStep;
}.
```

In an embodiment, the set X may include a subset B, on which mapping function $f$ is increasing, i.e.: $f(x)-f(x-1)=c$ for any x of the subset B, where c is a natural number no less than 1.

In an embodiment, the mapping function $f$ on the subset B may be defined as follows: $f(x)-f(x-1)=1$, for any x of the subset B.

In an embodiment, the information of the mapping function may comprise information of the size of the subset A (sizeA) and elements $a_i$, of the subset A.

In an embodiment, the information of the mapping function may comprise the size of the subset A.

In an embodiment, the information of the mapping function may comprise direct values of elements $a_i$, of the subset A.

In an embodiment, the information of the mapping function may comprise a difference (delta $a_i$) between a current value of the element $a_i$, and a previous value of the element $a_{i+1}$, and values $a_i$ are obtained as follows:

$a_i=a_{i-1}+\text{delta}\_a_i$, for any $i>0$.

In an embodiment, the information of the mapping function may comprise a difference (delta_$a_0$) between a first value $a_0$ and a starting point value, denoted by starting_point_value, where the first value $a_0$ of the subset A is obtained based on the difference (delta_$a_0$) as follows:

$a_0$=starting_point_value+delta_$a_0$, where the starting point value starting_point_value is either signaled in the bitstream or is a predefined value.

In an embodiment, the starting point value starting_point_value is one of 0, 21, 30, maxQPi>>1, where maxQPi is the maximum QPi value supported by the decoder.

In an embodiment, the information of the mapping function may comprise information of values b of the subset B, and the subset A is obtained as A=X-B.

In an embodiment, the subset B may include one or more sub-subsets Bk, where the sub-subsets Bk include elements x at which the mapping function has same increment $c_k$: $f(x)-f(x-1)=c_k$, if $x \in B_k$, where $c_k$ is a natural number.

In an embodiment, the information of the mapping function may comprise information of the size of at least one of the sub-subsets $B_k$ (size $B_k$) and elements b, of at least one of the sub-subsets $B_k$.

In an embodiment, the information of the mapping function may comprise information of the value of increment of the mapping function at points of sub-subset $B_k$.

In an embodiment, the information of the mapping function may comprise information of the amount of sub-subsets $B_k$.

In an embodiment, at least a part of the information of the mapping function, representing the information of the sub-subsets $B_k$, may be obtained using following syntax:

| | |
|---|---|
| cqp_set_num_m1 | ue(v) |
| for ( k = 0; k <= cqp_set_num_m1; k++ ) { | |
|   cqp_set_inc[ k ] | ue(v) |
|   cqp_set_size_m1[ k ] | ue(v) |
|   cqp_set_p0[k] | ue(v) |
|   for ( i = 1; i <= cqp_set_size_m1[ k ]; i++ ) | |
|     cqp_set_delta_m1[ k ][ i ] | ue(v) |
| } | |

In an embodiment, at least a part of the information of the mapping function, representing the information of the sub-subsets $B_k$, may be obtained using following syntax:

```
cqp_set_num_m1                              ue(v)
for ( k = 0; k <= cqp_set_num_m1; k++ ) {
    cqp_set_inc[ k ]                        ue(v)
    cqp_set_size_m1[k ]                     ue(v)
    cqp_set_p0[k]                           u(7)
    for ( i = 1; i <= cqp_set_size_m1[ k ]; i++ )
        cqp_set_delta_ml[ k ][ i ]          ue(v)
}
```

In an embodiment, the decoder further may further comprise a predefined chroma QP mapping table, and the bitstream may comprise a indicator indicating whether to use the a predefined chroma QP mapping table or use a chroma QP mapping table signaled in the bitstream.

In an embodiment, the information the information of the chroma QP mapping table may be signaled jointly for all chrominance components.

In an embodiment, the information of the chroma QP mapping table may comprise an indicator indicating whether the chroma QP mapping table is signaled for Cb and Cr components separately or jointly.

In an embodiment, the information of the chroma QP mapping table may be signaled at:
  sequence level in a sequence parameter set, or
  picture level in a picture parameter set, or
  tile group level in a tile group parameter set, or
  in an adaptation parameter set, or
  in a supplemental enhancement information (SEI) message.

In an embodiment, the predefined chroma QP mapping table may be expressed as follows:

| qPi | <30 | 30 | 31 | 32 | 33 | 34 | 35 | 36 | 37 | 38 | 39 | 40 | 41 | 42 | 43 | >43 |
|---|---|---|---|---|---|---|---|---|---|---|---|---|---|---|---|---|
| QpC | = qPi | 29 | 30 | 31 | 32 | 33 | 34 | 35 | 36 | 37 | 37 | 38 | 39 | 40 | 40 | = qPi − 3 |

In an embodiment, the predefined chroma QP mapping table may be expressed as follows:

| qPi | <35 | 35 | 36 | 37 | 38 | 39 | 40 | 41 | 42 | 43 | >43 |
|---|---|---|---|---|---|---|---|---|---|---|---|
| $Qp_C$ | = qPi | 34 | 35 | 36 | 37 | 37 | 38 | 39 | 40 | 40 | = qPi − 3 |

In an embodiment, the information of the chroma QP mapping table may be signaled in the bitstream directly or indirectly.

The present disclosure further discloses a decoder having processing circuitry for carrying out the method as described above.

The present disclosure further discloses a computer program product having a program code for performing the method as described above.

The present disclosure further discloses a decoder, which includes:
  one or more processors; and
  a non-transitory computer-readable storage medium coupled to the processors and storing programming for execution by the processors, where the programming, when executed by the processors, configures the decoder to carry out the method according as described above.

The present disclosure further discloses a decoder for obtaining a chrominance quantization parameter (QP) for chrominance components based on a luminance QP for a luminance component. The decoder includes:

a receiving unit configured to receive a bitstream;

a parsing unit configured to parse the bitstream to obtain the luminance QP and information on a chroma QP mapping table which associates a QP index (QPi) to the chrominance QP (QPc);

a first obtaining unit configured to obtain the QPi based at least in a part on the luminance QP;

a second obtaining unit configured to obtain the chroma QP mapping table based on the obtained information;

a third obtaining unit configured to obtain a QPc based on the obtained chroma QP mapping table and the obtained QPi; and a fourth obtaining unit configured to obtain chrominance quantization parameter based on the obtained QPc.

Having information about chroma QP mapping table in the bitstream enables adjustment to specific properties of input video signal, such as SDR or HDR, or different intensity and distribution on luminance and chrominance channels, and therefore to improve compression efficiency and to improve balancing between chroma and luma components in reconstructed video signal In an embodiment, $qP_{Cb}$, $qP_{Cr}$ and $qP_{CbCr}$ may be derived as follows:

$$qP_{Chroma} = \text{Clip3}(-QpBd\text{Offset}, 63, Qp_Y);$$

$$qP_{Cb} = \text{Chroma}Qp\text{Table}[0][qP_{Chroma}];$$

$$qP_{Cr} = \text{Chroma}Qp\text{Table}[1][qP_{Chroma}];$$

$$qP_{CbCr} = \text{Chroma}Qp\text{Table}[2][qP_{Chroma}];$$

where the chroma quantization parameters for the Cb and Cr components, $Qp'_{Cb}$ and $Qp'_{Cr}$, and joint Cb-Cr coding $Qp'_{CbCr}$ are derived as follows:

$$Qp'_{Cb} = \text{Clip3}(-QpBd\text{Offset}, 63, qP_{Cb} + pps\_cb\_qp\_offset + slice\_cb\_qp\_offset + CuQp\text{Offset}_{Cb}) + QpBd\text{Offset};$$

$$Qp'_{Cr} = \text{Clip3}(-QpBd\text{Offset}, 63, qP_{Cr} + pps\_cr\_qp\_offset + slice\_cr\_qp\_offset + CuQp\text{Offset}_{Cr}) + QpBd\text{Offset};$$

$$Qp'_{CbCr} = \text{Clip3}(-QpBd\text{Offset}, 63, qP_{CbCr} + pps\_joint\_cbcr\_qp\_offset\_value + slice\_joint\_cbcr\_qp\_offset + CuQp\text{Offset}_{CbCr}) + QpBd\text{Offset};$$

where ChromaQpTable is the chroma QP mapping table;
where QPi correspond to $qP_{Chroma}$;
where QPc corresponds to $qP_{Cb}$, $qP_{Cr}$ and $qP_{CbCr}$;
where QpBdOffset is the bit depth offset calculated based on the bit depth of the samples of the luma and chroma arrays using the formula:

$$QpBd\text{Offset} = 6 * bit\_depth\_minus8,$$

where bit_depth_minus8 shall be in the range of 0 to 8, inclusive;

where pps_cb_qp_offset and pps_cr_qp_offset specify the offsets to the luma quantization parameter $Qp'_Y$ used for deriving $Qp'_{Cb}$ and $Qp'_{Cr}$, respectively;

where pps_joint_cbcr_qp_offset_value specifies the offset to the luma quantization parameter $Qp'_Y$ used for deriving $Qp'_{CbCr}$;

where slice_cr_qp_offset specifies a difference to be added to the value of pps_cr_qp_offset when determining the value of the $Qp'_{Cr}$ quantization parameter;

where slice_cb_qp_offset specifies a difference to be added to the value of pps_cb_qp_offset when determining the value of the $Qp'_{Cb}$ quantization parameter;

where slice_joint_*cbcr* qp_offset specifies a difference to be added to the value of pps_joint_*cbcr*_qp_offset_value when determining the value of the $Qp'_{CbCr}$;

where variables CuQpOffsetCb, CuQpOffsetCr, and CuQpOffset$_{CbCr}$, specify values to be used when determining the respective values of the $Qp'_{Cb}$, $Qp'_{Cr}$, and $Qp'_{CbCr}$ quantization parameters for the decoder.

In an embodiment, the chroma QP mapping table may associate each element x of a set X, where the set X may correspond to QPis in an allowed QPi range supported by the decoder, or any subset of the set X, to one element y of a set Y, where the set Y may correspond to QPcs in an allowed QPc range supported by the decoder.

In an embodiment, the values of the chroma QP mapping table may satisfy a mapping function $f$.

In an embodiment, the mapping function may be a monotonically increasing function.

Putting this restriction on the mapping function allows avoiding configuring of the mapping function with "weird", e.g. unexpected and undesirable behavior when chroma QP decreases with increasing of luma QP, in other words avoiding the case when chroma quality increases with decreasing quality of luma. Having monotonic increasing constrain allows luma and chroma quality be synchronized. As additional advantage, this restriction allows to save bits on signaling of mapping function information by excluding necessity to describe negative incensement of the function.

In an embodiment, the set X may include a subset A on which the mapping function $f$ is non-increasing, i.e.

$f(x)-f(x-1)=0$ for any x of the subset A.

In an embodiment, the set X may include a subset B, on which the mapping function $f$ is increasing, i.e.: $f(x)-f(x-1)=c$ for any x of the subset B, where A+B=X and c is a natural number no less than 1.

In an embodiment, the set X may include a subset B, on which mapping function $f$ is increasing, i.e.: $f(x)-f(x-1)=c$ for any x of the subset B, where c is a natural number no less than 1.

In an embodiment, the mapping function f on the subset B may be defined as follows: $f(x)-f(x-1)=1$, for any x of the subset B.

In an embodiment, the information of the mapping function may comprise information of the size of the subset A (sizeA) and elements $a_i$, of the subset A.

In an embodiment, the information of the mapping function may comprise the size of the subset A.

In an embodiment, the information of the mapping function includes direct values of elements $a_i$, of the subset A.

Signaling information about only points of subset A allows to keep signaling overhead at the reasonable level, assuming that the majority of points of mapping function keeps predefined behavior (e.g. $f(x)-f(x-1)=c$) and then does not need to be signaled (subset B). This allows obtaining the function behavior for entire set X of supported values of QPi with minimized signaling overhead by signaling only those points, where function behavior differs from predefined behavior.

In an embodiment, the information of the mapping function may comprise a difference (delta_$a_1$) between a current value of the element $a_i$, and a previous value of the element $a_{i-1}$, and values $a_i$ are obtained as follows: $a_i=a_{i-1}+$delta_$a_i$, for any i>0.

Signaling differences instead of direct values allows additionally save bits.

In an embodiment, the information of the mapping function may comprise a difference (delta_$a_0$) between a first value $a_0$ and a starting point value, denoted by starting_point_value, where the first value $a_0$ of the subset A is obtained based on the difference (delta_$a_0$) as follows:

$a_0=$starting_point_value+delta_$a_0$, where the starting point value starting_point_value is either signaled in the bitstream or is a predefined value.

In an embodiment, the starting point value starting_point_value may be one of 0, 21, 30, maxQPi>>1, where maxQPi is the maximum QPi value supported by the decoder. Choosing appropriate starting_point_value allows additionally save bits on signaling of first value.

In an embodiment, the information of the mapping function may be signaled in the bitstream using any of the following codes: binary, fixed length, unary, truncated unary, truncated binary, Golomb or Exp-Golomb code.

In an embodiment, the mapping function may be obtained using a defined functional behavior on subsets A and B, i.e.

for any input argument x from subset B, the mapping function increases by 1 such as $f(x)-f(x-1)=1$, and for any input argument x from subset A, the mapping function is flat such as, $f(x)-f(x-1)0$;

where it is assumed that the first value of mapping function corresponding to x=0 is 0;

In an embodiment, the functional behavior may be implemented iteratively using the following pseudo code:

```
chroma_qp_mapping_table[0] = 0;          // initialization
for (i = 1; i <= maxQP; i++)             // maxQP is maximum QP supported by decoder
{
    int incStep = 1;                      // function increment for set B
    for (j = 0; j < cQpFlatSize; j++)    // cQpFlatSize is size of set A
    {
        if (i == cQpFlat[j])              // cQpFlat array with elements of set A
        {
            incStep = 0;                  // zero function increment for set A (flat)
            break;
        }
    }
    chroma_qp_mapping_table[i] = chroma_qp_mapping_table[i-1] + incStep;
}.
```

In an embodiment, the information of the mapping function may comprise information of values b of the subset B, and the subset A is obtained as A=X-B.

In an embodiment, the subset B may include one or more sub-subsets $B_k$, where the sub-subsets $B_k$ include elements x at which the mapping function has same increment $c_k$: $f(x)-f(x-1)=c_k$, if $x \in B_k$, where $c_k$ is a natural number.

In an embodiment, the information of the mapping function may comprise information of the size of at least one of the sub-subsets $B_k$ (size $B_k$) and elements $b_i$ of at least one of the sub-subsets $B_k$.

In an embodiment, the information of the mapping function may comprise information of the value of increment of the mapping function at points of sub-subset $B_k$.

This allows increasing flexibility of the mapping function definition by adding points where the function may have different speed of incensements ($c_k$).

In an embodiment, the information of the mapping function may comprise information of the amount of sub-subsets $B_k$.

In an embodiment, at least a part of the information of the mapping function, representing the information of the sub-subsets $B_k$, may be obtained using following syntax:

| | |
|---|---|
| cqp_set_num_m1 | ue(v) |
| for ( k = 0; k <= cqp_set_num_m1; k++ ) { | |
|   cqp_set_inc[ k ] | ue(v) |
|   cqp_set_size_m1[ k] | ue(v) |
|   cqp_set_p0[k] | ue(v) |

-continued

| | |
|---|---|
|   for ( i = 1; i <= cqp_set_size_m1[ k ]; i++ ) | |
|     cqp_set_delta_m1[ k ][ i ] | ue(v) |
| } | |

In an embodiment, at least a part of the information of the mapping function, representing the information of the sub-subsets $B_k$, may be obtained using following syntax:

| | |
|---|---|
| cqp_set_num_m1 | ue(v) |
| for ( k = 0; k <= cqp_set_num_m1; k++ ) { | |
|   cqp_set_inc[ k ] | ue(v) |
|   cqp_set_size_m1[ k ] | ue(v) |
|   cqp_set_p0[k] | u(7) |
|   for ( i = 1; i <= cqp_set_size_m1[ k ]; i++ ) | |
|     cqp_set_delta_m1[ k ][ i ] | ue(v) |
| } | |

Using unsigned integer codes (ue(v)) as in examples above implies restriction on the mapping function to be monotonically increasing and allows additionally to save bits by excluding necessity of transferring sign information for deltas and function increment ($c_k$).

In an embodiment, the decoder may further comprise a predefined chroma QP mapping table, and the bitstream comprises an indicator indicating whether to use the a predefined chroma QP mapping table or use a chroma QP mapping table signaled in the bitstream.

This allows to signal information about mapping table only for cases when it is beneficial, that is, when luma and chroma channel characteristics differs significantly from common case, like for HDR signal, and to use a predefined mapping table, which is appropriate for common cases. That allows saving signaling overhead for most common cases, for which the predefined mapping table has been optimized.

In an embodiment, the information of the chroma QP mapping table may be signaled jointly for all chrominance components.

In an embodiment, the information of the chroma QP mapping table may comprise an indicator indicating whether the chroma QP mapping table is signaled for Cb and Cr components separately or jointly.

This aspect allows a further increase of flexibility of controlling quantization process for the cases when different chroma channels (e.g. Cb and Cr channels) have different signal characteristics by having different chroma QP mapping tables for different chroma channels, which in turn allows to further increase compression efficiency.

In an embodiment, the information of the chroma QP mapping table may be signaled at:

sequence level in the sequence parameter set, or picture level in the picture parameter set, or tile group level in the tile group parameter set, or in an adaptation parameter set, or in a supplemental enhancement information (SEI) message.

In an embodiment, the predefined chroma QP mapping table may be expressed as follows.

| qPi | <30 | 30 | 31 | 32 | 33 | 34 | 35 | 36 | 37 | 38 | 39 | 40 | 41 | 42 | 43 | >43 |
|---|---|---|---|---|---|---|---|---|---|---|---|---|---|---|---|---|
| QpC | = qPi | 29 | 30 | 31 | 32 | 33 | 34 | 35 | 36 | 37 | 37 | 38 | 39 | 40 | 40 | = qPi −3 |

In an embodiment, the predefined chroma QP mapping table may be expressed as follows:

| qPi | <35 | 35 | 36 | 37 | 38 | 39 | 40 | 41 | 42 | 43 | >43 |
|---|---|---|---|---|---|---|---|---|---|---|---|
| $Qp_C$ | = qPi | 34 | 35 | 36 | 37 | 37 | 38 | 39 | 40 | 40 | = qPi − 3 |

In an embodiment, the information of the chroma QP mapping table may be signaled in the bitstream directly or indirectly.

The method according to the first aspect of the disclosure can be performed by the apparatus according to the third aspect of the disclosure. Further features and implementation forms of the method according to the third aspect of the disclosure correspond to the features and implementation forms of the apparatus according to the first aspect of the disclosure.

The method according to the second aspect of the disclosure can be performed by the apparatus according to the fourth aspect of the disclosure. Further features and implementation forms of the method according to the fourth aspect of the disclosure correspond to the features and implementation forms of the apparatus according to the second aspect of the disclosure.

According to a fifth aspect the disclosure relates to an apparatus for decoding a video stream includes a processor and a memory. The memory is storing instructions that cause the processor to perform the method according to the first aspect.

According to a sixth aspect the disclosure relates to an apparatus for encoding a video stream includes a processor and a memory. The memory is storing instructions that cause the processor to perform the method according to the second aspect.

According to a seventh aspect, a computer-readable storage medium having stored thereon instructions that when executed cause one or more processors configured to code video data is proposed. The instructions cause the one or more processors to perform a method according to the first or second aspect or any possible embodiment of the first or second aspect.

According to an eighth aspect, the disclosure relates to a computer program having program code for performing the method according to the first or second aspect or any possible embodiment of the first or second aspect when executed on a computer.

Details of one or more embodiments are set forth in the accompanying drawings and the description below. Other features, objects, and advantages will be apparent from the description, drawings, and claims.

BRIEF DESCRIPTION OF THE DRAWINGS

In the following embodiments of the disclosure are described in more detail with reference to the attached figures and drawings, in which.

FIG. TA is a block diagram showing an example of a video coding system configured to implement embodiments of the disclosure.

Figure 1A:
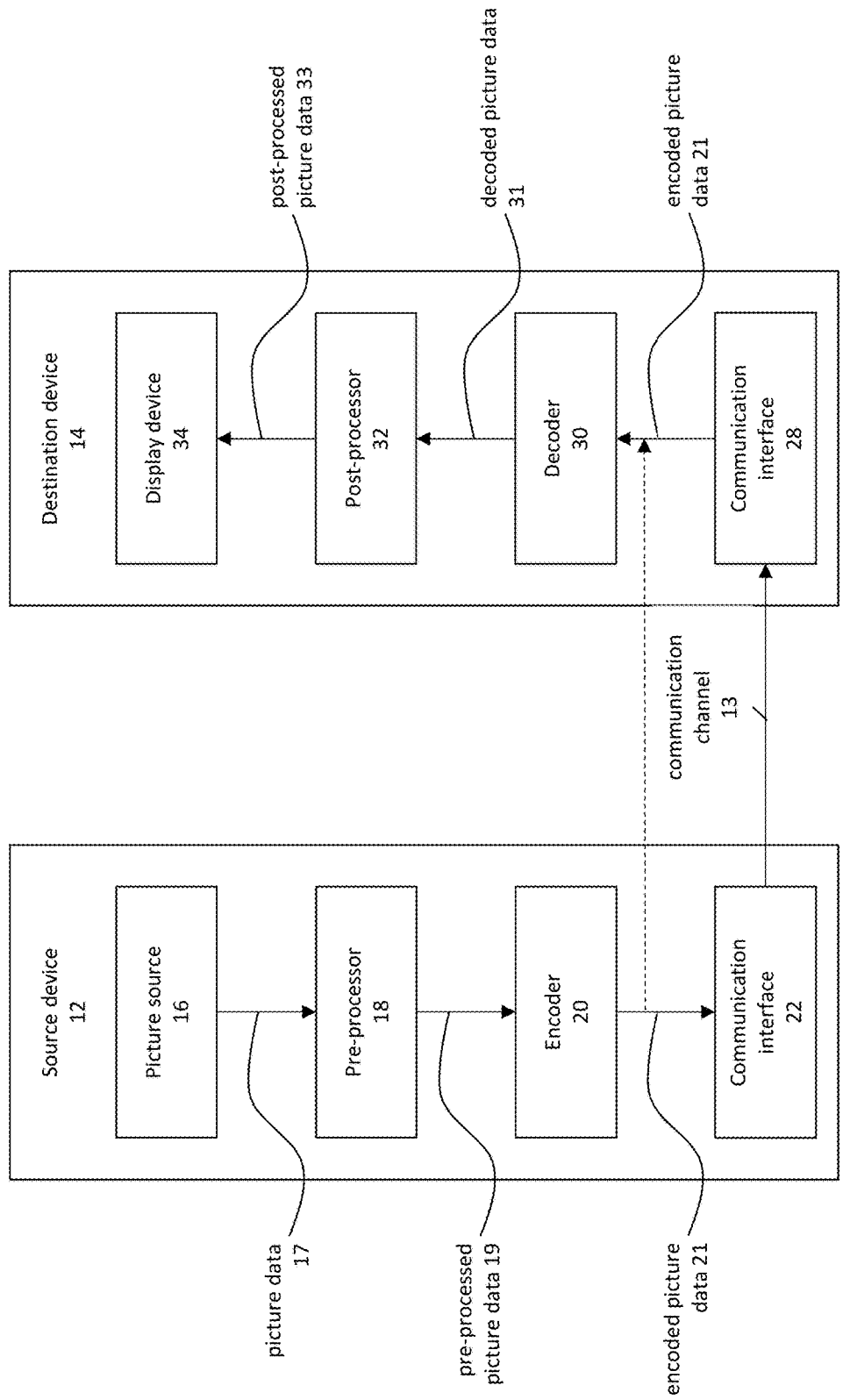
FIG. 1B is a block diagram showing another example of a video coding system configured to implement embodiments of the disclosure.

In the following identical reference signs refer to identical or at least functionally equivalent features if not explicitly specified otherwise.

DETAILED DESCRIPTION OF THE EMBODIMENTS

In the following description, reference is made to the accompanying figures, which form part of the disclosure, and which show, by way of illustration, specific aspects of embodiments of the disclosure or specific aspects in which embodiments of the present disclosure may be used. It is understood that embodiments of the disclosure may be used in other aspects and comprise structural or logical changes not depicted in the figures. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if one or a plurality of specific method operations are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term "picture" the term "frame" or "image" may be used as synonyms in the field of video coding. Video coding (or coding in general) comprises two parts video encoding and video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as CODEC (Coding and Decoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

In the following embodiments of a video coding system 10, a video encoder 20 and a video decoder 30 are described based on FIGS. 1 to 3.

FIG. 1A is a schematic block diagram illustrating an example coding system 10, e.g. a video coding system 10 (or short coding system 10) that may utilize techniques of this present application. Video encoder 20 (or short encoder 20) and video decoder 30 (or short decoder 30) of video coding system 10 represent examples of devices that may be configured to perform techniques in accordance with various examples described in the present application.

As shown in FIG. 1A, the coding system 10 comprises a source device 12 configured to provide encoded picture data 21 e.g. to a destination device 14 for decoding the encoded picture data 13.

The source device 12 comprises an encoder 20, and may additionally, i.e. optionally, comprise a picture source 16, a pre-processor (or pre-processing unit)=18, e.g. a picture pre-processor 18, and a communication interface or communication unit 22.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g. from RGB to YCbCr), color correction, or de-noising. It can be understood that the pre-processing unit 18 may be optional component.

The video encoder 20 is configured to receive the pre-processed picture data 19 and provide encoded picture data 21 (further details will be described below, e.g., based on FIG. 2).

Communication interface 22 of the source device 12 may be configured to receive the encoded picture data 21 and to transmit the encoded picture data 21 (or any further processed version thereof) over communication channel 13 to another device, e.g. the destination device 14 or any other device, for storage or direct reconstruction.

The destination device 14 comprises a decoder 30 (e.g. a video decoder 30), and may additionally, i.e. optionally, comprise a communication interface or communication unit 28, a post-processor 32 (or post-processing unit 32) and a display device 34.

The communication interface 28 of the destination device 14 is configured receive the encoded picture data 21 (or any further processed version thereof), e.g. directly from the source device 12 or from any other source, e.g. a storage device, e.g. an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, and/or process the encoded picture data using any kind of transmission encoding or processing for transmission over a communication link or communication network.

The communication interface 28, forming the counterpart of the communication interface 22, may be, e.g., configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 1A pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 is configured to receive the encoded picture data 21 and provide decoded picture data 31 or a decoded picture 31 (further details will be described below, e.g., based on FIG. 3 or FIG. 5).

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 1A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

Figure 1B:
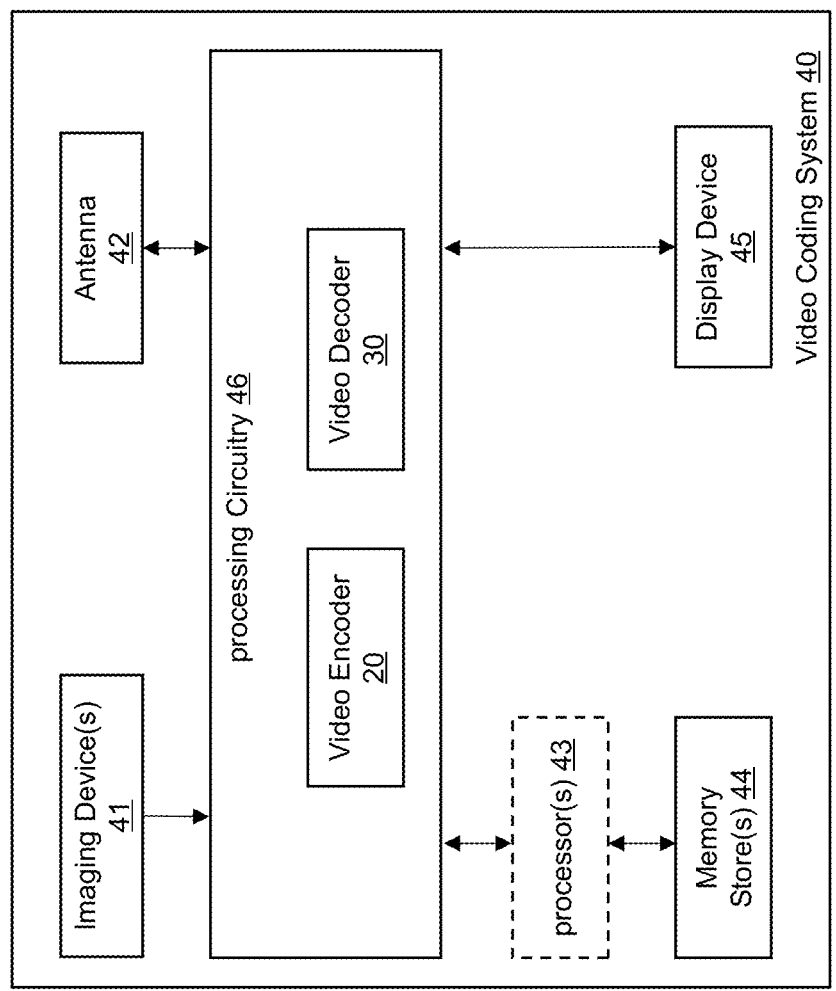

The encoder 20 (e.g. a video encoder 20) or the decoder 30 (e.g. a video decoder 30) or both encoder 20 and decoder 30 may be implemented via processing circuitry as shown in FIG. 1B, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules as discussed with respect to encoder 20 of FIG. 2 and/or any other encoder system or subsystem described herein. The decoder 30 may be implemented via processing circuitry 46 to embody the various modules as discussed with respect to decoder 30 of FIG. 3 and/or any other decoder system or subsystem described herein. The processing circuitry may be configured to perform the various operations as discussed later. As shown in FIG. 5, if the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 1B.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

For convenience of description, embodiments of the disclosure are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the disclosure are not limited to HEVC or VVC.

Encoder and Encoding Method

Figure 2:
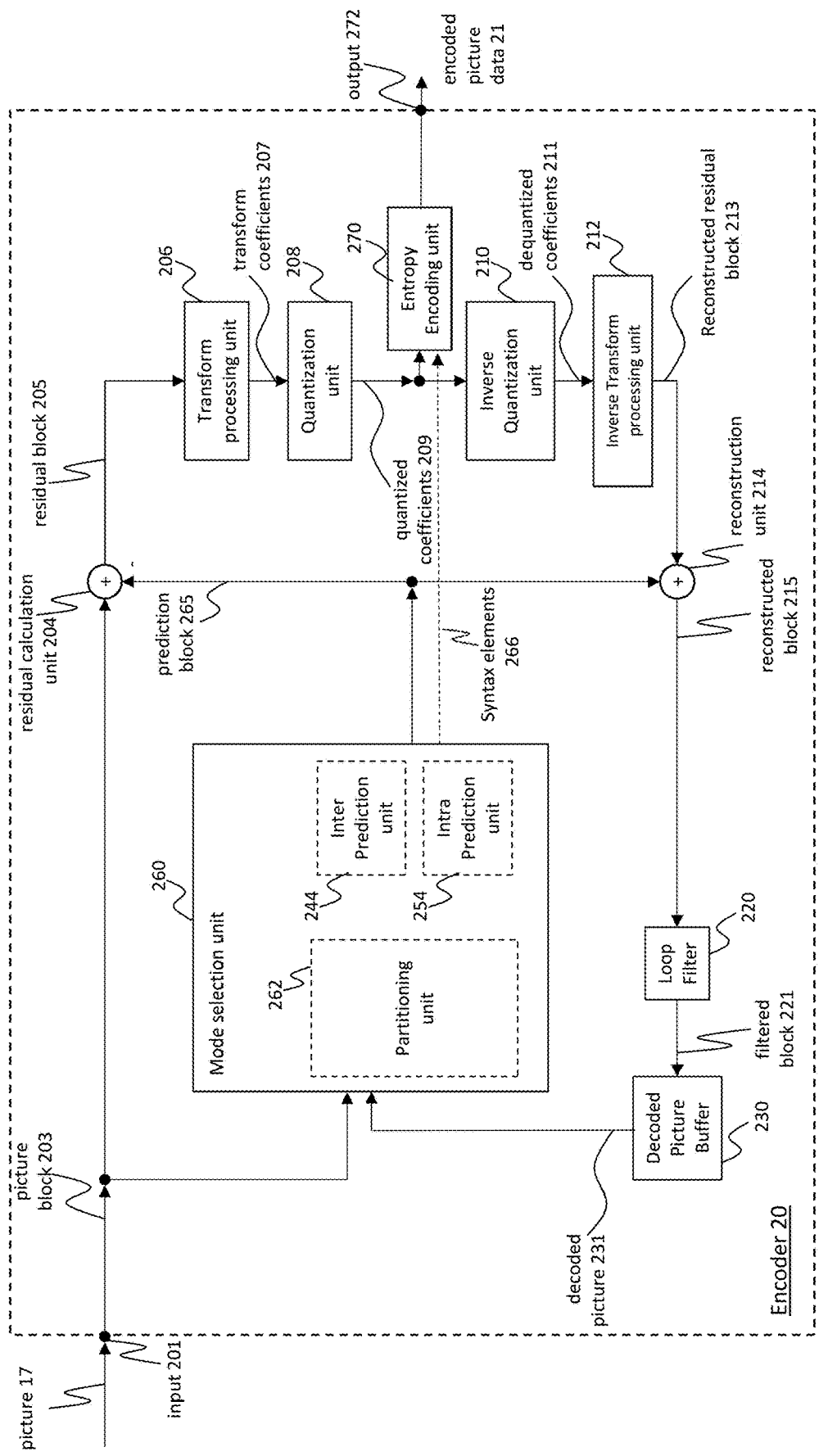
FIG. 2 is a block diagram showing an example of a video encoder configured to implement embodiments of the disclosure.

FIG. 2 shows a schematic block diagram of an example video encoder 20 that is configured to implement the techniques of the present application. In the example of FIG. 2, the video encoder 20 comprises an input 201 (or input interface 201), a residual calculation unit 204, a transform processing unit 206, a quantization unit 208, an inverse quantization unit 210, and inverse transform processing unit 212, a reconstruction unit 214, a loop filter unit 220, a decoded picture buffer (DPB) 230, a mode selection unit 260, an entropy encoding unit 270 and an output 272 (or output interface 272). The mode selection unit 260 may include an inter prediction unit 244, an intra prediction unit 254 and a partitioning unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

Figure 3:
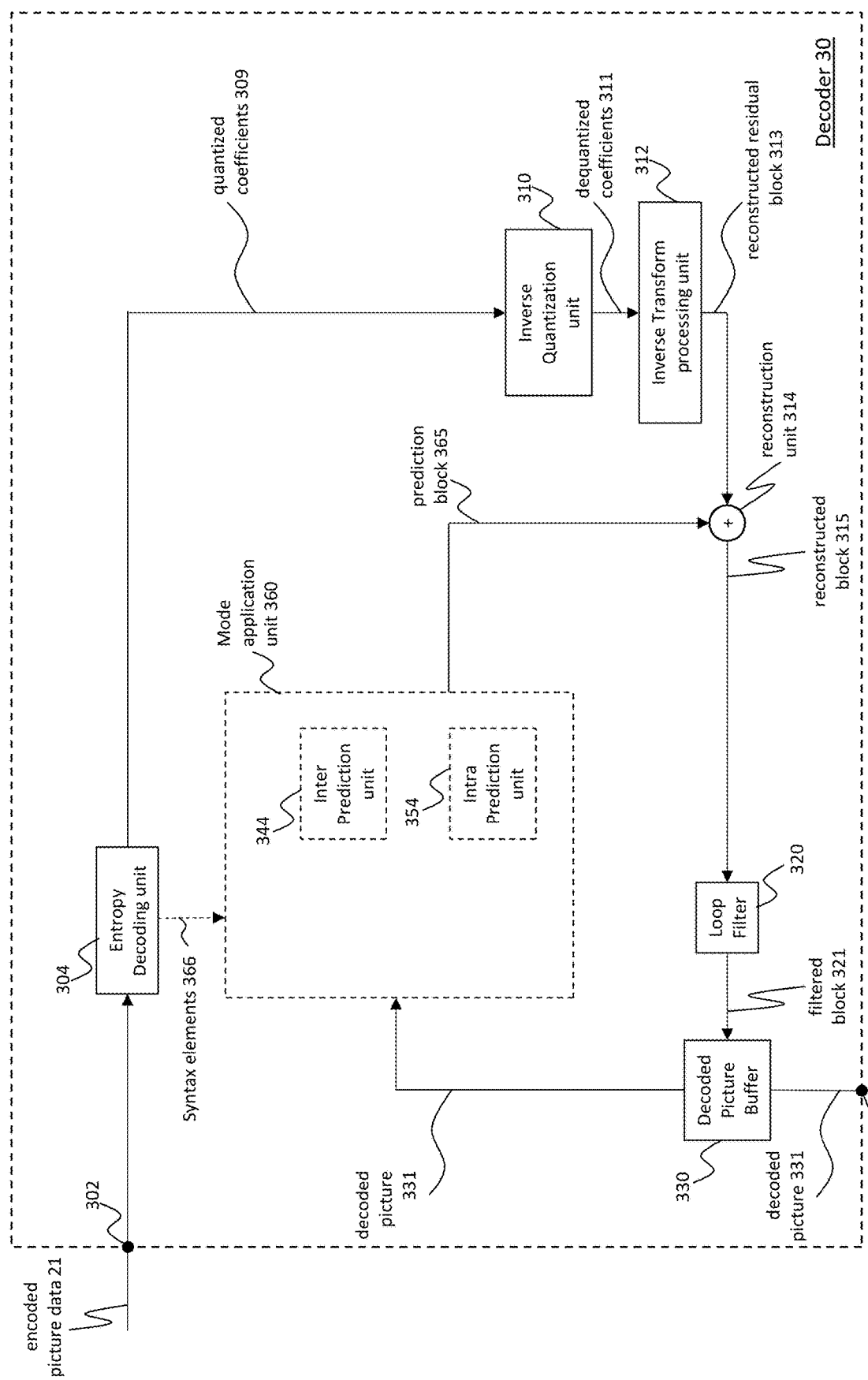
FIG. 3 is a block diagram showing an example structure of a video decoder configured to implement embodiments of the disclosure.

The residual calculation unit 204, the transform processing unit 206, the quantization unit 208, the mode selection unit 260 may be referred to as forming a forward signal path of the encoder 20, whereas the inverse quantization unit 210, the inverse transform processing unit 212, the reconstruction unit 214, the buffer 216, the loop filter 220, the decoded picture buffer (DPB) 230, the inter prediction unit 244 and the intra-prediction unit 254 may be referred to as forming a backward signal path of the video encoder 20, where the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the decoded picture buffer (DPB) 230, the inter prediction unit 244 and the intra-prediction unit 254 are also referred to forming the "built-in decoder" of video encoder 20.

Pictures & Picture Partitioning (Pictures & Blocks)

The encoder 20 may be configured to receive, e.g. via input 201, a picture 17 (or picture data 17), e.g. picture of a sequence of pictures forming a video or video sequence. The received picture or picture data may also be a pre-processed picture 19 (or pre-processed picture data 19). For sake of simplicity the following description refers to the picture 17. The picture 17 may also be referred to as current picture or picture to be coded (in particular in video coding to distinguish the current picture from other pictures, e.g. previously encoded and/or decoded pictures of the same video sequence, i.e. the video sequence which also comprises the current picture).

A (digital) picture is or can be regarded as a two-dimensional array or matrix of samples with intensity values. A sample in the array may also be referred to as pixel (a short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RGB format or color space a picture comprises a corresponding red, green and blue sample array. However, in video coding each pixel is typically represented in a luminance and chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 colour format.

Embodiments of the video encoder 20 may comprise a picture partitioning unit (not depicted in FIG. 2) configured to partition the picture 17 into a plurality of (typically non-overlapping) picture blocks 203. These blocks may also be referred to as root blocks, macro blocks (H.264/AVC) or coding tree blocks (CTB) or coding tree units (CTU) (H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder may be configured to receive directly a block 203 of the picture 17, e.g. one, several or all blocks forming the picture 17. The picture block 203 may also be referred to as current picture block or picture block to be coded.

Like the picture 17, the picture block 203 again is or can be regarded as a two-dimensional array or matrix of samples with intensity values (sample values), although of smaller dimension than the picture 17. In other words, the block 203 may comprise, e.g., one sample array (e.g. a luma array in case of a monochrome picture 17, or a luma or chroma array in case of a color picture) or three sample arrays (e.g. a luma and two chroma arrays in case of a color picture 17) or any other number and/or kind of arrays depending on the color format applied. The number of samples in horizontal and vertical direction (or axis) of the block 203 define the size of block 203. Accordingly, a block may, for example, an MxN (M-column by N-row) array of samples, or an MxN array of transform coefficients.

Embodiments of the video encoder 20 as shown in FIG. 2 may be configured to encode the picture 17 block by block, e.g. the encoding and prediction is performed per block 203.

Embodiments of the video encoder 20 as shown in FIG. 2 may be further configured to partition and/or encode the picture by using slices (also referred to as video slices), where a picture may be partitioned into or encoded using one or more slices (typically non-overlapping), and each slice may comprise one or more blocks (e.g. CTUs).

Embodiments of the video encoder 20 as shown in FIG. 2 may be further configured to partition and/or encode the picture by using tile groups (also referred to as video tile groups) and/or tiles (also referred to as video tiles), where a picture may be partitioned into or encoded using one or more tile groups (typically non-overlapping), and each tile group may comprise, e.g. one or more blocks (e.g. CTUs) or one or more tiles, where each tile, e.g. may be of rectangular shape and may comprise one or more blocks (e.g. CTUs), e.g. complete or fractional blocks.

Residual Calculation

The residual calculation unit 204 may be configured to calculate a residual block 205 (also referred to as residual 205) based on the picture block 203 and a prediction block 265 (further details about the prediction block 265 are provided later), e.g. by subtracting sample values of the prediction block 265 from sample values of the picture block 203, sample by sample (pixel by pixel) to obtain the residual block 205 in the sample domain.

Transform

The transform processing unit 206 may be configured to apply a transform, e.g. a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operations, bit depth of the transform coefficients, tradeoff between accuracy and implementation costs, etc. Specific scaling factors are, for example, specified for the inverse transform, e.g. by inverse transform processing unit 212 (and the corresponding inverse transform, e.g. by inverse transform processing unit 312 at video decoder 30) and corresponding scaling factors for the forward transform, e.g. by transform processing unit 206, at an encoder 20 may be specified accordingly.

Embodiments of the video encoder 20 (respectively transform processing unit 206) may be configured to output transform parameters, e.g. a type of transform or transforms, e.g. directly or encoded or compressed via the entropy encoding unit 270, so that, e.g., the video decoder 30 may receive and use the transform parameters for decoding.

Quantization

The quantization unit 208 may be configured to quantize the transform coefficients 207 to obtain quantized coefficients 209, e.g. by applying scalar quantization or vector quantization. The quantized coefficients 209 may also be referred to as quantized transform coefficients 209 or quantized residual coefficients 209.

The quantization process may reduce the bit depth associated with some or all of the transform coefficients 207. For example, an n-bit transform coefficient may be rounded down to an m-bit Transform coefficient during quantization, where n is greater than m. The degree of quantization may be modified by adjusting a quantization parameter (QP). For example, for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and a corresponding and/or the inverse dequantization, e.g. by inverse quantization unit 210, may include multiplication by the quantization step size. Embodiments according to some standards, e.g. HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from an encoder to a decoder, e.g. in a bitstream. The quantization is a lossy operation, where the loss increases with increasing quantization step sizes.

A picture compression level is controlled by quantization parameter (QP) that may be fixed for the whole picture (e.g. by using a same quantization parameter value), or may have different quantization parameter values for different regions of the picture.

For YCbCr 4:2:0 and 4:2:2 video, the signal characteristics of luma and the chroma components are quite different. Specifically, chroma often exhibits a strong lowpass character. If strong quantization is applied, the chroma information may be completely quantized to zero, which would lead to the complete loss of color. Accordingly, in order to reduce this the quantizer step size for chroma is adapted by reducing the chroma quantizer step size for high QP values [2].

In the High Efficiency Video Coding (HEVC) standard, the chroma quantization parameter QPc is derived by Table 1, where qPi is equal to the associated luma quantization parameter plus the chroma QP offset value signaled in the picture parameter set (PPS) and/or the slice header. The derivation of chroma QP value from the associated luma QP value can be adjusted by signaling different chroma QP offset values. A positive chroma QP offset value will result in a coarser quantizer for the associated chroma component.

TABLE 1

| Specification of QpC as a function of qPi in HEVC as an example | | | | | | | | | | | | | | | |
|---|---|---|---|---|---|---|---|---|---|---|---|---|---|---|---|
| qPi | <30 | 30 | 31 | 32 | 33 | 34 | 35 | 36 | 37 | 38 | 39 | 40 | 41 | 42 | 43 | >43 |
| $Qp_C$ | = qPi | 29 | 30 | 31 | 32 | 33 | 33 | 34 | 35 | 35 | 35 | 36 | 36 | 37 | 37 | = qPi − 6 |

Figure 6:
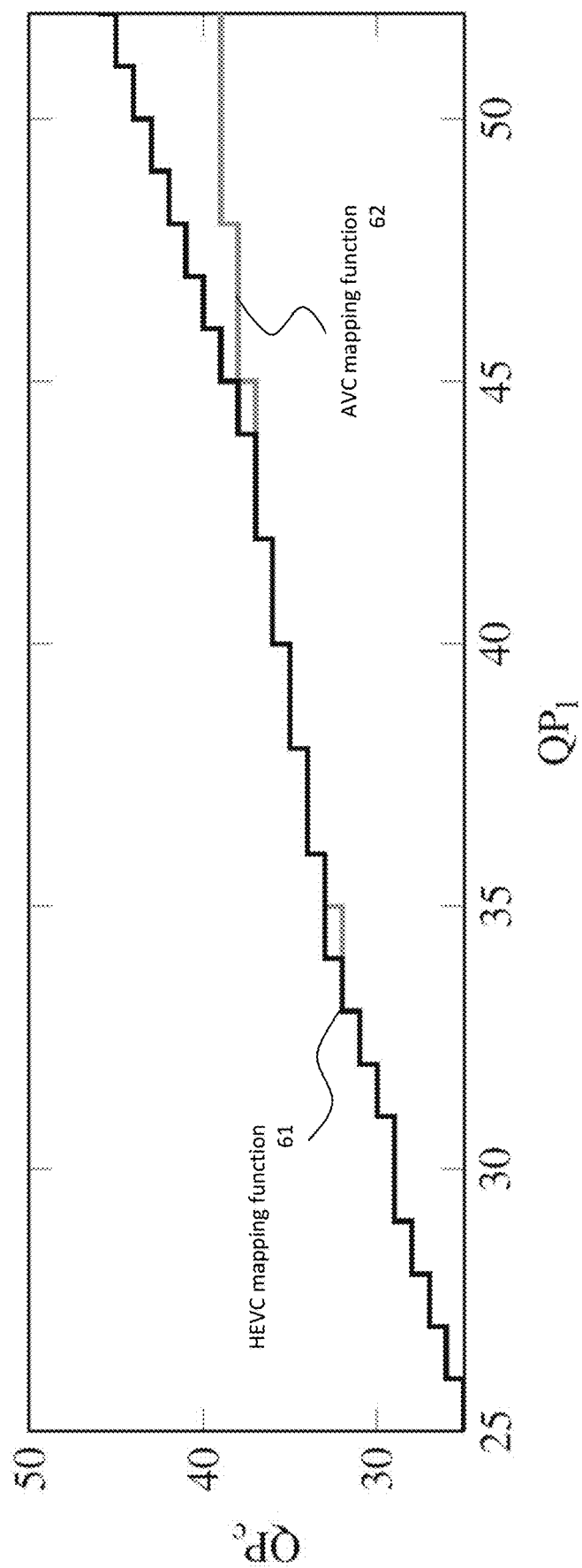
FIG. 6 is a schematic presentation of the mapping function of the quantization parameter index QPi to the chroma quantization parameter $QP_c$ for HEVC (black, 61) and H.264| AVC (gray, 62) according to [2]

Schematic presentation of the mapping of the quantization parameter index QPi to the chroma quantization parameter $QP_c$ for HEVC (black) and H.264| AVC (gray) is presented in FIG. 6.

In HEVC standard, a QP value for Luminance (or Luma) coding block (CB) is derived based on Predicted QP (qPY_PRED), which in its turn depends on CB location in frame/slice/tile. Then $Qp_Y$ variable is derived by following Equation 1:

$$Qp_Y=((qPY_{PRED}+CuQp\text{DeltaVal}+64+2*QpBd\text{OffsetY})\%(64+QpBd\text{OffsetY}))-QpBd\text{OffsetY} \quad \text{(Equation 1)}$$

where CuQpDeltaVal is a delta QP value which is signaled or derived for a coding unit (CU); QpBdOffsetY is a constant offset depended on Luma bit depth (From HEVC standard, this term corresponds to "the bit depth of the samples of the luma array"). Finally, quantization parameter $Qp_Y$ of the Luminance (or Luma) component may be calculated by following Equation 2:

$$Qp_Y'=Qp_y+QpBd\text{OffsetY} \quad \text{(Equation 2)}$$

The variables $qP_{Cb}$ and $qP_{Cr}$ are set equal to the value of QpC as specified in a mapping table (e.g. Table 1) based on the index qPi equal to qPiCb or qPiCr, respectively, and qPiCb and qPiCr are derived as follows by Equation 3:

$$qPi_{Cb} = \text{Clip3}(-QpBdOffsetC, 69, Qp_Y + \text{pps\_cb\_qp\_offset} + \text{slice\_cb\_qp\_offset}) \quad \text{(Equation 3)}$$

$$qPi_{Cr} = \text{Clip3}(-QpBdOffsetC, 69, Qp_Y + \text{pps\_cr\_qp\_offset} + \text{slice\_cr\_qp\_offset})$$

where QpBdOffsetC is a constant offset depended on Chroma bit depth(From HEVC standard, this term corresponds to "the bit depth of the samples of the Chroma array"); pps_cb_qp_offset or pps_cr_qp_offset is a fixed offset for Cb component or Cr component signaled by a picture parameter set (PPS), and slice_cb_qp_offset or slice_cr_qp_offset is a fixed offset for Cb component or Cr component which is signaled in a slice header.

$$\text{Clip3}(x, y, z) = \begin{cases} x; & z < x \\ y; & z > y \\ z; & \text{otherwise} \end{cases} \quad \text{Equation 4}$$

The Chroma quantization parameters for the Cb and Cr components ($Qp_{Cb}'$ and $Qp_{Cr}'$, are derived as follows Equation 5:

$$Qp'_{Cb} = qP_{Cb} + QpBdOffsetC \quad \text{Equation 5}$$

$$Qp'_{Cr} = qP_{Cr} + QpBdOffsetC$$

The variables $qP_{Cb}$ and $qP_{Cr}$ are set equal to the value of QPc as specified in Table 1 based on the index qPi equal to $qPi_{Cb}$ and $qPi_{Cr}$, respectively.

VVC is a newly developing standard in specification draft version 5 [ ] contains the following procedure to derive chroma quantization parameter:

When treeType is equal to DUAL_TREE_CHROMA, the variable $Qp_Y$ is set equal to the luma quantization parameter $Qp_Y$ of the luma coding unit that covers the luma location (xCb+cbWidth/2, yCb+cbHeight/2).

The variables $qP_{Cb}$, $qP_{Cr}$ and $qP_{CbCr}$ are derived as follows:

$$qPi_{Cb} = \text{Clip3}(-QpBdOffset_C, 69, Qp_Y + \text{pps\_cb\_qp\_offset} + \text{slice\_cb\_qp\_offset}) \quad (8\text{-}926)$$

$$qPi_{Cr} = \text{Clip3}(-QpBdOffset_C, 69, Qp_Y + \text{pps\_cr\_qp\_offset} + \text{slice\_cr\_qp\_offset}) \quad (8\text{-}927)$$

$$qPiCbCr = \text{Clip3}(-QpBdOffset_C, 69, Qp_Y + \text{pps\_joint\_cbcr\_qp\_offset} + \text{slice\_joint\_cb} \text{cr\_qp\_offset}) \quad (8\text{-}928)$$

If ChromaArrayType is equal to 1, the variables $qP_{Cb}$, $qP_{Cr}$ and $qP_{CbCr}$ are set equal to the value of $Qp_C$ as specified in $Qp'_{CbCr} = qP_{CbCr} + QpBdOffset_C$ (8-931) Table 2 based on the index qPi equal to $qPi_{Cb}$, $qPi_{Cr}$ and $qPi_{CbCr}$, respectively.

Otherwise, the variables $qP_{Cb}$, $qP_{Cr}$ and $qP_{CbCr}$ are set equal to Min(qPi, 63), based on the index qPi equal to $qPi_{Cb}$, $qPi_{Cr}$ and $qPi_{CbCr}$, respectively.

The chroma quantization parameters for the Cb and Cr components, $Qp'_{Cb}$ and $Qp'_{Cr}$, and joint Cb-Cr coding $Qp'_{CbCr}$ are derived as follows:

$$Qp'_{Cb} = qP_{Cb} + QpBdOffset_C \quad (8\text{-}929)$$

$$Qp'_{Cr} = qP_{Cr} + QpBdOffset_C \quad (8\text{-}930)$$

$$Qp'_{CbCr} = qP_{CbCr} + QpBdOffset_C \quad (8\text{-}931)$$

TABLE 2

Specification of Qpc as a function of qPi for ChromaArray Type equal to 1

| qPi | <30 | 30 | 31 | 32 | 33 | 34 | 35 | 36 | 37 | 38 | 39 | 40 | 41 | 42 | 43 | >43 |
|---|---|---|---|---|---|---|---|---|---|---|---|---|---|---|---|---|
| $Qp_C$ | = qPi | 29 | 30 | 31 | 32 | 33 | 33 | 34 | 34 | 35 | 35 | 36 | 36 | 37 | 37 | = qPi − 6 | where pps_cb_qp_offset and slice_cb_qp_offset are picture level and slice level chroma QP offset values signaled in the picture parameter set (PPS) and/or the slice header correspondingly.

Since chroma compression efficiency has been significantly improved in VVC due to including chroma dedicated coding tools like chroma separate tree and CCLM, the chroma Qp mapping function may require adjustment.

It can be seed that same chroma Qp mapping table (Table 2) as in HEVC standard (Table 1) is used. In contrast to HEVC $Qp'_{CbCr}$ is introduces besides of $Qp'_{Cb}$ and $Qp'_{Cr}$ to derive quantization parameters for blocks were Cb and Cr color components are jointly quantized. This $Qp'_{CbCr}$ parameter is also derived based on chroma Qp mapping function specified in Table 2.

Figure 10:
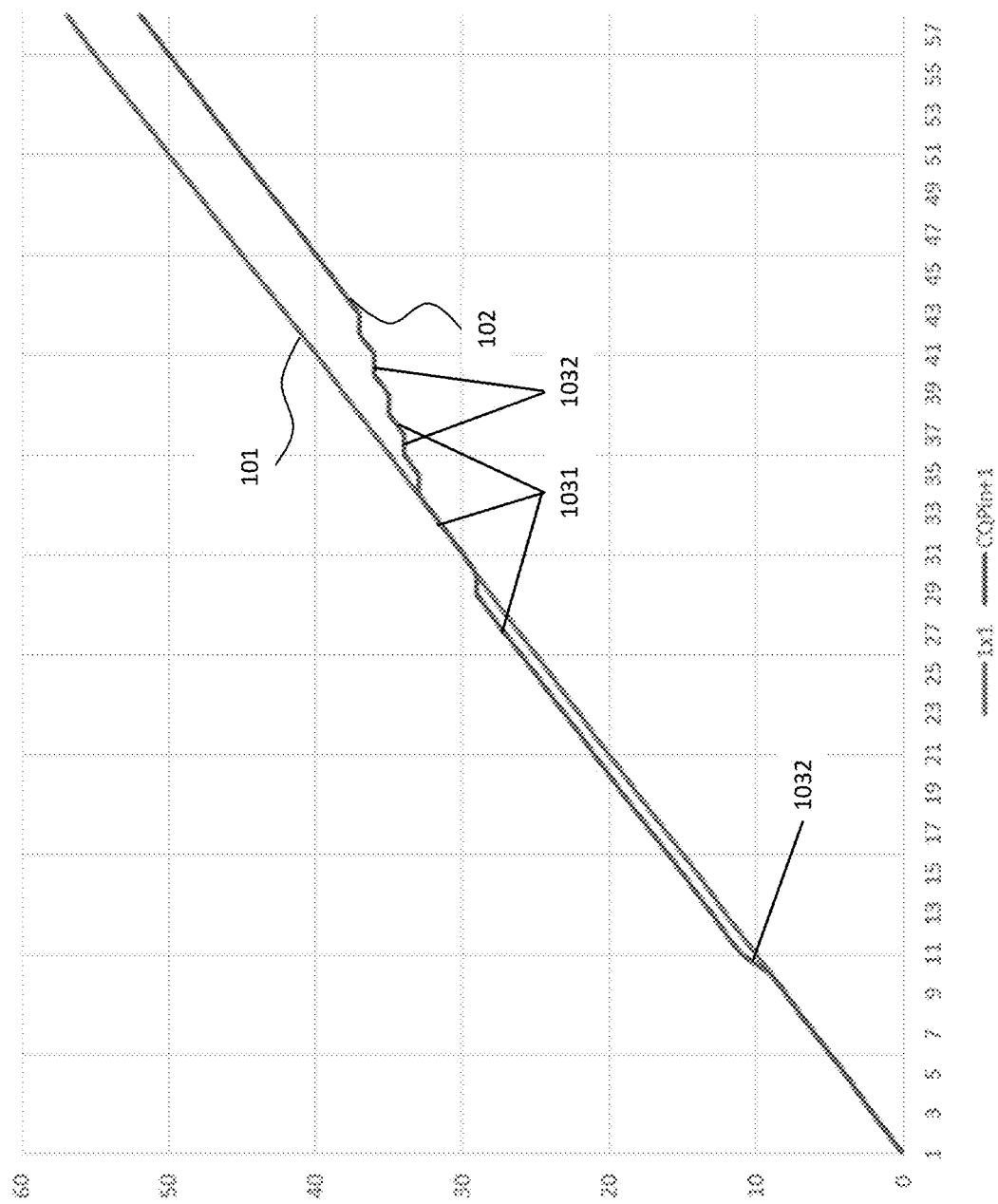
FIG. 10 is a schematic presentation of the HEVC mapping function of the quantization parameter index QPi to the chroma quantization parameter QPc for supported QP range, where 102 is HEVC mapping function with chroma Qp offset equal to 1 and 101 is 1-to-1 mapping function.

As described above the derivation of chroma QP value from the associated luma QP value can be adjusted by signaling different chroma QP offset values. A positive chroma QP offset value will result in a coarser quantizer for the associated chroma component. FIG. 10 illustrates and example of HEVC/VVC chroma Qp mapping function with chroma Qp offset equal to 1.

Embodiments of the video encoder 20 (respectively quantization unit 208) may be configured to output quantization parameters (QP), e.g. directly or encoded via the entropy encoding unit 270, so that, e.g., the video decoder 30 may receive and apply the quantization parameters for decoding.

Inverse Quantization

The inverse quantization unit 210 is configured to apply the inverse quantization of the quantization unit 208 on the quantized coefficients to obtain dequantized coefficients 211, e.g. by applying the inverse of the quantization scheme applied by the quantization unit 208 based on or using the same quantization step size as the quantization unit 208. The dequantized coefficients 211 may also be referred to as dequantized residual coefficients 211 and correspond —although typically not identical to the transform coefficients due to the loss by quantization—to the transform coefficients 207.

Inverse Transform

The inverse transform processing unit 212 is configured to apply the inverse transform of the transform applied by the transform processing unit 206, e.g. an inverse discrete cosine transform (DCT) or inverse discrete sine transform (DST) or other inverse transforms, to obtain a reconstructed residual block 213 (or corresponding dequantized coefficients 213) in the sample domain. The reconstructed residual block 213 may also be referred to as transform block 213.

Reconstruction

The reconstruction unit 214 (e.g. adder or summer 214) is configured to add the transform block 213 (i.e. reconstructed residual block 213) to the prediction block 265 to obtain a reconstructed block 215 in the sample domain, e.g. by adding—sample by sample—the sample values of the reconstructed residual block 213 and the sample values of the prediction block 265.

Filtering

The loop filter unit 220 (or short "loop filter" 220), is configured to filter the reconstructed block 215 to obtain a filtered block 221, or in general, to filter reconstructed samples to obtain filtered samples. The loop filter unit is, e.g., configured to smooth pixel transitions, or otherwise improve the video quality. The loop filter unit 220 may comprise one or more loop filters such as a de-blocking filter, a sample-adaptive offset (SAO) filter or one or more other filters, e.g. a bilateral filter, an adaptive loop filter (ALF), a sharpening, a smoothing filters or a collaborative filters, or any combination thereof. Although the loop filter unit 220 is shown in FIG. 2 as being an in loop filter, in other configurations, the loop filter unit 220 may be implemented as a post loop filter. The filtered block 221 may also be referred to as filtered reconstructed block 221.

Embodiments of the video encoder 20 (respectively loop filter unit 220) may be configured to output loop filter parameters (such as sample adaptive offset information), e.g. directly or encoded via the entropy encoding unit 270, so that, e.g., a decoder 30 may receive and apply the same loop filter parameters or respective loop filters for decoding.

Decoded Picture Buffer

The decoded picture buffer (DPB) 230 may be a memory that stores reference pictures, or in general reference picture data, for encoding video data by video encoder 20. The DPB 230 may be formed by any of a variety of memory devices, such as dynamic random access memory (DRAM), including synchronous DRAM (SDRAM), magnetoresistive RAM (MRAM), resistive RAM (RRAM), or other types of memory devices. The decoded picture buffer (DPB) 230 may be configured to store one or more filtered blocks 221. The decoded picture buffer 230 may be further configured to store other previously filtered blocks, e.g. previously reconstructed and filtered blocks 221, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter prediction. The decoded picture buffer (DPB) 230 may be also configured to store one or more unfiltered reconstructed blocks 215, or in general unfiltered reconstructed samples, e.g. if the reconstructed block 215 is not filtered by loop filter unit 220, or any other further processed version of the reconstructed blocks or samples.

Mode Selection (Partitioning & Prediction)

The mode selection unit 260 comprises partitioning unit 262, inter-prediction unit 244 and intra-prediction unit 254, and is configured to receive or obtain original picture data, e.g. an original block 203 (current block 203 of the current picture 17), and reconstructed picture data, e.g. filtered and/or unfiltered reconstructed samples or blocks of the same (current) picture and/or from one or a plurality of previously decoded pictures, e.g. from decoded picture buffer 230 or other buffers (e.g. line buffer, not shown) . . . The reconstructed picture data is used as reference picture data for prediction, e.g. inter-prediction or intra-prediction, to obtain a prediction block 265 or predictor 265.

Mode selection unit 260 may be configured to determine or select a partitioning for a current block prediction mode (including no partitioning) and a prediction mode (e.g. an intra or inter prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g. from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), i.e. select the prediction mode which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time.

In other words, the partitioning unit 262 may be configured to partition the block 203 into smaller block partitions or sub-blocks (which form again blocks), e.g. iteratively using quad-tree-partitioning (QT), binary partitioning (BT) or triple-tree-partitioning (TT) or any combination thereof, and to perform, e.g., the prediction for each of the block partitions or sub-blocks, where the mode selection comprises the selection of the tree-structure of the partitioned block 203 and the prediction modes are applied to each of the block partitions or sub-blocks.

In the following the partitioning (e.g. by partitioning unit 260) and prediction processing (by inter-prediction unit 244 and intra-prediction unit 254) performed by an example video encoder 20 will be explained in more detail.

Partitioning

The partitioning unit 262 may partition (or split) a current block 203 into smaller partitions, e.g. smaller blocks of square or rectangular size. These smaller blocks (which may also be referred to as sub-blocks) may be further partitioned into even smaller partitions. This is also referred to tree-partitioning or hierarchical tree-partitioning, where a root block, e.g. at root tree-level 0 (hierarchy-level 0, depth 0), may be recursively partitioned, e.g. partitioned into two or more blocks of a next lower tree-level, e.g. nodes at tree-level 1 (hierarchy-level 1, depth 1), where these blocks may be again partitioned into two or more blocks of a next lower level, e.g. tree-level 2 (hierarchy-level 2, depth 2), etc. until the partitioning is terminated, e.g. because a termination criterion is fulfilled, e.g. a maximum tree depth or minimum block size is reached. Blocks which are not further partitioned are also referred to as leaf-blocks or leaf nodes of the tree. A tree using partitioning into two partitions is referred to as binary-tree (BT), a tree using partitioning into three partitions is referred to as ternary-tree (TT), and a tree using partitioning into four partitions is referred to as quad-tree (QT).

As mentioned before, the term "block" as used herein may be a portion, in particular a square or rectangular portion, of a picture. With reference, for example, to HEVC and VVC, the block may be or correspond to a coding tree unit (CTU), a coding unit (CU), prediction unit (PU), and transform unit (TU) and/or to the corresponding blocks, e.g. a coding tree block (CTB), a coding block (CB), a transform block (TB) or prediction block (PB).

For example, a coding tree unit (CTU) may be or comprise a CTB of luma samples, two corresponding CTBs of chroma samples of a picture that has three sample arrays, or a CTB of samples of a monochrome picture or a picture that is coded using three separate colour planes and syntax structures used to code the samples. Correspondingly, a coding tree block (CTB) may be an N×N block of samples for some value of N such that the division of a component into CTBs is a partitioning. A coding unit (CU) may be or comprise a coding block of luma samples, two corresponding coding blocks of chroma samples of a picture that has three sample arrays, or a coding block of samples of a monochrome picture or a picture that is coded using three separate colour planes and syntax structures used to code the samples. Correspondingly a coding block (CB) may be an M×N block of samples for some values of M and N such that the division of a CTB into coding blocks is a partitioning.

In embodiments, e.g., according to HEVC, a coding tree unit (CTU) may be split into CUs by using a quad-tree structure denoted as coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU.

In embodiments, e.g., according to the latest video coding standard currently in development, which is referred to as Versatile Video Coding (VVC), a combined Quad-tree and binary tree (QTBT) partitioning is for example used to partition a coding block. In the QTBT block structure, a CU can have either a square or rectangular shape. For example, a coding tree unit (CTU) is first partitioned by a quadtree structure. The quadtree leaf nodes are further partitioned by a binary tree or ternary (or triple) tree structure. The partitioning tree leaf nodes are called coding units (CUs), and that segmentation is used for prediction and transform processing without any further partitioning. This means that the CU, PU and TU have the same block size in the QTBT coding block structure. In parallel, multiple partition, for example, triple tree partition may be used together with the QTBT block structure.

In one example, the mode selection unit 260 of video encoder 20 may be configured to perform any combination of the partitioning techniques described herein.

As described above, the video encoder 20 is configured to determine or select the best or an optimum prediction mode from a set of (e.g. pre-determined) prediction modes. The set of prediction modes may comprise, e.g., intra-prediction modes and/or inter-prediction modes.

Intra-Prediction

The set of intra-prediction modes may comprise 35 different intra-prediction modes, e.g. non-directional modes like DC (or mean) mode and planar mode, or directional modes, e.g. as defined in HEVC, or may comprise 67 different intra-prediction modes, e.g. non-directional modes like DC (or mean) mode and planar mode, or directional modes, e.g. as defined for VVC.

The intra-prediction unit 254 is configured to use reconstructed samples of neighboring blocks of the same current picture to generate an intra-prediction block 265 according to an intra-prediction mode of the set of intra-prediction modes.

The intra prediction unit 254 (or in general the mode selection unit 260) is further configured to output intra-prediction parameters (or in general information indicative of the selected intra prediction mode for the block) to the entropy encoding unit 270 in form of syntax elements 266 for inclusion into the encoded picture data 21, so that, e.g., the video decoder 30 may receive and use the prediction parameters for decoding.

Inter-Prediction

The set of (or possible) inter-prediction modes depends on the available reference pictures (i.e. previous at least partially decoded pictures, e.g. stored in DBP 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel and/or quarter-pel interpolation, or not.

Additional to the above prediction modes, skip mode and/or direct mode may be applied.

The inter prediction unit 244 may include a motion estimation (ME) unit and a motion compensation (MC) unit (both not shown in FIG. 2). The motion estimation unit may be configured to receive or obtain the picture block 203 (current picture block 203 of the current picture 17) and a decoded picture 231, or at least one or a plurality of previously reconstructed blocks, e.g. reconstructed blocks of one or a plurality of other/different previously decoded pictures 231, for motion estimation. E.g. a video sequence may comprise the current picture and the previously decoded pictures 231, or in other words, the current picture and the previously decoded pictures 231 may be part of or form a sequence of pictures forming a video sequence.

The encoder 20 may, for example, be configured to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter prediction parameters to the motion estimation unit. This offset is also called motion vector (MV).

The motion compensation unit is configured to obtain, e.g. receive, an inter prediction parameter and to perform inter prediction based on or using the inter prediction parameter to obtain an inter prediction block 265. Motion compensation, performed by the motion compensation unit, may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists.

The motion compensation unit may also generate syntax elements associated with the blocks and video slices for use by video decoder 30 in decoding the picture blocks of the video slice. In addition or as an alternative to slices and respective syntax elements, tile groups and/or tiles and respective syntax elements may be generated or used.

Entropy Coding

The entropy encoding unit 270 is configured to apply, for example, an entropy encoding algorithm or scheme (e.g. a variable length coding (VLC) scheme, an context adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding or another entropy encoding methodology or technique) or bypass (no compression) on the quantized coefficients 209, inter prediction parameters, intra prediction parameters, loop filter parameters and/or other syntax elements to obtain encoded picture data 21 which can be output via the output 272, e.g. in the form of an encoded bitstream 21, so that, e.g., the video decoder 30 may receive and use the parameters for decoding. The encoded bitstream 21 may be transmitted to video decoder 30, or stored in a memory for later transmission or retrieval by video decoder 30.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

Decoder and Decoding Method

FIG. 3 shows an example of a video decoder 30 that is configured to implement the techniques of this present application. The video decoder 30 is configured to receive encoded picture data 21 (e.g. encoded bitstream 21), e.g. encoded by encoder 20, to obtain a decoded picture 331. The encoded picture data or bitstream comprises information for decoding the encoded picture data, e.g. data that represents picture blocks of an encoded video slice (and/or tile groups or tiles) and associated syntax elements.

In the example of FIG. 3, the decoder 30 comprises an entropy decoding unit 304, an inverse quantization unit 310, an inverse transform processing unit 312, a reconstruction unit 314 (e.g. a summer 314), a loop filter 320, a decoded picture buffer (DBP) 330, a mode application unit 360, an inter prediction unit 344 and an intra prediction unit 354. Inter prediction unit 344 may be or include a motion compensation unit. Video decoder 30 may, in some examples, perform a decoding pass generally reciprocal to the encoding pass described with respect to video encoder 100 from FIG. 2.

As explained with regard to the encoder 20, the inverse quantization unit 210, the inverse transform processing unit 212, the reconstruction unit 214 the loop filter 220, the decoded picture buffer (DPB) 230, the inter prediction unit 344 and the intra prediction unit 354 are also referred to as forming the "built-in decoder" of video encoder 20. Accordingly, the inverse quantization unit 310 may be identical in function to the inverse quantization unit 110, the inverse transform processing unit 312 may be identical in function to the inverse transform processing unit 212, the reconstruction unit 314 may be identical in function to reconstruction unit 214, the loop filter 320 may be identical in function to the loop filter 220, and the decoded picture buffer 330 may be identical in function to the decoded picture buffer 230. Therefore, the explanations provided for the respective units and functions of the video 20 encoder apply correspondingly to the respective units and functions of the video decoder 30.

Entropy Decoding

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters (not shown in FIG. 3), e.g. any or all of inter prediction parameters (e.g. reference picture index and motion vector), intra prediction parameter (e.g. intra prediction mode or index), transform parameters, quantization parameters, loop filter parameters, and/or other syntax elements. Entropy decoding unit 304 maybe configured to apply the decoding algorithms or schemes corresponding to the encoding schemes as described with regard to the entropy encoding unit 270 of the encoder 20. Entropy decoding unit 304 may be further configured to provide inter prediction parameters, intra prediction parameter and/or other syntax elements to the mode application unit 360 and other parameters to other units of the decoder 30. Video decoder 30 may receive the syntax elements at the video slice level and/or the video block level. In addition or as an alternative to slices and respective syntax elements, tile groups and/or tiles and respective syntax elements may be received and/or used.

Inverse Quantization

The inverse quantization unit 310 may be configured to receive quantization parameters (QP) (or in general information related to the inverse quantization) and quantized coefficients from the encoded picture data 21 (e.g. by parsing and/or decoding, e.g. by entropy decoding unit 304) and to apply based on the quantization parameters an inverse quantization on the decoded quantized coefficients 309 to obtain dequantized coefficients 311, which may also be referred to as transform coefficients. The inverse quantization process may include use of a quantization parameter determined by video encoder 20 for each video block in the video slice (or tile or tile group) to determine a degree of quantization and, likewise, a degree of inverse quantization that should be applied.

Inverse Transform

Inverse transform processing unit 312 may be configured to receive dequantized coefficients 311, also referred to as transform coefficients, and to apply a transform to the dequantized coefficients 311 in order to obtain reconstructed residual blocks 213 in the sample domain. The reconstructed residual blocks 213 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g. by parsing and/or decoding, e.g. by entropy decoding unit 304) to determine the transform to be applied to the dequantized coefficients 311.

Reconstruction

The reconstruction unit 314 (e.g. adder or summer 314) may be configured to add the reconstructed residual block 313, to the prediction block 365 to obtain a reconstructed block 315 in the sample domain, e.g. by adding the sample values of the reconstructed residual block 313 and the sample values of the prediction block 365.

Filtering

The loop filter unit 320 (either in the coding loop or after the coding loop) is configured to filter the reconstructed block 315 to obtain a filtered block 321, e.g. to smooth pixel transitions, or otherwise improve the video quality. The loop filter unit 320 may comprise one or more loop filters such as a de-blocking filter, a sample-adaptive offset (SAO) filter or one or more other filters, e.g. a bilateral filter, an adaptive loop filter (ALF), a sharpening, a smoothing filters or a collaborative filters, or any combination thereof. Although the loop filter unit 320 is shown in FIG. 3 as being an in loop filter, in other configurations, the loop filter unit 320 may be implemented as a post loop filter.

Decoded Picture Buffer

The decoded video blocks 321 of a picture are then stored in decoded picture buffer 330, which stores the decoded pictures 331 as reference pictures for subsequent motion compensation for other pictures and/or for output respectively display.

The decoder 30 is configured to output the decoded picture 311, e.g. via output 312, for presentation or viewing to a user.

Prediction

The inter prediction unit 344 may be identical to the inter prediction unit 244 (in particular to the motion compensation unit) and the intra prediction unit 354 may be identical to the inter prediction unit 254 in function, and performs split or partitioning decisions and prediction based on the partitioning and/or prediction parameters or respective information received from the encoded picture data 21 (e.g. by parsing and/or decoding, e.g. by entropy decoding unit 304). Mode application unit 360 may be configured to perform the prediction (intra or inter prediction) per block based on reconstructed pictures, blocks or respective samples (filtered or unfiltered) to obtain the prediction block 365.

When the video slice is coded as an intra coded (I) slice, intra prediction unit 354 of mode application unit 360 is configured to generate prediction block 365 for a picture block of the current video slice based on a signaled intra prediction mode and data from previously decoded blocks of the current picture. When the video picture is coded as an inter coded (i.e., B, or P) slice, inter prediction unit 344 (e.g. motion compensation unit) of mode application unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Mode application unit 360 is configured to determine the prediction information for a video block of the current video slice by parsing the motion vectors or related information and other syntax elements, and uses the prediction information to produce the prediction blocks for the current video block being decoded. For example, the mode application unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Embodiments of the video decoder 30 as shown in FIG. 3 may be configured to partition and/or decode the picture by using slices (also referred to as video slices), where a picture may be partitioned into or decoded using one or more slices (typically non-overlapping), and each slice may comprise one or more blocks (e.g. CTUs).

Embodiments of the video decoder 30 as shown in FIG. 3 may be configured to partition and/or decode the picture by using tile groups (also referred to as video tile groups) and/or tiles (also referred to as video tiles), where a picture may be partitioned into or decoded using one or more tile groups (typically non-overlapping), and each tile group may comprise, e.g. one or more blocks (e.g. CTUs) or one or more tiles, where each tile, e.g. may be of rectangular shape and may comprise one or more blocks (e.g. CTUs), e.g. complete or fractional blocks.

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

It should be understood that, in the encoder 20 and the decoder 30, a processing result of a current step may be further processed and then output to the next step. For example, after interpolation filtering, motion vector derivation or loop filtering, a further operation, such as Clip or shift, may be performed on the processing result of the interpolation filtering, motion vector derivation or loop filtering.

It should be noted that further operations may be applied to the derived motion vectors of current block (including but not limit to control point motion vectors of affine mode, sub-block motion vectors in affine, planar, ATMVP modes, temporal motion vectors, and so on). For example, the value of motion vector is constrained to a predefined range according to its representing bit. If the representing bit of motion vector is bitDepth, then the range is −2^(bitDepth-1)~2 (bitDepth-1)-1, where "^" means exponentiation. For example, if bitDepth is set equal to 16, the range is −32768~32767; if bitDepth is set equal to 18, the range is −131072-131071. For example, the value of the derived motion vector (e.g. the MVs of four 4×4 sub-blocks within one 8×8 block) is constrained such that the max difference between integer parts of the four 4×4 sub-block MVs is no more than N pixels, such as no more than 1 pixel. Here provides two methods for constraining the motion vector according to the bitDepth.

Method 1: remove the overflow MSB (most significant bit) by flowing operations $$ux = (mvx + 2^{bitDepth})\% \; 2^{bitDepth} \tag{1}$$

$$mvx = (ux >= 2^{bitDepth-1})?(ux - 2^{bitDepth}):ux \tag{2}$$

$$uy = (mvy + 2^{bitDepth})\% \; 2^{bitDepth} \tag{3}$$

$$mvy = (uy >= 2^{bitDepth-1})?(uy - 2^{bitDepth}):uy \tag{4}$$

where mvx is a horizontal component of a motion vector of an image block or a sub-block, mvy is a vertical component of a motion vector of an image block or a sub-block, and ux and uy indicates an intermediate value;

For example, if the value of mvx is −32769, after applying formula (1) and (2), the resulting value is 32767. In computer system, decimal numbers are stored as two's complement. The two's complement of −32769 is 1,0111,1111, 1111,1111 (17 bits), then the MSB is discarded, so the resulting two's complement is 0111,1111,1111,1111 (decimal number is 32767), which is same as the output by applying formula (1) and (2).

$$ux = (mvpx + mvdx + 2^{bitDepth})\% \; 2^{bitDepth} \tag{5}$$

$$mvx = (ux >= 2^{bitDepth-1})?(ux - 2^{bitDepth}):ux \tag{6}$$

-continued
$$uy = (mvpy + mvdy + 2^{bitDepth})\% \ 2^{bitDepth} \quad (7)$$

$$mvy = (uy >= 2^{bitDepth-1})?(uy - 2^{bitDepth}): uy \quad (8)$$

The operations may be applied during the sum of mvp and mvd, as shown in formula (5) to (8).

Method 2: remove the overflow MSB by clipping the value $$vx = \text{Clip3}(-2^{bitDepth-1}, 2^{bitDepth-1} - 1, vx)$$

$$vy = \text{Clip3}(-2^{bitDepth-1}, 2^{bitDepth-1} - 1, vy)$$

where vx is a horizontal component of a motion vector of an image block or a sub-block, vy is a vertical component of a motion vector of an image block or a sub-block; x, y and z respectively correspond to three input value of the MV clipping process, and the definition of function Clip3 is as follow:

$$\text{Clip3}(x, y, z) = \begin{cases} x; & z < x \\ y; & z > y \\ z; & \text{otherwise} \end{cases}$$

Figure 4:
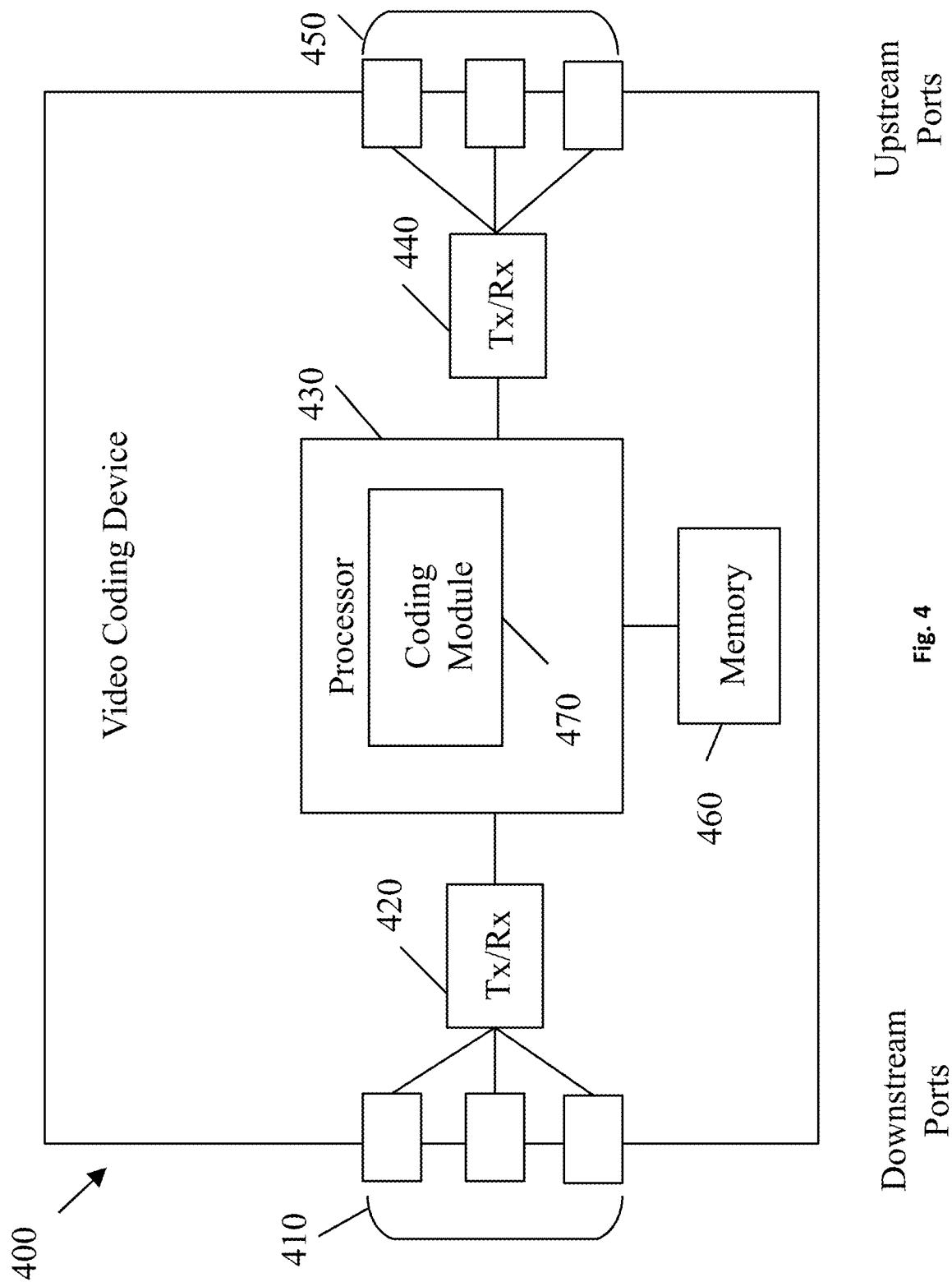
FIG. 4 is a block diagram illustrating an example of an encoding apparatus or a decoding apparatus.

FIG. 4 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A.

The video coding device 400 comprises ingress ports 410 (or input ports 410) and receiver units (Rx) 420 for receiving data; a processor, logic unit, or central processing unit (CPU) 430 to process the data; transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 can be implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

Figure 5:
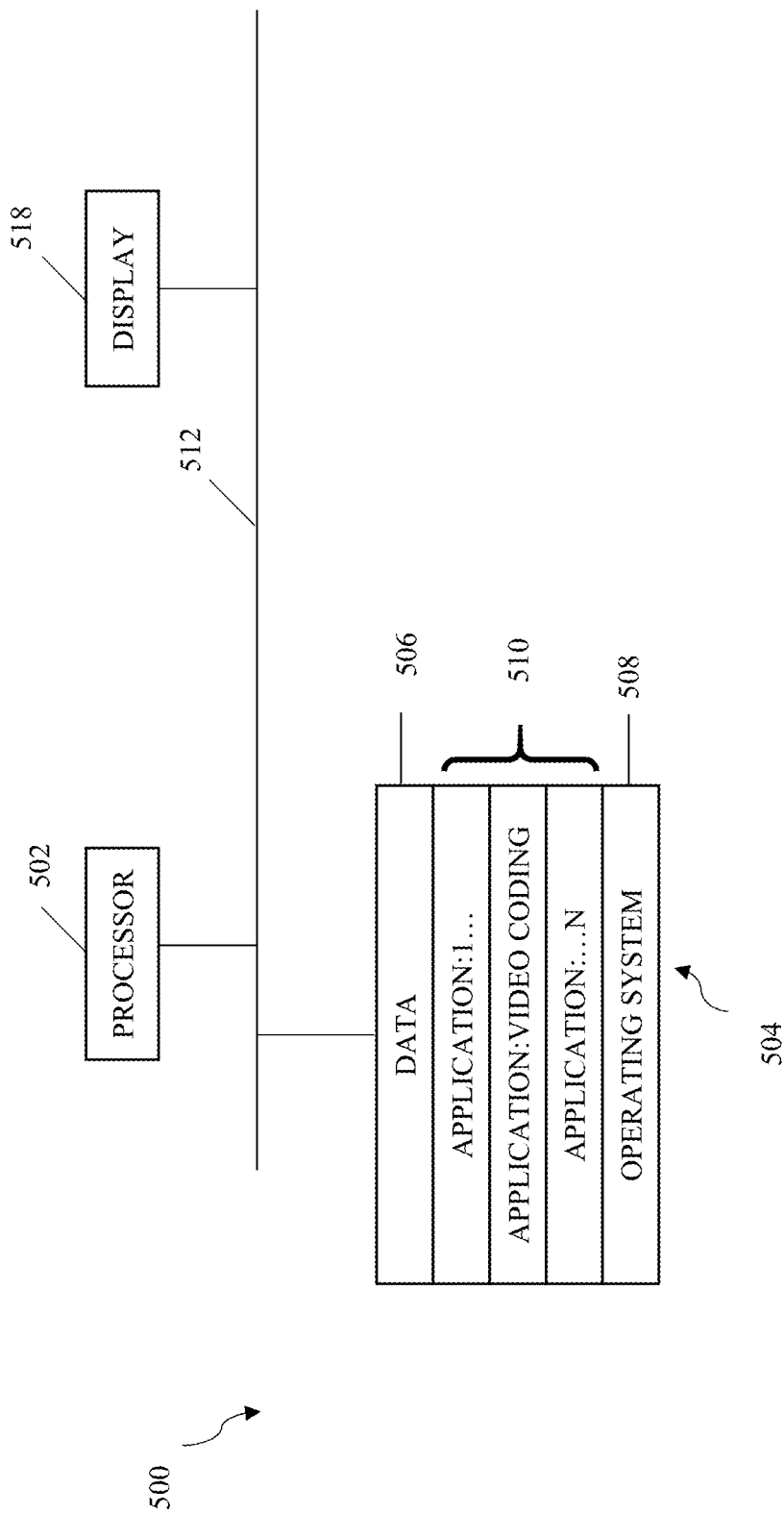
FIG. 5 is a block diagram illustrating another example of an encoding apparatus or a decoding apparatus.

FIG. 5 is a simplified block diagram of an apparatus 500 that may be used as either or both of the source device 12 and the destination device 14 from FIG. 1 according to an exemplary embodiment.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

The Versatile Video coding (VVC) is a newly developing standard that will code both Standard Dynamic Range and High Dynamic Range video content. High-dynamic-range video (HDR video) describes video having a dynamic range greater than that of standard-dynamic-range video (SDR video). Key characteristics of HDR video are brighter whites, deeper blacks, and at least a 10-bit color depth (compared to 8-bit for SDR video) in order to maintain precision across this extended range. While technically distinct, the term "HDR video" is commonly understood to imply wide color gamut as well.

At the moment SDR and HDR are commercially deployed and will coexist for a long time. SDR content is typically coded as Non-Constant Luminance (NCL) Y'CbCr gamma in a BT. 709 or BT. 2020 container. HDR content is typically coded as NCL Y'CbCr PQ, Constant Luminance ICtCp PQ, or NCL Y'CbCr HLG in a BT.2020/BT. 2100 container. In the current VVC specification, only one mapping table for mapping luma to chroma quantization parameter specified (Table 1). The table was inherited from HEVC and designed only for SDR content. As it reported in [3] using of default QpC table results in chroma artefacts at low bitrate, especially in achromatic regions. This document proposes to add chroma mapping table(s) specific for HDR content.

Considering that newly developed standard will be deployed for several years and variability of processed signal types may be increased it may be desirable to have flexibility in mapping table specification. Moreover, using content specific chroma QP mapping table can brings more options for encoder optimization. Straightforward solution is to specify mapping table at the picture/slice/tile group level. However, considering that QP range supported by the codec can be wide enough (e.g. in VVC it is in the range of 0 to 63) direct table specification may consume significant amount of bits. The methods for signaling of chroma QP mapping table allowing to reduce bit consumption is further described. It should be further understood that relation between luma QP and chroma QP can be expressed either as a function or as table representation, here and after mapping table and mapping function are used as synonyms.

Figure 7:
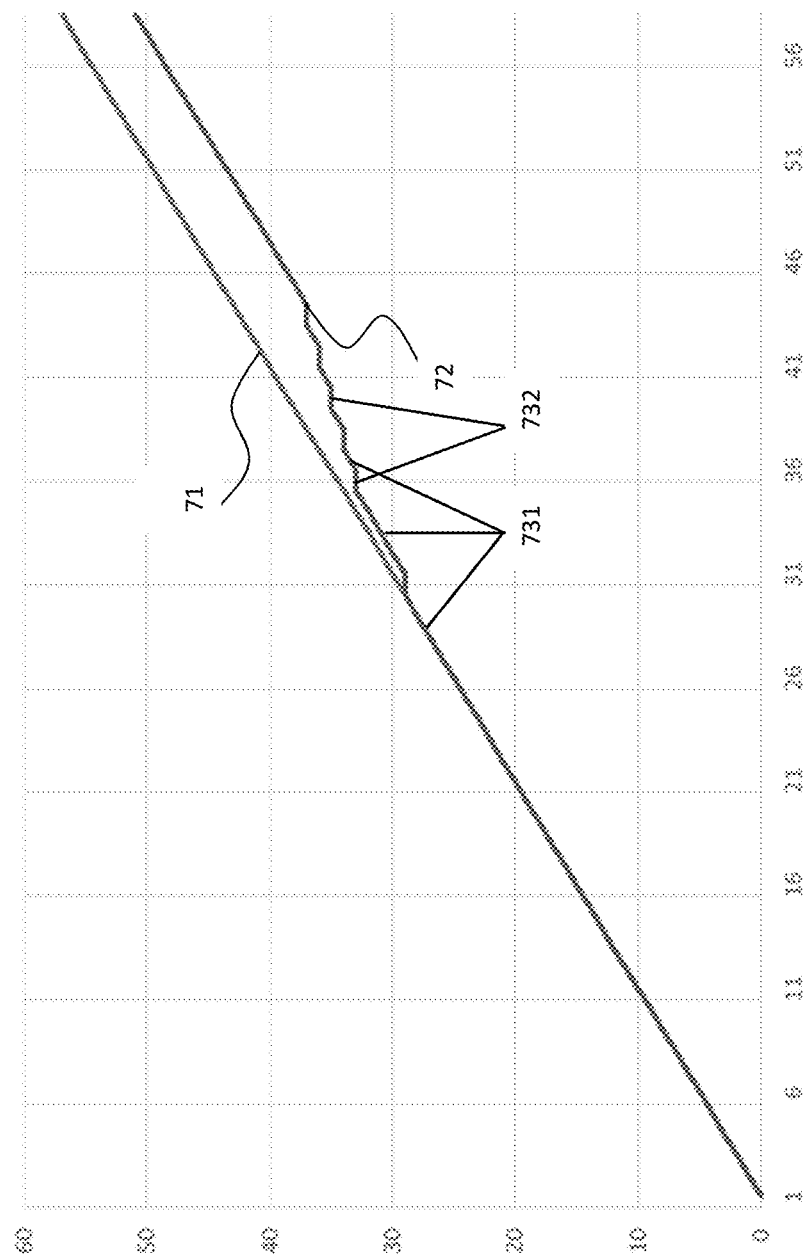
FIG. 7 is a schematic presentation of the HEVC mapping function of the quantization parameter index QPi to the chroma quantization parameter QPc for supported QP range, where 72 is HEVC mapping function and 71 is 1-to-1 mapping function

FIG. 7 is a schematic presentation of the HEVC mapping function of the quantization parameter index QPi to the chroma quantization parameter QPc for supported QP range, where 72 is HEVC mapping function and 71 is 1-to-1 mapping function.

According to a first embodiment of the disclosure the luma-to-chroma mapping function is monotonically increasing (non-decreasing) function which is divided on regions of two classes. Class A are flat regions (732), where function is non-increasing (or flat), i.e. $f(x)-f(x-1)=0$, and class B regions, where function is increasing (731), i.e. $f(x)-f(x-1)=c$, where c is function of x and $c(x)>1$, in more specific case in class B regions function has incensement 1 for each consecutive input arguments, i.e. $f(x)-f(x-1)=1$. Set X of input argument values x is divided on two non-overlapping sets. Set A corresponds to function values from non-increasing regions (class A). Set B corresponds to function values from increasing regions (class B). It should be noted that X=A+B.

Figure 8:
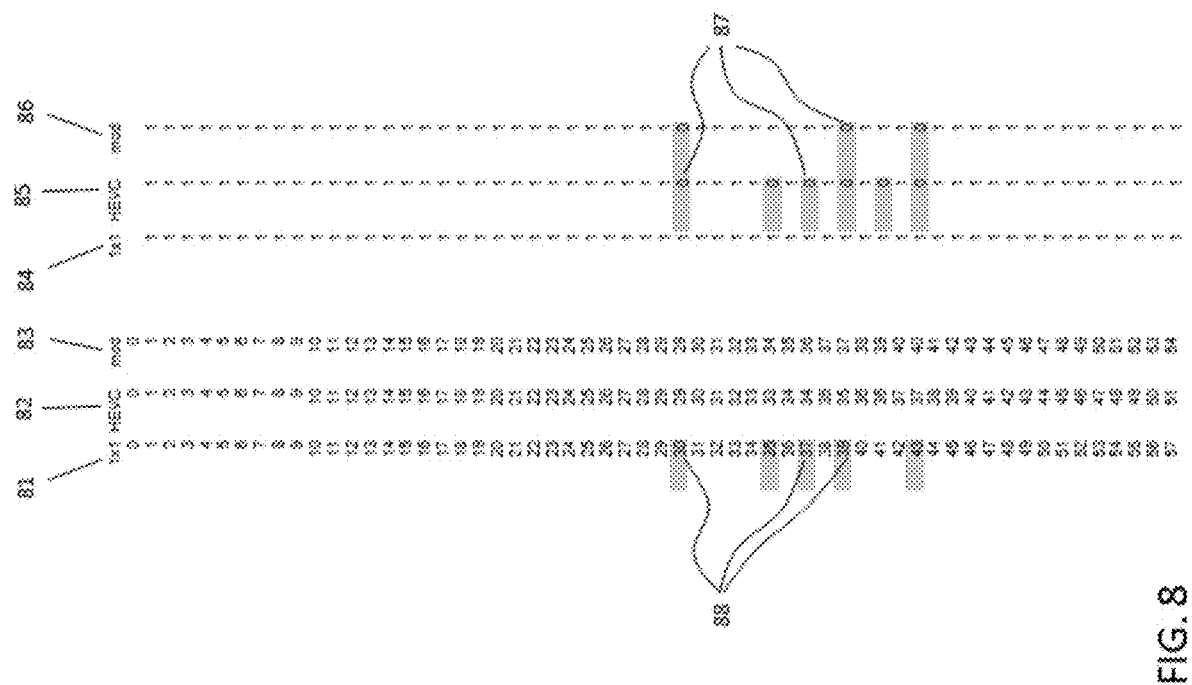
FIG. 8 is a table presentation of the mapping function of the quantization parameter index QPi to the chroma quantization parameter QPc for HEVC (82) and modified mapping function (83), table 81 represent monastically increasing 1-to-1 function, tables 84, 85, 86 represents difference between current and previous value of 1-to-1 function (81), HEVC mapping function (82) and modified mapping function (83) correspondingly, where 87 denotes exemplary points where difference is zero.

FIG. 8 represents an exemplary mapping table pointing examples of function delta values equal to zero (87), i.e. flat regions, and corresponding argument values x (88). For example, for HEVC mapping table 82 set A consists of values 30, 35, 37, 39, 41 and 43. For another exemplary modified mapping table 83 the set A consists of values 30, 39, 43 (or 35, 39, 43). According to the first embodiment the set A is signaled in the bitstream and decoder constructs mapping function e.g. in table form according to the information about set A obtained from bitstream. Since set B can be derived as B=X-A, where X e.g. is a set of QP range supported by decoder (e.g. 0 to 63), and mapping function behavior is defined for input arguments of set A and B the mapping function can be constructed e.g. in a table form using following exemplary pseudo code taking an assumption that first value of mapping function corresponding to x=0 is 0:

```
chroma_qp_mapping_table[0] = 0;          // initialization
for (i = 1; i <= maxQP; i++)             // maxQP is maximum QP supported by decoder
{
  int incStep = 1;                       // function increment for set B
  for (j = 0; j < cQpFlatSize; j++) // cQpFlatSize is size of set A
  {
    if (i == cQpFlat[j])                 // cQpFlat array with elements of set A
    {
      incStep = 0;                       // zero function increment for set A (flat)
      break;
    }
  }
  chroma_qp_mapping_table[i] = chroma_qp_mapping_table[i-1] + incStep;
}.
```

Below is another exemplary pseudo code demonstrating how one certain QPc can be calculated based on given QP index QPi:

```
int getQPc(int QPi)
{
  int QPi=i;
  int sum=0;
  for (int j=0; j<cQpFlatSize; j++)
  { sum=sum+(cQpFlat[j]<=QPi? 1:0);

} int QPc=QPi-sum;

return QPc
}
```

It should be noted that in some implementation set X may be a subset of QP range supported by the decoder. That subset can be predefined or signaled in the bitstream.

It should be noted that definition of a flat (non-increasing) regions of the mapping function can also be given in a form using current and next input argument value, i.e. $f(x+1) -f(x)=0$. It is understood that such definition does not change logic of signaling and obtaining mapping function. The same effect can be achieved e.g. by putting values x+1 into set A.

Since points of mapping function are classified on two classes of defined behavior, and number of points where mapping function is non-increasing is limited the signaling overhead is reduced in comparison to direct signaling of each value of mapping function.

To obtain set A on decoder side the bitstream comprises information about size (number of elements) and element values of the set.

According to the first aspect of the embodiment the size of set A (sizeA) directly signaled in the bitstream using one of appropriate codes e.g. binary, unary, truncated unary, truncated binary, Golomb or Exp-Golomb code. In some implementation having restriction that set A has non-zero size the value sizeA-1 is signaled in the bitstream. That allows saving one bit of signaling.

According to the second aspect of the embodiment the values of elements of set A (e.g. 30, 39, 43) are directly signaled in the bitstream using one of appropriate codes e.g. binary, unary, truncated unary, truncated binary, Golomb or Exp-Golomb code. The corresponding mapping function can be expressed as a table in a following exemplary form:

| qPi | <30 | 30 | 31 | 32 | 33 | 34 | 35 | 36 | 37 | 38 | 39 | 40 | 41 | 42 | 43 | >43 |
|---|---|---|---|---|---|---|---|---|---|---|---|---|---|---|---|---|
| QpC | = qPi | 29 | 30 | 31 | 32 | 33 | 34 | 35 | 36 | 37 | 37 | 38 | 39 | 40 | 40 | = qPi − 3 |

It should be understood that this mentioned above table can be used to specify default mapping function when signaling of mapping table via bitstream is not enabled or event not supported by the encoder/decoder.

In another embodiment according to the second aspect, the values of elements of set A are equal to (35, 39, 43). The corresponding mapping function can be expressed as a table in a following exemplary form:

| qPi | <35 | 35 | 36 | 37 | 38 | 39 | 40 | 41 | 42 | 43 | >43 |
|---|---|---|---|---|---|---|---|---|---|---|---|
| $Qp_C$ | = qPi | 34 | 35 | 36 | 37 | 37 | 38 | 39 | 40 | 40 | = qPi − 3 |

It should be understood that this mentioned above table can be used to specify default mapping function when signaling of mapping table via bitstream is not enabled or event not supported by the encoder/decoder.

According to the third aspect, a differences (delta_$a_i$) between values of current ($a_i$) and previous ($a_{i-1}$) element are signaled for each element except of first one (e.g. delta_$a_i=a_i-a_{i+1}$, for i>0). Having ordered set A allows to exclude negative differences and save signaling on sign bit. Moreover, knowing that element values in the set A are unique (non-repeating) ensures that delta_$a_i$ always more than zero, that allows to signal delta_$a_{i-1}$ in the bitstream providing additional reducing of the signaling overhead.

The first value of set A $a_0$ is signaled as a difference with some starting_point_value, where starting_point_value is either signaled in the bitstream or is a some predefined value, e.g. 0, 21, 30, maxQP>>1, where maxQP is the maximum QP value supported by the decoder, e.g. 63, the starting_point_value may also depend on content type (e.g. SDR or HDR). The difference delta_$a_0$ is signaled according to method described above.

Below is an example of syntax table and corresponding semantics for signaling method described above.

|  | Descriptor |
|---|---|
| cqp_mapping_set( ) { |  |
|   cqp_flat_points_minus1 | ue(v) |
|   cqp_delta_fp0 | ue(v) |
|   for (i = 1; i <= cqp_flat_points_minus1; i++ ) { |  |
|     cqp_delta_fp_minus1[ i ] | ue(v) |
|   } |  |
| } |  |

Chroma QP Mapping Data Semantics:

cqp_flat_points_minus1 plus 1 specifies the number of points of where mapping function is non-increasing.

cqp_delta_fp0 specifies the delta value between first element of set of points where mapping function is non-increasing and starting_point_value, where starting_point_value equals to 21 (in another possible implementation starting_point_value maybe e.g. 0, or 26, or 32, or defined based on supported QP range e.g. as maxQP/2). cqp_delta_fp_minus1[i ] plus 1 specifies the delta value between i-th and (i−1)-th element of set of points where mapping function is non-increasing.

The variable cQpFlatSize is derived as follows:

$cQp$FlatSize=$cqp$_flat_points_minus1+1

The variable cQpFlat[ ] is derived as follows:

$cQp$Flat[0 ]=$cqp$_delta_$fp$0+starting_point_value;

for(i=1; i<cQpFlatSize; i++) {

$cQp$Flat[i]=$cqp$_delta_$fp$_minus1[i]+1+$cQp$Flat[i−1 ]

}

The chroma QP mapping table cqpMappingTable[ ], is derived as follows:

cqpMappingTable [0 ]=0;

for(i=1; i<=maxQP; i++) { incStep=1 for (j=0;j<cQpFlatSize; j++)

{ if(i==cQpFlat[j])

{ incStep=0

}

}

$cqp$MappingTable [i]=$cqp$MappingTable [i−1]+incStep;

} where maxQP is a maximum supported QP.

In an embodiment, when starting_point_value is 0, cqp_delta_fp0 specifies the value of first element of set of points where mapping function is non-increasing Alternative semantics for getting same result and allowing to obtain QPc based on some certain QP index QPi is as follows:

sum=0 for (j=0;j<cQpFlatSize; j++){ sum=sum+($cQp$Flat[j]<=$QPi$? 1:0)

}

$QPc=QPi$-sum

In an embodiment where starting_point_value is 0 may have a following syntax and semantics:

|  | Descriptor |
|---|---|
| cqp_mapping_data( ) { |  |
|   cqp_flat_points_minus1 | ue(v) |
|   cqp_fp0 | ue(v) |
|   for ( i = 1; i <= cqp_flat_points_minus1; i++ ) { |  |
|     cqp_delta_fp_minus1[ i ] | ue(v) |
|   } |  |
| } |  |

Or as an alternative example:

|  | Descriptor |
|---|---|
| seq_parameter_set_rbsp( ) { |  |
|   sps_decoding_parameter_set_id | u(4) |
|   ... |  |
|   chroma_qp_mapping_flag | u(1) |
|   if( chroma_qp_mapping_flag ) |  |
|     cqp_flat_points_minus1 | ue(v) |
|     cqp_fp0 | ue(v) |

-continued

| | Descriptor |
|---|---|
| for ( i = 1; i <= cqp_flat_points_minus1; i++ ) {<br>  cqp_delta_fp_minus1[ i ] | ue(v) |
| ...<br>} | | chroma qp_mapping_flag equal to 1 specifies that chroma Qp mapping table is signaled and overrides Table 2 which is used to derive $Qp_C$. chroma qp_mapping_flag equal to 0 specifies that default chroma Qp mapping table specified in Table 2 is used to derive $Qp_C$. When chroma qp_mapping_flag is not present, it is inferred to be equal to 0.

cqp_flat_points_minus1 plus 1 specifies the number of points of where mapping function is non-increasing.

cqp_fp0 specifies the first element of set of points where mapping function is non-increasing cqp_delta_fp_minus1[i ] plus 1 specifies the delta value between i-th and (i−1)-th element of set of points where mapping function is non-increasing.

The variable cQpFlatSize is derived as follows:

$cQp$FlatSize=cqp_flat_points_minus1+1

The variable cQpFlat[ ] is derived as follows:
cQpFlat[0 ]=cqp_fp0;
for(i=1; i<cQpFlatSize; i++) {

$cQp$Flat[i]=cqp_delta_fp_minus1[i]+1+$cQp$Flat[i−1 ]

}
The chroma QP mapping table cqpMappingTable[ ] is derived as follows:
cqpMappingTable [0 ]=0;
for(i=1; i<=maxQP; i++) {
  incStep=1
  for (j=0;j<cQpFlatSize; j++){
    if(i==cQpFlat[j])
    incStep=0
  }

$cqp$MappingTable [i]=$cqp$MappingTable [i−1]+incStep;

},
where maxQP is a maximum supported QP.

In an example, $qP_{Cb}$, $qP_{Cr}$ and $qP_{CbCr}$ are derived as follows:

$qP_{Chroma}$=Clip3(−$QpBd$Offset,63,$Qp_Y$);

$qP_{Cb}$=Chroma$Qp$Table[0 ][$qP_{Chroma}$];

$qP_{Cr}$=Chroma$Qp$Table[1 ][$qP_{Chroma}$];

$qP_{CbCr}$=Chroma$Qp$Table[2 ][$qP_{Chroma}$];

where the chroma quantization parameters for the Cb and Cr components, $Qp'_{Cb}$ and
$Qp'_{Cr}$, and joint Cb-Cr coding $Qp'_{CbCr}$ are derived as follows:

$Qp'_{Cb}$=Clip3(−$QpBd$Offset,63,$qP_{Cb}$+pps_cb_qp_offset+slice_cb_qp_offset+$CuQp$Offset$_{Cb}$)+$QpBd$Offset;

$Qp'_{Cr}$=Clip3(−$QpBd$Offset,63,$qP_{Cr}$+pps_cr_qp_offset+slice_cr_qp_offset+$CuQp$Offset$_{Cr}$)+$QpBd$Offset;

$Qp'_{CbCr}$=Clip3(−$QpBd$Offset,63,$qP_{CbCr}$+pps_joint_cbcr_qp_offset_value+slice_joint_cbcr_qp_offset+CuQpOffset$_{CbCr}$)+$QpBd$Offset;

where ChromaQpTable is the chroma QP mapping table;
where QPi correspond to $qP_{Chroma}$;
where QPc corresponds to $qP_{Cb}$, $qP_{Cr}$ and $qP_{CbCr}$;
where QpBdOffset is the bit depth offset calculated based on the bit depth of the samples of the luma and chroma arrays using the formula:

$QpBd$Offset=6*bit_depth_minus8, where bit_depth_minus8 shall be in the range of 0 to 8, inclusive;
where pps_cb_qp_offset and pps_cr_qp_offset specify the offsets to the luma quantization parameter $Qp'_Y$ used for deriving $Qp'_{Cb}$ and $Qp'_{Cr}$, respectively;
where pps_joint_cbcr_qp_offset_value specifies the offset to the luma quantization parameter $Qp'_Y$ used for deriving $Qp'_{CbCr}$;
where slice_cr_qp_offset specifies a difference to be added to the value of pps_cr_qp_offset when determining the value of the $Qp'_{Cr}$ quantization parameter;
where slice_cb_qp_offset specifies a difference to be added to the value of pps_cb_qp_offset when determining the value of the $Qp'_{Cb}$ quantization parameter;
where slice_joint_cbcr qp_offset specifies a difference to be added to the value of pps_joint_cbcr_qp_offset_value when determining the value of the $Qp'_{CbCr}$;
where variables CuQpOffsetCb, CuQpOffsetCr, and CuQpOffset$_{CbCr}$ specify values to be used when determining the respective values of the $Qp'_{Cb}$, $Qp'_{Cr}$, and $Qp'_{CbCr}$ quantization parameters for the decoder.

In an embodiment, picture level and slice level chroma QP offset (pps_cr_qp_offset, slice_cr_qp_offset) can be utilized during derivation of array of non-increasing point cQpFlat.

The variable cQpFlat[ ] is derived as follows:
cQpFlat[0 ]=cqp_fp0;
for(i=1; i<cQpFlatSize; i++) {

$cQp$Flat[i]=cqp_delta_fp_minus1[i]+1+$cQp$Flat[i−1]— pps_cr_qp_offset −pps_cr_qp_offset

}

Below is an example of using array of non-increasing point cQpFlat, obtained based on information parsed from bitstream integrated into chrominance QP derivation process:

When ChromaArrayType is not equal to 0 and treeType is equal to SINGLE_TREE or DUAL_TREE_CHROMA, the following applies:

When treeType is equal to DUAL_TREE_CHROMA, the variable $Qp_Y$ is set equal to the luma quantization parameter $Qp_Y$ of the luma coding unit that covers the luma location (xCb+cbWidth/2, yCb+cbHeight/2).

The variables $qP_{Cb}$, $qP_{Cr}$ and $qP_{CbCr}$ are derived as follows:

$qPi_{Cb}$=Clip3(−$QpBd$Offset$_C$,69,$Qp_Y$+pps_cb_qp_offset+slice_cb_qp_offset)   (8-928)

$qPi_{Cr}$=Clip3(−$QpBd$Offset$_C$,69,$Qp_Y$+pps_cr_qp_offset+slice_cr_qp_offset)   (8-929)

$qPi_{CbCr}$=Clip3(−$QpBd$Offset$_C$,69,$Qp_Y$+pps_joint_cbcr_qp_offset+slice_joint_cbcr_qp_offset)   (8-930)

If ChromaArrayType is equal to 1, the variables $qP_{Cb}$, $qP_{Cr}$ and $qP_{CbCr}$ are set equal to the value of $Qp_C$ as follows:

$Qp_C = qPi - QpShift$, where variable QpShift is derrived as follows:
QpShift=0
for (j=0;j<cQpFlatSize; j++){

$QpShift = QpShift + (cQpFlat[j] <= qPi ? 1:0)$

}

The variable cQpFlat in the examples given above can be used for default mapping table definition and initialization. Below are examples of cQpFlat that can be used as default:

$cQpFlat = \{30,35,37,39,41,43\}$ $cQpFlat = \{30,39,43\}$ $cQpFlat = \{35,39,43\} cQpFlat = \{35,39,41,43\}$ $cQpFlat = \{22,23,25,27,29,31,33,35,39,40,41,43,47,49, 51,53,55\}$ $cQpFlat = \{21,22,24,25,26,27,29,30,31,32,33,35,42,47, 49,51,53,55\}$ To enable value of cQpFlat[0] be below startng_point_value the cqp_delta_fp0 can be negative and signaled of this parameter may include sign bit or e.g. use signed Exp-Golomb code like it is specified in an example below:

| | Descriptor |
|---|---|
| cqp_mapping_set( ) { | |
|   cqp_flat_points_minus1 | ue(v) |
|   cqp_delta_fp0 | se(v) |
|   for ( i = 1; i <= cqp_flat_points_minus1; i++ ) { | |
|     cqp_delta_fp_minus1[ i ] | ue(v) |
|   } | |
| } | |

Alternatively, in an embodiment, the size and values of set A are signaled in a following way:
1. Read an indicator whether following bitstream information contains element of set A.
2. If the indicator is positive (TRUE) read element value according e.g. to the method described in aspect two or aspect three. Repeat step 1.
3. If the indicator is negative (FALSE) stop reading information related to the set A.

In this implementation, the size of set A is amount of indicators having positive values.

Having restriction that set A is not empty allows implement signaling the size and values of set A in a following way:
1. Read element value according e.g. to the method described in aspect two or aspect three.
2. Read an indicator whether following bitstream information contains another element of set A.
3. If the indicator is positive (TRUE) read repeat step 1 and then step 2.
4. If the indicator is negative (FALSE) stop reading information related to the set A.

In an embodiment, the size of set A is amount of indicators having positive values plus one. Having restriction that set A is not empty allows excluding signaling of one addition indicator that further reduces signaling overhead.

It should be mentioned that signaling of size and value of elements of set A described above can be implemented using any of appropriate codes, e.g. binary, unary, truncated unary, truncated binary, Golomb or Exp-Golomb code etc.

In an embodiment, the number of elements in flat regions (set A) can be more than number of elements in increasing regions (set B). It that case it is beneficial to signal elements of set B instead using methods described above.

According to an embodiment of the disclosure, the class B regions of luma-to-chroma mapping function is divided onto set of subsets of $B_k$ where each subset $B_k$ includes elements x at which the mapping function has same increment $c_k$:

$x \in B_k$ if $f(x) - f(x-1) = c_k$, where $c_k$ is one of natural numbers (e.g. 0, 1, 2, 3, 4 ... ).

In other words, subset B is split on different subsets depending on amount of mapping function incensement at points x of subset $B_k$.

In an example presented in FIG. 10 regions indicated by 1031 have the mapping function increment equal to 1 ($c_k=1$). Region indicated by 1032 has the function increment equal to 2 ($c_k=2$). Regions indicated by 1032 have the function increment equal to 0 ($c_k=0$).

Table below illustrates dividing on subsets $B_k$ corresponded to exemplary function presented in FIG. 10.

| Function increment, $c_k$ | Number of point in subset $B_k$ | Points x of subset $B_k$ |
|---|---|---|
| 2 | 1 | 11 |
| 0 | 6 | 30, 35, 37, 39, 41, 43 |
| 1 | maxQP − (6 + 1) | rest points of X | where maxQP is the maximum QP value supported by decoder (e.g. 0 to 63).

According to a third embodiment, the bitstream comprises information about amount of subsets $B_k$ signaled in bitstream, function increment c for each subset signaled in the bitstream, size of each subset $B_k$ signaled in the bitstream and points of each subsets $B_k$ signaled in the bitstream.

Below is example if syntax and semantics:

| | Descriptor |
|---|---|
| cqp_mapping_data( ) { | |
|   cqp_set_num | ue(v) |
|   for ( k = 0; k < cqp_set_num; k++ ) { | |
|     cqp_set_inc[ k ] | ue(v) |
|     cqp_set_size[ k ] | ue(v) |
|     for ( i = 0; i < cqp_set_size[ k ]; i++ ) { | |
|       cqp_set_point[ k ][ i ] | ue(v) |
|     } | |
|   } | |
| } | | cqp_set_num number of sets of points at which chroma Qp mapping table has non-default behavior (hear under defalt behaviour function increment eqult to 1 is understood, in general defult behavior can be defined in other way e.g. as previously signlled mapping function, or default mapping function).

cqp_set_inc[k] specifies function increment at points of k-th set.

cqp_set_size[k] specifies the number of points of k-th set.

cqp_fp0 specifies the first element of set of points where mapping function is non-increasing cqp_set_point[k ][i ] specifies the i-th element of k-th set (here coding of delta between i-th and (i−1)-th can be used for elemets other than i=0 as in examples above).

The variable cQpFlatSize is derived as follows:

$cQp\text{FlatSize}=cqp\_flat\_points\_minus1+1$

The variable cQpFlat[ ] is derived as follows:
cQpFlat[0 ]=cqp_fp0;
for(i=1; i<cQpFlatSize; i++) {

$cQp\text{Flat}[i]=cqp\_delta\_fp\_minus1[i]+1+cQp\text{Flat}[i-1]$

}
The chroma QP mapping table cqpMappingTable[ ] is derived as follows:
cqpMappingTable [0 ]=0;
for(i=1; i<=maxQP; i++) {
  incStep=1// (set default behaviour)
  for (k=0; k<cqp_set_num; k++){
    for (j=0;j<cqp_set_size[k ];j++){
      if (i==cqp_set_point[k ][i ])
        incStep=cqp_set_inc[k ]
    }
  }

$cqp\text{MappingTable }[i]=cqp\text{MappingTable }[i-1]+inc\text{-}$
Step;

},
where maxQP is a maximum supported QP.

Derivation of certain $Qp_C$ value based on certain QP index (qPi) can be described as follows:

$Qp_C=qPi+Qp\text{Shift}$, where variable QpShift is derrived as follows:
QpShift=0
defInc=1
for (k=0; k<cqp_set_num; k++){
  for (j=0;j<cqp_set_size[k ]; j++){
    if (qPi<=cqp_set_point[k ][i ])

$Qp\text{Shift}=Qp\text{Shift}+cqp\_set\_inc[k]— def\text{Inc}$

}
},
where variable defInc=1 defines default function increment (e.g. equal to 1 in given example).
Or alternatively:

$Qp_C=qPi+Qp\text{Shift}$, where variable QpShift is derrived as follows:
QpShift=0
defInc=1
for (k=0; k<cqp_set_num; k++){
  for (j=0;j<cqp_set_size[k ]; j++){

$Qp\text{Shift}=Qp\text{Shift}+(cqp\_set\_point[k][i]<=qPi? cqp\_set\_inc[k]\text{-def}\text{Inc}: 0)$ }
}
It should be noted that having singed value for variable cqp_set_inc[k ] (e.g. signaled using signed Exp-Golomb code (se(v)) allows additional flexibility of having negative incensement of the function, i.e. mapping function decreasing keeping same semantics.

As a second embodiment, chroma QP mapping table information can be used for modification of default mapping function or previously signaled mapping function. It can be used for the mapping function adaptation for specific part of video sequence to increase compression efficiency by better utilizing varying video signal properties. According to that aspect, default function behavior (or increment) described above is replaced by existing mapping function increment. The exemplary semantic could be as follows:

The chroma QP mapping table cqpMappingTable[ ] is derived as follows:

```
cqpMappingTable [ 0 ] = 0;
for( i = 1; i <= maxQP; i++ ) {
   incStep = cqpMappingTablePrev [ i ] - cqpMappingTablePrev
   [ i-1 ] // (previous mapping function increment)
   for ( k = 0; k < cqp_set_num; k++){
      for ( j = 0; j < cqp_set_size[ k ]; j++){
         if ( i == cqp_set_point[ k ][ j ] )
            incStep = cqp_set_inc[ k ]
      }
   }
   cqpMapping Table [ i ] = cqpMappingTable [ i - 1 ] + incStep;
},
``` where maxQP is a maximum supported QP and cqpMappingTablePrev is previously signaled or default mapping table.

Derivation of certain $Qp_C$ value based on certain QP index (qPi) can be described as follows:

```
Qp_C = qPi + QpShift,
   where variable QpShift is derrived as follows:
   QpShift = 0
   defInc = cqpMappingTablePrev [ qPi ] - cqpMappingTablePrev
   [ qPi - 1 ] for ( k = 0; k < cqp_set_num; k++){
      for ( j = 0; j < cqp_set_size[ k ]; j++){
         if (qPi < = cqp_set_point[ k ][ j ] )
            QpShift = QpShift + cqp_set_inc[ k ] - defInc
      }
   },
``` where variable defInc defines previous mapping function (cqpMappingTablePrev) increment.
Or alternatively:

```
Qp_C = qPi + QpShift,
   where variable QpShift is derrived as follows:
   QpShift = 0
   defInc = cqpMappingTablePrev [ qPi ] - cqpMappingTablePrev
   [ qPi - 1 ]
   for ( k = 0; k < cqp_set_num; k++){
      for ( j = 0; j < cqp_set_size[ k ]; j++){
         QpShift = QpShift + (cqp_set point[ k ][ i ] <= qPi ?
   cqp_set_inc[ k ] - defInc : 0 )
      }
   },
``` where variable defInc defines previous mapping function (cqpMappingTablePrev) increment.

Usage methods described in the second embodiment allows to exclude pps_cr_qp_offset and slice_cr_qp_offset parameters from QP index (qPi) calculation and use luma QP as an input argument for mapping function. That simplifies chroma QP parameter derivation formula and allows to eliminate necessity of signaling in the bitstream chroma QP offset parameters pps_cr_qp_offset and slice_cr_qp_offset.

The pps_cr_qp_offset and slice_cr_qp_offset parameters can be applied after applying mapping function.

Below is another example of syntax and semantics which has no limitation of how big is the mapping function grow in each point. The mapping function still has limitation to be a non-decreasing.

| Sequence parameter set syntax | |
|---|---|
| | Descriptor |
| seq_parameter_set_rbsp( ) {<br>  sps_decoding_parameter_set_id<br>  ...<br>  same_cqp_table<br>  for( n = 0; n < same_qp_table_for_chroma ? 1 : 3; n++ ) {<br>    cqp_set_num_m1[ n ]<br>    for (k = 0; k <= cqp_set_num_m1[ n ]; k++) {<br>      cqp_set_inc[ n ][ k ]<br>      cqp_set_size_m1[ n ][ k ]<br>      for ( i = 0; i <= cqp_set_size_m1[ n ][k ]; i++ )<br>        cqp_set_delta_m1[ n ][ k ][ i ]<br>    }<br>  }<br>} | <br>u(4)<br><br>u(1)<br><br>ue(v)<br><br>ue(v)<br>ue(v)<br><br>ue(v) |

Semantics: option 2, table based

Following semantics are proposed to derive chroma Qp mapping table based on the signaled parameters:

same_cqp_table equal to 1 specifies that only one chroma QP mapping table is signaled and applies to both Cb and Cr components and joint Cb-Cr coding. same_cqp_table equal to 0 specifies that three chroma QP mapping tables are signaled in the SPS.

cqp_set_num_m1[n ] plus 1 specifies number of sets of points on which n-th chroma Qp mapping function has delta value other than 1.

cqp_set_inc[n ][k ] specifies the chroma Qp mapping function increment at points of k-th set, and restricted not to be 1.

cqp_set_size_m1[n ][k ] plus 1 specifies the number of points of the set.

cqp_set_delta m1[n ][k ][i ] plus 1 specifies i-th element of the set if i equals 0, and delta value between i-th and (i−1)-th element otherwise.

The array cqp_set_point[n ][k ][i ] specifies sets of points at which n-th chroma Qp mapping table has delta value other than 1, and is derived as follows:

$$cqp\_set\_point[n][k][i]=cqp\_set\_delta\_m1[n][k][i]+1+\\(i>0?: cqp\_set\_point[n][k][i-1]:0)$$

The n-th chroma QP mapping table cqpMappingTable[i ] for n=0 . . . same_qp_table_for_chroma?0:2 is derived as follows:
cqpMappingTable[n ][0 ]=0

$$cqp\text{MappingTable}[n][i]=cqp\text{MappingTable}[n][i-1]+\\inc\text{Step, with }i=1\ldots 63,$$

where incStep is initialized to 1 and modified as follows, for k=0 . . . cqp_set_num m1[n ] and j=0 . . . cqp_set_size_m1[n ][k ]:

If (i==cqp_set_point[n][k][j])incStep=cqp_set_inc[n][k]

For some embodiments, it maybe be beneficial to avoid storing the entire mapping table to save memory. To achieve that derivation process for certain chroma Qp value is provided. Syntax elements and semantics for it the same as option 1, but maintaining of cqpMappingTable is not necessary:

same_cqp table equal to 1 specifies that only one chroma QP mapping table is signaled and applies to both Cb and Cr components and joint Cb-Cr coding. same_cqp_table equal to 0 specifies that three chroma QP mapping tables are signaled in the SPS.

cqp_set_num_m1[n ] plus 1 specifies number of sets of points on which n-th chroma Qp mapping function has delta value other than 1.

cqp_set_inc[n ] [k ] specifies the chroma Qp mapping function increment at points of k-th set, and restricted not to be 1.

cqp_set_size_m1[n ] [k ] plus 1 specifies the number of points of the set.

cqp_set_delta m1[n ][k ][i ] plus 1 specifies i-th element of the set if i equals 0, and delta value between i-th and (i−1)-th element otherwise.

The array cqp_set_point[n ][k ][i ] specifies sets of points at which n-th chroma Qp mapping table has delta value other than 1, and is derived as follows:

$$cqp\_set\_point[n][k][i]=cqp\_set\_delta\_m1[n][k][i]+1+\\(i>0?: cqp\_set\_point[n][k][i-1]:0)$$

Semantics: Option 2, Table Less

For some embodiments, it maybe be beneficial to avoid story entire mapping table to save memory. To achieve that derivation process for certain chroma Qp value is provided.

Syntax elements and semantics for it the same as option 1, but maintaining of cqpMappingTable is not necessary:

same_cqp_table equal to 1 specifies that only one chroma QP mapping table is signaled and applies to both Cb and Cr components and joint Cb-Cr coding. same_cqp_table equal to 0 specifies that three chroma QP mapping tables are signaled in the SPS.

cqp_set_num_m1[n ] plus 1 specifies number of sets of points on which n-th chroma Qp mapping function has delta value other than 1.

cqp_set_inc[n ] [k ] specifies the chroma Qp mapping function increment at points of k-th set, and restricted not to be 1.

cqp_set_size_m1[n ] [k ] plus 1 specifies the number of points of the set.

cqp_set_delta m1[n ][k ][i ] plus 1 specifies i-th element of the set if i equals 0, and delta value between i-th and (i−1)-th element otherwise.

The array cqp_set_point[n ][k ][i ] specifies sets of points at which n-th chroma Qp mapping table has delta value other than 1, and is derived as follows:

$$cqp\_set\_point[n][k][i]=cqp\_set\_delta\_m1[n][k][i]+\\1+(i>0?: cqp\_set\_point[n][k][i-1]:0)$$

Derivation Process

When treeType is equal to DUAL_TREE_CHROMA, the variable $Qp_Y$ is set equal to the luma quantization parameter $Qp_Y$ of the luma coding unit that covers the luma location (xCb+cbWidth/2, yCb+cbHeight/2).

The array QpMapOffset[n ], with n=0 . . . 2 is initialized with 0. If ChromaArrayType is equal to 1, the QpMapOffset modyfed as follows, for k=0 . . . cqp_set_num_m1[n ] and i=0 . . . cqp_set_size_m1[n ][k]:

$$Qp\text{MapOffset}[n]=Qp\text{MapOffset}[n]+(cqp\_set\_point[n]\\ [k][i]<=Qp_Y?cqp\_set\_inc[n][k]-1:0).$$

The variables QpOffsetCb, QpOffsetCr and QpOffsetCbCr are derived as follows:

$$Qp\text{Offset}_{Cb}=Qp\text{MapOffset}[0]+pps\_cb\_qp\_\text{offset}+\\slice\_cb\_qp\_\text{offset}$$

$$Qp\text{Offset}_{Cr}=Qp\text{MapOffset}[1]+pps\_cr\_qp\_\text{offset}+\\slice\_cr\_qp\_\text{offset}$$

$$Qp\text{Offset}_{CbCr}=Qp\text{MapOffset}[2]+pps\_cbcr\_qp\_\text{offset}+\\slice\_cbcr\_qp\_\text{offset}$$

The chroma quantization parameters for the Cb and Cr components, $Qp'_{Cb}$ and $Qp'_{Cr}$, and joint Cb-Cr coding $Qp'_{CbCr}$ are derived as follows:

$Qp'_{Cb} = \text{Clip3}(-QpBd\text{Offset}_C, 63, Qp_Y + Qp\text{Offset}_{Cb}) + QpBd\text{Offset}_C$ (8-931)

$Qp'_{Cr} = \text{Clip3}(-QpBd\text{Offset}_C, 63, Qp_Y + Qp\text{Offset}_{Cr}) + QpBd\text{Offset}_C$ (8-932)

$Qp'_{CbCr} = \text{Clip3}(-QpBd\text{Offset}_C, 63, Qp_Y + Qp\text{Offset}_{CbCr}) + QpBd\text{Offset}_C$ (8-933)

It should be noted that, separate mapping tables may be used for Cb and Cr, that is, information of mapping table for Cb may be obtained based on bitstream, and information of mapping table for Cr may be obtained based on the bitstream.

Figure 9:
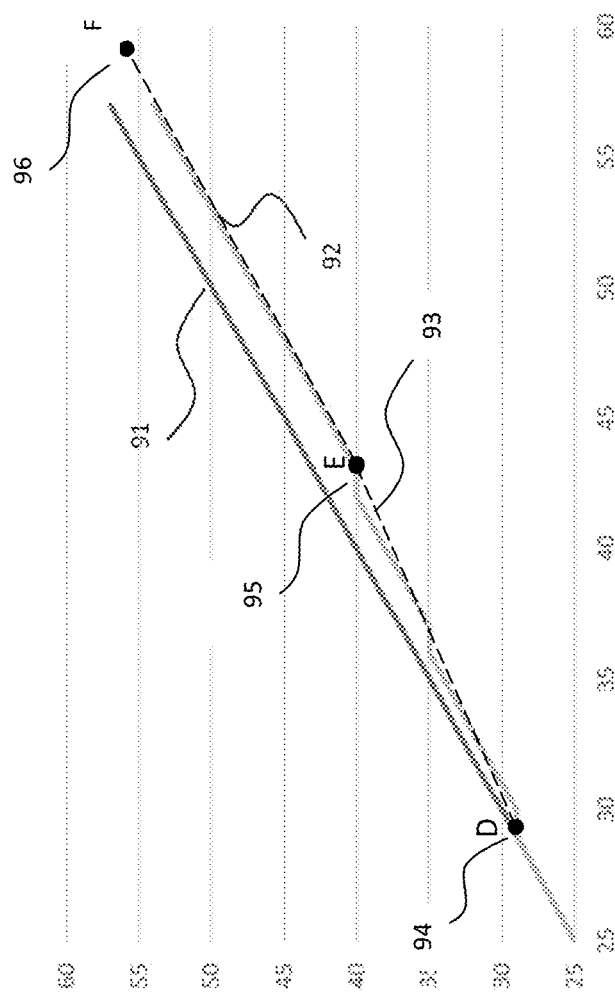
FIG. 9 is an example of piecewise linear representation 93 of mapping function 92 using two pivot points D (94) and E (95).

According to an embodiment, the mapping function is represented as piecewise function and information signaled in the bitstream is breakpoints (or change points, or pivot points) of piecewise function e.g. 94, 95 as depicted on FIG. 9.

In most straightforward way amount of pivot points and its x and y coordinates are signaled in the bitstream as information for obtaining mapping function. Similar way as described in the first embodiment the size of set with pivot points can be restricted to having size more than zero, in that case a value size −1 is signaled in the bitstream. It should be noted that, "information for obtaining mapping function" may be described as "information of the mapping function", "information for obtaining . . . "may be described as "information of . . . ".

In the third embodiment, a piecewise linear function is used to represent mapping function.

In a further embodiment, it can be restricted that first point in the set (point A 94) belong to monotonic 1-to-1 function 91 and signaling one coordinate e.g Ax is enough and Ay is derived as Ay Ax. Furthermore, assuming that last segment (or piece) of piecewise linear function is parallel to 1-to-1 function the point C 96 does not need to be signaled, and parameters of last segment are derived based on point B 95 and knowledge that last segment is parallel to 1-to-1 function.

To further reduce the signaling overhead the differences between corresponding x and y coordinates of current (e.g. B 95) and previous (e.g. A 94) pivot points are signaled in the bitstream. For first point the difference from some starting_point is signaled. The starting_point is either some predefined point or signaled in the bitstream. In some implementation starting_point can be restricted to laying on 1-to-1, in that case one coordinate is sufficient to define starting_point.

It should be pointed that embodiment one and embodiment two described above can coexist in one implementation of decoder. The most appropriate method e.g. having less bit for signaling is selected by encoder and signaled by corresponding indicator in bitstream.

In some embodiments, decoder can use some predefined mapping function and option to use mapping function obtained from bitstream. In that case option is signaled by corresponding indicator in the bitstream. Since the proper mapping function may depend in certain signal characteristics of the sequence or its part, the encoder may to decide whether to use predefined mapping function or spend some additional bits on signaling mapping function in bitstream.

Different parts of sequence may have different signal characteristics and correspondingly different optimal mapping function. To provide ability to change mapping function for different parts of the sequence the bitstream contains indicator indicating whether to change mapping function e.g. on a picture, slice or tile group level or in adaptation parameter set.

Below is an example of syntax table corresponding to signaling mapping function information in sequence parameter set:

|  | Descriptor |
|---|---|
| seq_parameter_set_rbsp( ) { |  |
|   sps_decoding_parameter_set_id | u(4) |
|   . . . |  |
|   chroma_qp_mapping_flag | u(1) |
|   if( chroma_qp_mapping_flag ) |  |
|     cqp_mapping_data( ) |  |
|   . . . |  |
| } |  |

Exemplary semantics for syntax table above is as follows:
chroma_qp_mapping_flag equal to 1 specifies that chroma Qp mapping function is signaled and overrides default specification of $Qp_C$ (chroma Qp) as a function of qPi (derived based on luma Qp) which is used to derive $Qp_C$. chroma_qp_mapping_flag equal to 0 specifies that default chroma Qp mapping table is used to derive $Qp_C$. When chroma_qp_mapping_flag is not present, it is inferred to be equal to 0.

It should be noted that in some implementation chroma qp_mapping_flag can be omitted and inherited to 1. That means chroma Qp mapping information (cqp_mapping_data (f)) is always present in bitstream.

The video signal transferred in bitstream may have different chroma format sampling structure. Below is an example of chroma sampling format specification:

| chroma format idc | separate_colour_plane_flag | Chroma format | Sub WidthC | SubHeightC |
|---|---|---|---|---|
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 |

In monochrome sampling there is only one sample array, which is nominally considered the luma array.

In 4:2:0 sampling, each of the two chroma arrays has half the height and half the width of the luma array.

In 4:2:2 sampling, each of the two chroma arrays has the same height and half the width of the luma array.

In 4:4:4 sampling, depending on the value of separate colourplane flag, the following applies:

If separate_colour plane_flag is equal to 0, each of the two chroma arrays has the same height and width as the luma array.

Otherwise (separatecolourplane_flag is equal to 1), the three colour planes are separately processed as monochrome sampled pictures.

In some implementation presence on chroma qp_mapping_flag and/or chroma Qp mapping information (cqp_mapping_dataQ) may depend on the chroma format sampling as exemplary specified in tables below, where for instance, chroma format idc equal to 3 indicated the chroma sampling format is 4:2:0:

| | Descriptor |
|---|---|
| seq_parameter_set_rbsp( ) { | |
|   sps_decoding_parameter_set_id | u(4) |
|   ... | |
|   chroma_format_idc | ue(v) |
|   ... | |
|   if( chroma_format_idc == 3 ) | |
|     chroma_qp_mapping_flag | u(1) |
|   if( chroma_qp_mapping_flag ) | |
|     cqp_mapping_data( ) | |
|   ... | u(1) |
| } | |

Another example:

| | Descriptor |
|---|---|
| seq_parameter_set_rbsp( ) { | |
|   sps_decoding_parameter_set_id | u(4) |
|   ... | |
|   chroma_format_idc | ue(v) |
|   ... | |
|   if( chroma_format_idc == 3 ) | |
|     cqp_mapping_data( ) | |
|   ... | u(1) |
| } | |

Another example:

| | Descriptor |
|---|---|
| seq_parameter_set_rbsp( ) { | |
|   sps_decoding_parameter_set_id | u(4) |
|   ... | |
|   chroma_format_idc | ue(v) |
|   ... | |
|   if( chroma_format_idc == 3 ) | |
|     chroma_qp_mapping_flag | u(1) |
|   if( chroma_qp_mapping_flag ) | |
|     cqp_mapping_data( ) | |
|   ... | u(1) |
| } | |

Another example:

| | Descriptor |
|---|---|
| seq_parameter_set_rbsp( ) { | |
|   ... | |
|   chroma_format_idc | ue(v) |
|   ... | |
|   if( chroma_format_idc == 3 ) | |
|     cqp_mapping_data( ) | |
|   ... | u(1) |

Conditional signaling of chroma QP mapping information depending on chroma sampling format additionally reduces the signaling overhead. For instance, if chroma format is monochrome (sampling format is 4:0:0) the mapping table is not signalled. Having separately coded color components (separate_colour_plane_flag equals to 1) is another example of case when chroma mapping table is not signalled. That allows saving bits on singling of chroma QP mapping table when chroma components are not present or coded separately.

Below is an example of syntax table corresponding to signaling mapping function information in adaptation parameter set:

| | Descriptor |
|---|---|
| adaptation_parameter_set_rbsp( ) { | |
|   adaptation_parameter_set_id | u(5) |
|   aps_params_type | u(3) |
|   if( aps_params_type == ALF_APS ) | |
|     alf_data( ) | |
|   else if( aps_params_type == LMCS_APS ) | |
|     lmcs_data( ) | |
|   else if( aps_params_type == CQP_APS ) | |
|     cqp_mapping_data( ) | |
|   aps_extension_flag | u(1) |
|   if( aps_extension_flag ) | |
|     while( more_rbsp_data( ) ) | |
|       aps_extension_data_flag | u(1) |
|   rbsp_trailing_bits() | |
| } | | where CQP_APS is identifier of chroma QP mapping table information.

The suitable mapping function may depend on codec efficiency in compression of color components and signal characteristics of certain sequence. It may be even more considerable for HDR content since color information is very important for this type of content. Moreover, Cb and Cr components may have different characteristics and different optimal mapping functions in turn. To better fit into content type and characteristics, it may be beneficial to have different mapping functions for Cb and Cr components. To provide this ability the in some advantageous implementation bitstream comprises information to obtain mapping function for both Cb and Cr components.

In an embodiment, allowing having flexibility the bitstream comprises indicator indicating whether mapping function is signaled for both Cb and Cr component. If indicator is positive (TRUE) then decoder obtains two mapping functions from bitstream corresponding to Cb and Cr component and uses it during reconstruction process. Otherwise, the single mapping function is used for reconstruction of Cb and Cr components.

Figure 11:
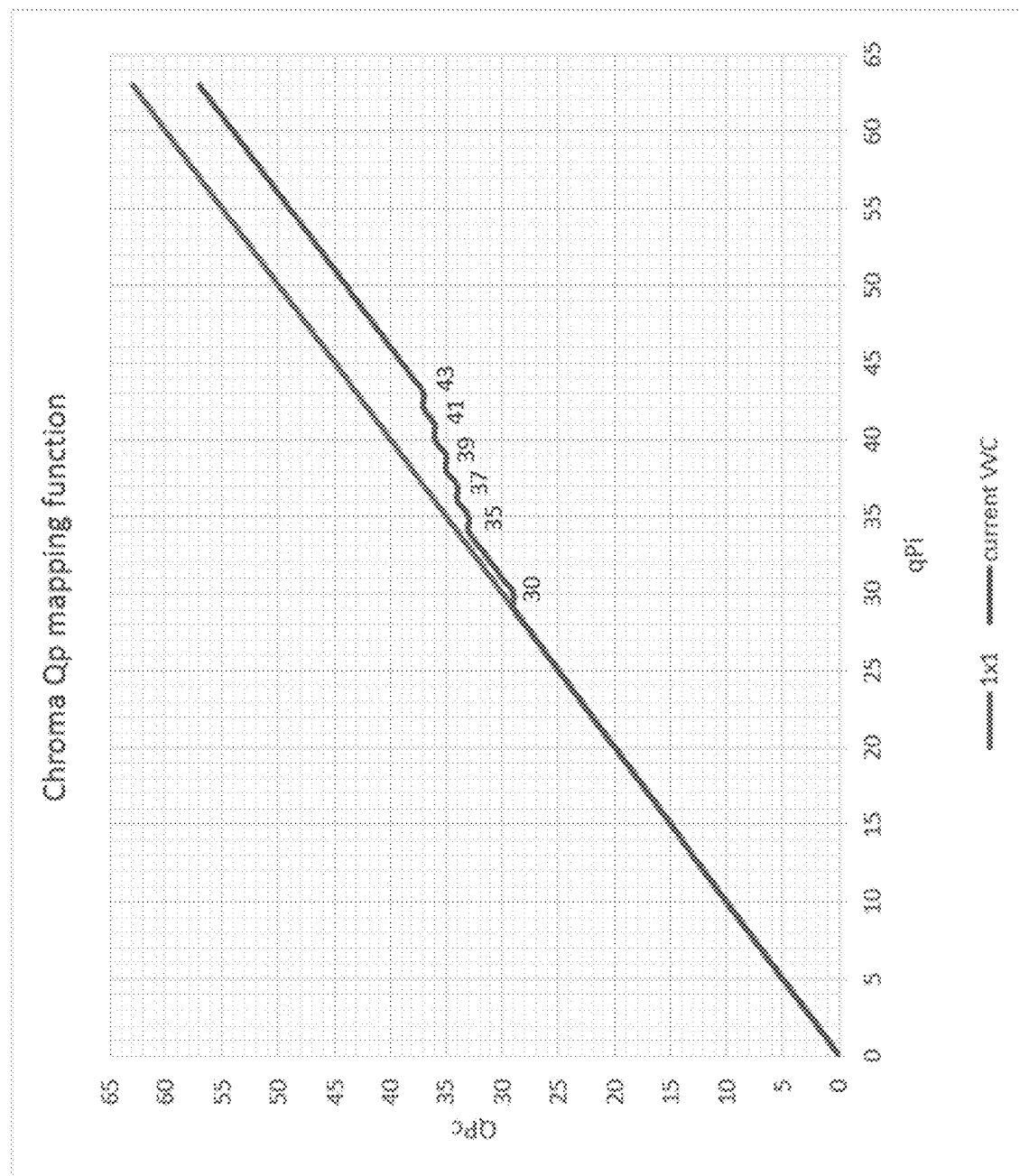
FIG. 11 demonstrates VVC chroma Qp mapping table as a function of qPi

The FIG. 11 demonstrates VVC chroma Qp mapping table as a function of qPi. It can be seen that the luma-to-chroma mapping function is monotonically increasing (non-decreasing) function which can be divided on regions of two classes. Class A regions, where function is non-increasing (or flat) i.e. $f(x) f(x-1)=0$, and class B regions, where function is increasing, i.e. $f(x) f(x-1)=1$.

In method of signaling we propose to signal in the bitstream the points of class A (flat regions) using differential representation (e.g. $cqp\_delta\_fp_i = A[i] - A[i-1]$). According to the proposed method, the decoder constructs a mapping function using information about points of set A. For rest points of allowable Qp range the mapping function is assumed to be monotonically increased with step 1. For example, to reproduce current VVC mapping function following points need to be signaled: 30, 35, 37, 39, 41 and 43.

In SPS, a new syntax element chroma_qp_mapping_flag is added. When the value of chroma_qp_mapping_flag is equal to 0 the default chroma Qp mapping table is used. When the value of chroma_qp_mapping_flag is equal to 1, a chroma Qp mapping table is signaled.

An exemplary Sequence parameter set syntax

|  | Descriptor |
|---|---|
| seq_parameter_set_rbsp( ) { |  |
|   sps_decoding_parameter_set_id | u(4) |
|   ... |  |
|   chroma_qp_mapping_flag | u(1) |
|   if( chroma_qp_mapping_flag ) |  |
|     cqp_flat_points_minus1 | ue(v) |
|     cqp_fp0 | ue(v) |
|     for ( i = 1; i <= cqp_flat_points_minus1; i++ ) { |  |
|       cqp_delta_fp_minus1[ i ] | ue(v) |
|     ... |  |
|   } |  |
| } |  |

Following semantics are proposed to derive chroma Qp mapping table based on the signaled parameters:

chroma_qp_mapping_flag equal to 1 specifies that chroma Qp mapping table is signaled and overrides Table 8 15—Specification of QpC as a function of qPi which is used to derive $Qp_C$. chroma qp_mapping_flag equal to 0 specifies that default chroma Qp mapping table specified in Table 8 15—Specification of QpC as a function of qPi is used to derive $Qp_C$. When chroma qp_mapping_flag is not present, it is inferred to be equal to 0.

cqp_flat_points_minus1 plus 1 specifies the number of points of where mapping function is non-increasing.

cqp_fp0 specifies the first element of set of points where mapping function is non-increasing cqp_delta_fp_minus1[i ] plus 1 specifies the delta value between i-th and (i−1)-th element of set of points where mapping function is non-increasing.

The variable cQpFlatSize is derived as follows:

$cQp$FlatSize=$cqp$_flat_points_minus1+1

The variable cQpFlat[ ] is derived as follows:
cQpFlat[0 ]=cqp_fp0;
for(i=1; i<cQpFlatSize; i++) {

$cQp$Flat[$i$]=$cqp$_delta_$fp$_minus1[$i$]+1+$cQp$Flat[$i$−1 ]

}
The chroma QP mapping table cqpMappingTable[ ] is derived as follows:

```
cqpMappingTable [ 0 ] = 0;
for( i = 1; i <= maxQP; i++ ) {
   incStep = 1
   for ( j = 0; j < cQpFlatSize; j++){
      if ( i = = cQpFlat[ j ] )
         incStep = 0
   }
   cqpMappingTable [ i ] = cqpMappingTable [ i − 1 ] + incStep;
}
```

Figure 12:
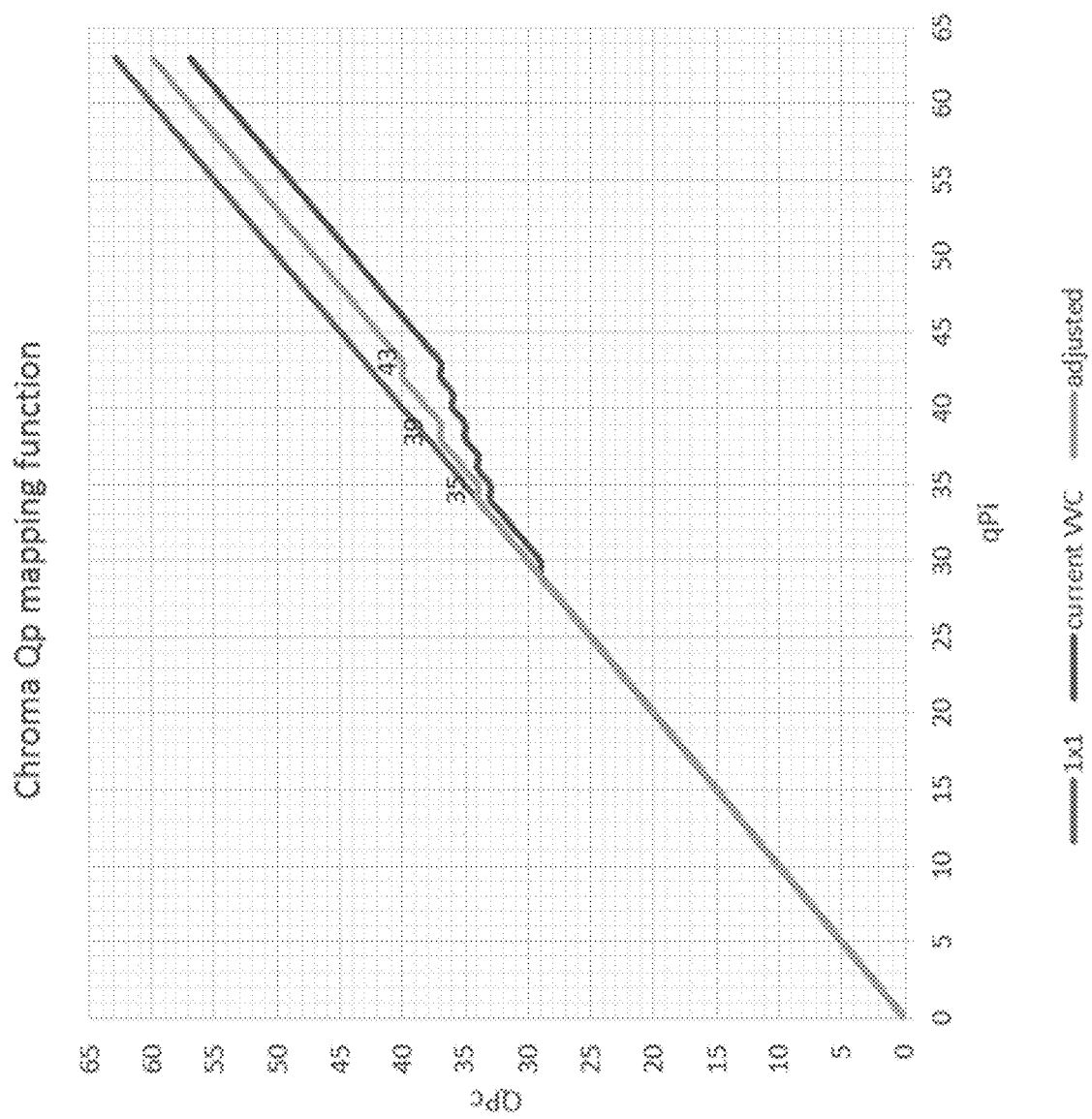
FIG. 12 illustrates an adjusted mapping function according to the present disclosure.

As a second aspect of the proposal, we evaluated an adjusted mapping function having non-increasing regions at point 35, 39, 43. The adjusted mapping function is depicted in FIG. 12.

Following results were obtained using adjusted chroma Qp mapping function with flat regions at points 35, 39 and 43. The mapping table was adjusted using test configuration files using proposed signaling mechanism. In this experiment, we keep chroma QP Offset equal to 1 for AI configuration only. For configurations RA, LDB and LDP the chroma QP Offset is set to 0.

Table A Coding performance of adjusted mapping table over VTM5.0

| | All Intra Main10 Proposal Over VTM5.0 | | | | |
|---|---|---|---|---|---|
| | Y | U | V | EncT | DecT |
| Class A1 | −1.17% | 6.17% | 4.96% | 98% | 100% |
| Class A2 | −1.69% | 5.20% | 5.14% | 97% | 99% |
| Class B | −0.63% | 6.05% | 6.77% | 99% | 101% |
| Class C | −0.69% | 5.78% | 6.00% | 99% | 101% |
| Class E | −0.62% | 5.87% | 6.34% | 100% | 101% |
| Overall | −0.91% | 5.84% | 5.95% | 99% | 100% |
| Class D | −0.67% | 5.78% | 6.16% | 99% | 99% |
| Class F (optional) | −0.75% | 4.22% | 4.24% | 100% | 100% |

| | Random Access Main 10 Proposal Over VTM5.0 | | | | |
|---|---|---|---|---|---|
| | Y | U | V | EncT | DecT |
| Class A1 | −2.34% | 2.56% | −0.45% | 98% | 100% |
| Class A2 | −1.18% | −2.76% | −2.97% | 98% | 100% |
| Class B | −0.21% | −3.75% | −3.11% | 99% | 100% |
| Class C | −0.38% | −1.69% | −0.76% | 99% | 101% |
| Class E | | | | | |
| Overall | −0.88% | −1.74% | −1.92% | 99% | 101% |
| Class D | −0.23% | −2.44% | −1.47% | 100% | 101% |
| Class F (optional) | −0.20% | −2.26% | −1.65% | 99% | 100% |

| | Low delay B Main10 Proposal Over VTM5.0 | | | | |
|---|---|---|---|---|---|
| | Y | U | V | EncT | DecT |
| Class A1 | | | | | |
| Class A2 | | | | | |
| Class B | 0.06% | −8.04% | −7.29% | 100% | 101% |
| Class C | 0.03% | −4.25% | −3.66% | 100% | 99% |
| Class E | 0.16% | −7.41% | −6.86% | 99% | 101% |
| Overall | 0.07% | −6.62% | −5.97% | 100% | 100% |
| Class D | 0.05% | −6.00% | −4.16% | 101% | 104% |
| Class F (optional) | −0.04% | −3.20% | −2.48% | 99% | 100% |

| | Low delay P Main10 Proposal Over VTM5.0 | | | | |
|---|---|---|---|---|---|
| | Y | U | V | EncT | DecT |
| Class A1 | | | | | |
| Class A2 | | | | | |
| Class B | 0.06% | −8.18% | −7.40% | 99% | 100% |
| Class C | −0.07% | −4.69% | −3.63% | 99% | 100% |
| Class E | 0.08% | −7.54% | −8.13% | 100% | 101% |
| Overall | 0.02% | −6.86% | −6.33% | 99% | 100% |
| Class D | 0.13% | −6.53% | −5.06% | 100% | 101% |
| Class F (optional) | 0.01% | −2.69% | −2.81% | 100% | 100% |

It was noted that usage of VTM5.0 as an anchor leads crossing of RD curves for some sequences. That may make BD-rate numbers not relevant. To obtain correct numbers we estimate performance over VTM5.0 by taking difference in performance of VTM5.0 and test with adjusted mapping table over HM. On Table B below left part denotes the BD-rate difference with VTM5.0, middle part reports coding performance of adjusted table over HM16.20, and right part is coding performance of VTM5.0 over HM given for comparison.

Table B Difference in coding performance of adjusted mapping table over VTM5.0 having HM as an anchor

|  | All Intra Main10 | | | | | | | | | |
|---|---|---|---|---|---|---|---|---|---|---|
|  | Delta Over VTM-5.0 | | | | | Proposal Over HM16.20 | | | | |
|  | Y | U | V | EncT | DecT | Y | U | V | EncT | DecT |
| Class A1 | −0.92% | 4.72% | 3.72% | 98% | 100% | −27.55% | −35.08% | −33.54% | 2289% | 211% |
| Class A2 | −1.47% | 3.29% | 4.35% | 97% | 99% | −26.45% | −22.54% | −15.17% | 3662% | 220% |
| Class B | −0.53% | 4.75% | 5.38% | 99% | 101% | −20.97% | −20.13% | −27.59% | 3932% | 225% |
| Class C | −0.58% | 4.25% | 4.48% | 99% | 101% | −21.93% | −17.92% | −22.77% | 5328% | 232% |
| Class E | −0.51% | 5.87% | 6.34% | 100% | 101% | −25.20% | −19.51% | −24.69% | 3007% | 217% |
| Overall | −0.76% | 4.45% | 4.71% | 99% | 100% | −23.90% | −22.43% | −24.96% | 3632% | 222% |
| Class D | −0.58% | 5.16% | 5.70% | 99% | 99% | −18.04% | −13.77% | −15.95% | 6149% | 221% |
| Class F (optional) | −0.54% | 2.50% | 2.37% | 100% | 100% | −38.69% | −37.15% | −39.71% | 5290% | 220% |

|  | VTM5.0 Over HM16.20 | | | | |
|---|---|---|---|---|---|
|  | Y | U | V | EncT | DecT |
| Class A1 | −26.64% | −39.80% | −37.26% | 2277% | 210% |
| Class A2 | −24.98% | −25.83% | −19.52% | 3676% | 220% |
| Class B | −20.45% | −24.88% | −32.98% | 3872% | 220% |
| Class C | −21.35% | −22.17% | −27.25% | 5226% | 222% |
| Class E | −24.70% | −24.59% | −29.92% | 2928% | 209% |
| Overall | −23.14% | −26.88% | −29.67% | 3585% | 217% |
| Class D | −17.46% | −18.93% | −21.66% | 6040% | 213% |
| Class F (optional) | −38.15% | −39.65% | −42.08% | 5124% | 213% |

|  | All Intra Main 10 | | | | | | | | | |
|---|---|---|---|---|---|---|---|---|---|---|
|  | Delta Over VTM-5.0 | | | | | Proposal Over HM16.20 | | | | |
|  | Y | U | V | EncT | DecT | Y | U | V | EncT | DecT |
| Class A1 | −1.80% | −3.34% | 1.33% | 98% | 100% | −36.71% | −36.50% | −41.69% | 926% | 231% |
| Class A2 | −1.09% | −0.83% | −1.26% | 98% | 100% | −40.12% | −37.86% | −31.98% | 1011% | 236% |
| Class B | −0.20% | −1.04% | −0.45% | 99% | 100% | −32.97% | −38.92% | −40.65% | 1022% | 226% |
| Class C | −0.36% | −1.06% | −0.11% | 99% | 101% | −28.21% | −28.14% | −31.23% | 1335% | 239% |
| Class E | −0.74% | −0.13% | −0.16% | 99% | 101% | −33.88% | −35.35% | −36.61% | 1074% | 232% |
| Overall | −0.23% | −1.35% | −0.09% | 100% | 101% | −26.31% | −26.11% | −28.32% | 1526% | 242% |
| Class D (optional) | −0.30% | −1.31% | −0.89% | 99% | 100% | −40.11% | −41.99% | −43.80% | 737% | 207% |

|  | VTM5.0 Over HM16.20 | | | | |
|---|---|---|---|---|---|
|  | Y | U | V | EncT | DecT |
| Class A1 | −34.92% | −39.81% | −43.03% | 921% | 228% |
| Class A2 | −39.04% | −37.01% | −30.74% | 1005% | 233% |
| Class B | −32.76% | −37.86% | −40.19% | 1006% | 223% |
| Class C | −27.86% | −27.10% | −31.11% | 1309% | 230% |
| Class E | −33.14% | −35.21% | −36.45% | 1060% | 228% |
| Overall | −26.07% | −24.83% | −28.17% | 1492% | 232% |
| Class D (optional) | −39.81% | −40.67% | −42.91% | 725% | 201% |

|  | All Intra Main10 | | | | | | | | | |
|---|---|---|---|---|---|---|---|---|---|---|
|  | Delta Over VTM-5.0 | | | | | Proposal Over HM16.20 | | | | |
|  | Y | U | V | EncT | DecT | Y | U | V | EncT | DecT |
| Class A1 | | | | | | | | | | |
| Class A2 | | | | | | | | | | |
| Class B | −0.01% | −4.66% | −3.77% | 100% | 101% | −25.95% | −26.41% | −27.21% | 834% | 206% |

-continued

| | Y | U | V | EncT | DecT | Y | U | V | EncT | DecT |
|---|---|---|---|---|---|---|---|---|---|---|
| Class C | −0.04% | −2.31% | −1.44% | 100% | 99% | −22.51% | −21.31% | −23.43% | 1009% | 201% |
| Class E | 0.10% | −7.41% | −6.86% | 99% | 101% | −25.48% | −28.30% | −31.92% | 440% | 164% |
| Overall | 0.01% | −3.80% | −2.98% | 100% | 100% | −24.69% | −25.18% | −27.13% | 757% | 193% |
| Class D | −0.01% | −4.10% | −1.93% | 101% | 104% | −21.24% | −17.86% | −19.42% | 1104% | 213% |
| Class F (optional) | −0.16% | −1.67% | −1.24% | 99% | 100% | −36.47% | −37.86% | −39.29% | 556% | 168% |

| | VTM5.0 Over HM16.20 | | | | |
|---|---|---|---|---|---|
| | Y | U | V | EncT | DecT |
| Class A1 | | | | | |
| Class A2 | | | | | |
| Class B | −25.94% | −21.75% | −23.44% | 815% | 196% |
| Class C | −22.47% | −18.99% | −21.99% | 985% | 197% |
| Class E | −25.58% | −23.94% | −28.23% | 433% | 160% |
| Overall | −24.69% | −21.38% | −24.15% | 741% | 187% |
| Class D | −21.22% | −13.76% | −17.49% | 1069% | 200% |
| Class F (optional) | −36.30% | −36.19% | −38.05% | 544% | 165% |

20

| | All Intra Main10 | | | | | | | | | |
|---|---|---|---|---|---|---|---|---|---|---|
| | Delta Over VTM-5.0 | | | | | Proposal Over HM16.20 | | | | |
| | Y | U | V | EncT | DecT | Y | U | V | EncT | DecT |
| Class A1 | | | | | | | | | | |
| Class A2 | | | | | | | | | | |
| Class B | −0.03% | −4.60% | −3.55% | 99% | 100% | −30.44% | −29.55% | −30.15% | 771% | 211% |
| Class C | −0.12% | −2.54% | −1.42% | 99% | 100% | −24.69% | −22.33% | −24.25% | 936% | 211% |
| Class E | 0.04% | −3.84% | −3.99% | 100% | 101% | −29.13% | −32.44% | −36.22% | 392% | 171% |
| Overall | −0.04% | −3.72% | −2.95% | 99% | 100% | −28.19% | −27.87% | −29.70% | 694% | 200% |
| Class D | −0.04% | −4.34% | −2.93% | 100% | 101% | −22.94% | −19.34% | −20.46% | 1041% | 208% |
| Class F (optional) | −0.16% | −1.34% | −1.38% | 100% | 100% | −36.27% | −37.56% | −39.27% | 579% | 175% |

| | VTM5.0 Over HM16.20 | | | | |
|---|---|---|---|---|---|
| | Y | U | V | EncT | DecT |
| Class A1 | | | | | |
| Class A2 | | | | | |
| Class B | −30.41% | −24.95% | −26.60% | 756% | 206% |
| Class C | −24.57% | −19.79% | −22.83% | 918% | 206% |
| Class E | −29.16% | −28.61% | −32.22% | 385% | 166% |
| Overall | −28.15% | −24.15% | −26.75% | 681% | 195% |
| Class D | −22.98% | −15.00% | −17.53% | 1021% | 201% |
| Class F (optional) | −36.11% | −36.22% | −37.88% | 565% | 171% |

Figure 13:
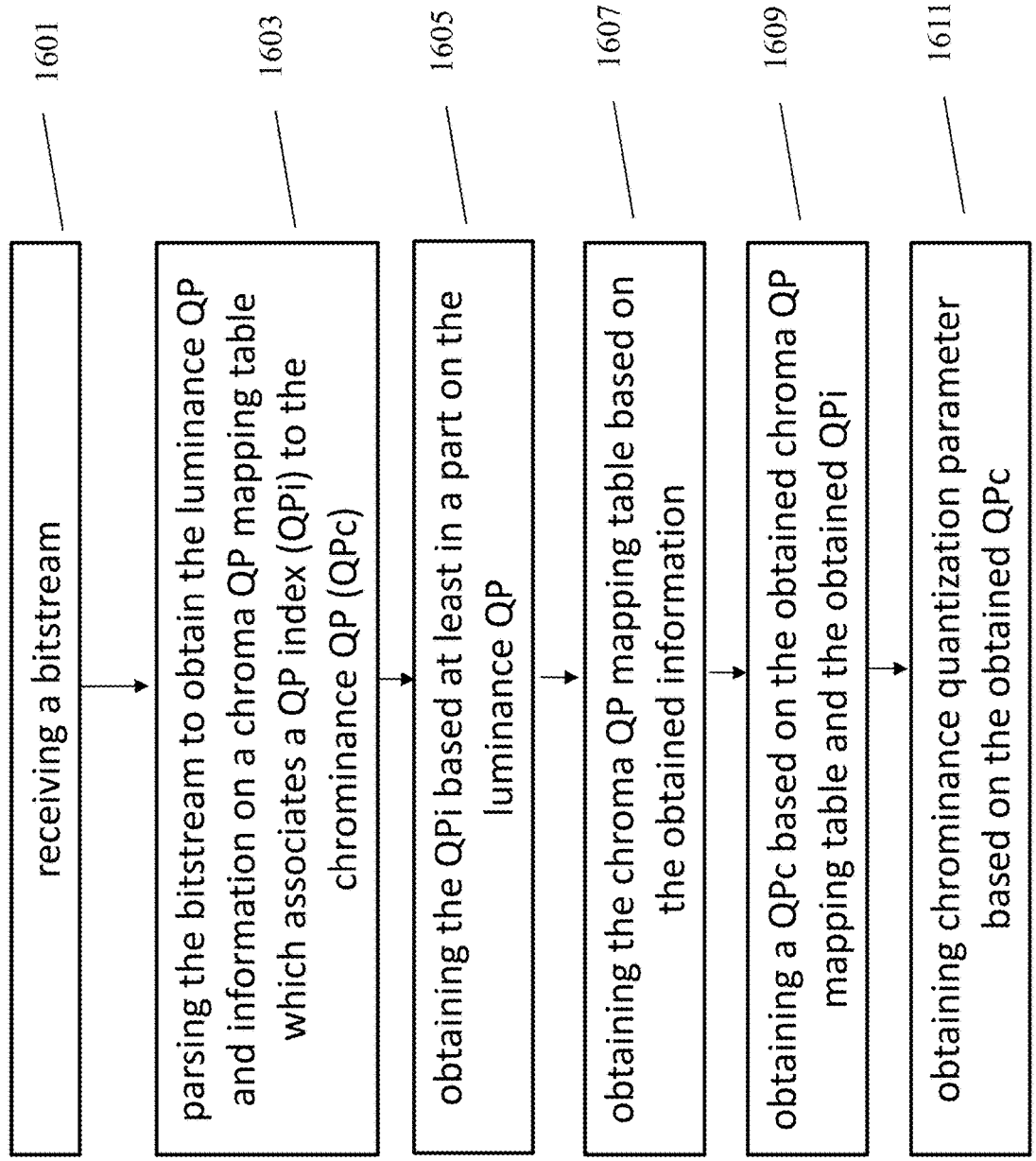
FIG. 13 illustrates a method of obtaining a chrominance quantization parameter according to the present disclosure.

Further, FIG. 13 illustrates a method of obtaining a chrominance quantization parameter according to the present disclosure. FIG. 13 illustrates the method of obtaining a chrominance quantization parameter (QP) for chrominance components based on a luminance QP for a luminance component, where the method is performed by a decoder. The method of FIG. 13 comprises: operation 1601 of receiving a bitstream; operation 1603 of parsing the bitstream to obtain the luminance QP and information on a chroma QP mapping table which associates a QP index (QPi) to the chrominance QP (QPc); operation 1605 of obtaining the QPi based at least in a part on the luminance QP; operation 1607 of obtaining the chroma QP mapping table based on the obtained information; operation 1609 of obtaining a QPc based on the obtained chroma QP mapping table and the obtained QPi; and operation 1611 of obtaining chrominance quantization parameter based on the obtained QPc.

Figure 14:
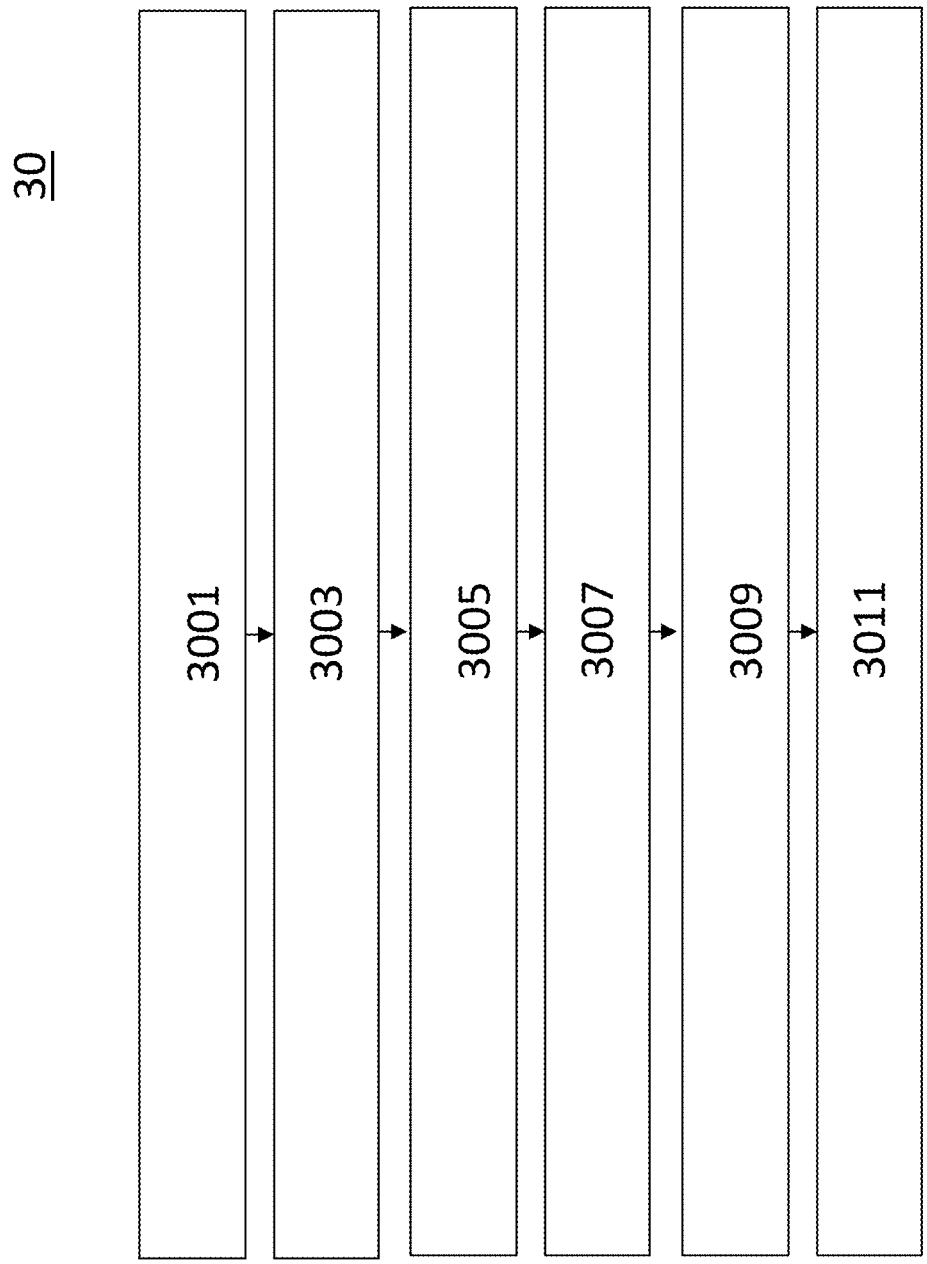
FIG. 14 illustrates a decoder according to the present disclosure.

Further, FIG. 14 illustrates a decoder 30 according to the present disclosure. FIG. 13 illustrates a decoder 30 for obtaining a chrominance quantization parameter (QP) for chrominance components based on a luminance QP for a luminance component. The decoder of FIG. 13 comprises: a receiving unit 3001 configured to receive a bitstream; a parsing unit 3003 configured to parse the bitstream to obtain the luminance QP and information on a chroma QP mapping table which associates a QP index (QPi) to the chrominance QP (QPc); a first obtaining unit 3005 configured to obtain the QPi based at least in a part on the luminance QP; a second obtaining unit 3007 configured to obtain the chroma QP mapping table based on the obtained information; a third obtaining unit 3009 configured to obtain a QPc based on the obtained chroma QP mapping table and the obtained QPi; and a fourth obtaining unit 3011 configured to obtain chrominance quantization parameter based on the obtained QPc.

It should be understood that the first, second, third and fourth obtaining units 3005, 3007, 3009, 3011 are shown as separate units. However, two or more or all of these units may effectively been realized by a common obtaining unit or common obtaining units, respectively.

Mathematical Operators

The mathematical operators used in this application are similar to those used in the C programming language. However, the results of integer division and arithmetic shift operations are defined more precisely, and additional operations are defined, such as exponentiation and real-valued division. Numbering and counting conventions generally begin from 0, e.g., "the first" is equivalent to the 0-th, "the second" is equivalent to the 1-th, etc.

Arithmetic Operators

The following arithmetic operators are defined as follows:
+ Addition
− Subtraction (as a two-argument operator) or negation (as a unary prefix operator)
* Multiplication, including matrix multiplication
$x^y$ Exponentiation. Specifies x to the power of y. In other contexts, such notation is used for superscripting not intended for interpretation as exponentiation.
/ Integer division with truncation of the result toward zero. For example, 7/4 and −7/−4 are truncated to 1 and −7/4 and 7/−4 are truncated to −1.
÷ Used to denote division in mathematical equations where no truncation or rounding is intended.
x/y Used to denote division in mathematical equations where no truncation or rounding y is intended.
$\Sigma_{I=x}^{y} f(i)$ The summation of $f(i)$ with i taking all integer values from x up to and including y.
Modulus. Remainder of x divided by y, defined only for integers x and y with x>=0 x % y and y>0.

Logical operators

The following logical operators are defined as follows:
x && y Boolean logical "and" of x and y
x||y Boolean logical "or" of x and y
! Boolean logical "not"
x? y: z If x is TRUE or not equal to 0, evaluates to the value of y; otherwise, evaluates to the value of z.

Relational Operators

The following relational operators are defined as follows:
> Greater than
>=Greater than or equal to
<Less than
<=Less than or equal to
=− Equal to
!= Not equal to When a relational operator is applied to a syntax element or variable that has been assigned the value "na" (not applicable), the value "na" is treated as a distinct value for the syntax element or variable. The value "na" is considered not to be equal to any other value.

Bit-Wise Operators

The following bit-wise operators are defined as follows:
& Bit-wise "and". When operating on integer arguments, operates on a two's complement representation of the integer value. When operating on a binary argument that contains fewer bits than another argument, the shorter argument is extended by adding more significant bits equal to 0.
| Bit-wise "or". When operating on integer arguments, operates on a two's complement representation of the integer value. When operating on a binary argument that contains fewer bits than another argument, the shorter argument is extended by adding more significant bits equal to 0.
^Bit-wise "exclusive or". When operating on integer arguments, operates on a two's complement representation of the integer value. When operating on a binary argument that contains fewer bits than another argument, the shorter argument is extended by adding more significant bits equal to 0.
X>> y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.
X<<y Arithmetic left shift of a two's complement integer representation of x by y binary digits. This function is defined only for non-negative integer values of y. Bits shifted into the least significant bits (LSBs) as a result of the left shift have a value equal to 0.

Assignment Operators

The following arithmetic operators are defined as follows:
=Assignment operator
++Increment, i.e., x++ is equivalent to x=x+1; when used in an array index, evaluates to the value of the variable prior to the increment operation.
−− Decrement, i.e., x−− is equivalent to x=x −1; when used in an array index, evaluates to the value of the variable prior to the decrement operation.
+=Increment by amount specified, i.e., x+=3 is equivalent to x=x+3, and x+=(−3) is equivalent to x=x+(−3).
−=Decrement by amount specified, i.e., x −=3 is equivalent to x=x −3, and x−=(−3) is equivalent to x=x −(−3).

Range Notation

The following notation is used to specify a range of values:
x=y . . . z x takes on integer values starting from y to z, inclusive, with x, y, and z being integer numbers and z being greater than y.

Mathematical Functions

The following mathematical functions are defined:

$$\text{Abs}(x) = \begin{cases} x; & x >= 0 \\ -x; & x < 0 \end{cases}$$

Asin(x) the trigonometric inverse sine function, operating on an argument x that is in the range of −1.0 to 1.0, inclusive, with an output value in the range of −π+2 to π÷2, inclusive, in units of radians Atan(x) the trigonometric inverse tangent function, operating on an argument x, with an output value in the range of −π÷2 to π≥2, inclusive, in units of radians $$\text{Atan2}(y, x) = \begin{cases} \text{Atan}\left(\frac{y}{x}\right); & x > 0 \\ \text{Atan}\left(\frac{y}{x}\right) + \pi; & x < 0 \text{ \&\& } y >= 0 \\ \text{Atan}\left(\frac{y}{x}\right) - \pi; & x < 0 \text{ \&\& } y < 0 \\ +\frac{\pi}{2}; & x == 0 \text{ \&\& } y >= 0 \\ -\frac{\pi}{2}; & \text{otherwise} \end{cases}$$

Ceil(x) the smallest integer greater than or equal to x.

Clip1$_Y(x)$=Clip3(0,(1<<BitDepth$_Y$)−1,x)

Clip1$_C(x)$=Clip3(0,(1<<BitDepth$_C$)−1,x)

$$\text{Clip3}(x, y, z) = \begin{cases} x; & z < x \\ y; & z > y \\ z; & \text{otherwise} \end{cases}$$

Cos(x) the trigonometric cosine function operating on an argument x in units of radians.

Floor(x) the largest integer less than or equal to x.

$$\text{GetCurrMsb}(a, b, c, d) = \begin{cases} c+d; & b-a >= d/2 \\ c-d; & a-b > d/2 \\ c; & \text{otherwise} \end{cases}$$

Ln(x) the natural logarithm of x (the base-e logarithm, where e is the natural logarithm base constant 2.718 281 828 . . . ).

Log 2(x) the base-2 logarithm of x.

Log 10(x) the base-10 logarithm of x.

$$\text{Min}(x, y) = \begin{cases} x; & x <= y \\ y; & x > y \end{cases}$$

$$\text{Max}(x, y) = \begin{cases} x; & x >= y \\ y; & x < y \end{cases}$$

Round(x)=Sign(x)* Floor(Abs(x)+0.5)

$$\text{Sign}(x) = \begin{cases} 1; & x > 0 \\ 0; & x == 0 \\ -1; & x < 0 \end{cases}$$

Sin(x) the trigonometric sine function operating on an argument x in units of radians Sqrt(x)=√x Swap(x, y )=(y, x)

Tan(x) the trigonometric tangent function operating on an argument x in units of radians Order of Operation Precedence When an order of precedence in an expression is not indicated explicitly by use of parentheses, the following rules apply:

Operations of a higher precedence are evaluated before any operation of a lower precedence.

Operations of the same precedence are evaluated sequentially from left to right.

The table below specifies the precedence of operations from highest to lowest; a higher position in the table indicates a higher precedence.

For those operators that are also used in the C programming language, the order of precedence used in this Specification is the same as used in the C programming language.

TABLE

Operation precedence from highest (at top of table) to lowest (at bottom of table)
Text description of logical operations operations (with operands x, y, and z"
""++","x" –"

TABLE-continued

Operation precedence from highest (at top of table) to lowest (at bottom of table)
Text description of logical operations "!x", "–x" (as a unary prefix operator)
x"
"x" y", "x" y", "x" y", """, "" % y""
"" + y"" "" —y""(as a two-argument operator)",""
"" << y"" "" >> y""
"" < y"" "" <= y"" "" > y"" "" >= y""
"" = = y"" "" != y""
"" & y""
"" | y""
"" && y""
"" | | y""
"" ? y : z""
""..y""
"" = y"" "" += y"" "" –= y""

In the text, a statement of logical operations as would be described mathematically in the following form:

if(condition 0)
        statement 0
    else if(condition 1)
        statement 1
    . . .
    else /* informative remark on remaining condition */
        statement n may be described in the following manner:

. . . as follows / . . . the following applies:
    If condition 0, statement 0
    Otherwise, if condition 1, statement 1
    . . .
    Otherwise (informative remark on remaining condition), statement n Each ""f . . . Otherwise, if . . . Otherwise, . . . ."" statement in the text is introduced with "" . . . as follows"" or "" . . . the following applies"" immediately followed by ""f . . . "" The last condition of the ""f . . . Otherwise, if . . . Otherwise, . . . ."" is always an ""therwise, . . . "" Interleaved ""f . . . Otherwise, if . . . Otherwise, . . . ."" statements can be identified by matching "" . . . as follows"" or "" . . . the following applies"" with the ending ""therwise, . . . ""

In the text, a statement of logical operations as would be described mathematically in the following form:

if(condition 0a && condition 0b )
        statement 0
    else if(condition 1a ||condition 1b )
        statement 1
    . . .
    else
        statement n may be described in the following manner:

. . . as follows / . . . the following applies:
    If all of the following conditions are true, statement 0:
        condition 0a
        condition 0b
    Otherwise, if one or more of the following conditions are true, statement 1:
        condition 1a
        condition 1b
    . . .
    Otherwise, statement n In the text, a statement of logical operations as would be described mathematically in the following form:

if(condition 0)
        statement 0 if(condition 1)
    statement 1
may be described in the following manner:
    When condition 0, statement 0
    When condition 1, statement 1

Although embodiments of the disclosure have been primarily described based on video coding, it should be noted that embodiments of the coding system 10, encoder 20 and decoder 30 (and correspondingly the system 10) and the other embodiments described herein may also be configured for still picture processing or coding, i.e. the processing or coding of an individual picture independent of any preceding or consecutive picture as in video coding. In general only inter-prediction units 244 (encoder) and 344 (decoder) may not be available in case the picture processing coding is limited to a single picture 17. All other functionalities (also referred to as tools or technologies) of the video encoder 20 and video decoder 30 may equally be used for still picture processing, e.g. residual calculation 204/304, transform 206, quantization 208, inverse quantization 210/310, (inverse) transform 212/312, partitioning 262/362, intra-prediction 254/354, and/or loop filtering 220, 320, and entropy coding 270 and entropy decoding 304.

Embodiments, e.g. of the encoder 20 and the decoder 30, and functions described herein, e.g. with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit.

Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory, or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

A method of obtaining a chrominance quantization parameter (QP) for chrominance components based on a luminance QP for luminance component, where the method is performed by a decoder. The method includes:
    parsing a received bitstream to obtain the luminance QP and information of a mapping function (f) which associates a QP index (QPi) to the chrominance QP (QPc);
    obtaining the QPi based at least in a part on the luminance QP;
    obtaining the mapping function based on the obtained information; and
    obtaining a QPc based on the obtained mapping function and the obtained QPi.

In an embodiment, the mapping function associates each element x of a set X, where the set X corresponds to QPis in allowed QPi range supported by the decoder, (e.g. 0 to 63 or another part of supported range e.g. 20 to 50) or any subset of the set X, to one element y of a set Y, where the set Y corresponds to QPcs in allowed QPc range supported by the decoder (e.g. 0 to 63 or another part of supported range e.g. 0 to 59 or 18 to 46).

E.g., the QPi range and the QPc range may be the same, or may be different.

In an embodiment, the mapping function is a monotonically increasing (non-decreasing) function.

In an embodiment, the set X includes a subset A on which mapping function $f$ is non-increasing, e.g.:

$$f(x)-f(x-1)=0 \text{ for any } x \text{ of the subset } A.$$

E.g., $A=\{30, 39, 43\}$, $f(30)-f(29)=0$, $f(39)-f(38)=0$, or $f(43)-f(42)=0$; or
$A=\{35, 39, 43\}$, $f(35)-f(34)=0$, $f(39)-f(38)=0$, or $f(43)-f(42)=0$.

In an embodiment, the set X includes a subset B, on which mapping function $f$ is increasing, i.e.:
$f(x)-f(x-1)=c$ for any x of the subset B, where $A+B=X$ and c is a natural number no less than 1.

E.g., c=1 or 2, etc., or c may be a function of x and c(x)>1. In an embodiment, the set X includes a subset B, on which mapping function $f$ is increasing, i.e.:

$f(x)-f(x-1)=c$ for any x of the subset B, where c is a natural number no less than 1.

E.g., c=1 or 2, etc., or c may be a function of x and c(x)>1.

The present disclosure discloses the following further forty-one aspects, listed from the first to forty-first aspect as follows.

A first aspect of a method of obtaining a chrominance quantization parameter (QP) for chrominance components based on a luminance QP for luminance component, where the method is performed by a decoder, includes: parsing a received bitstream to obtain the luminance QP and information of a mapping function ($f$) which associates a QP index (QPi) to the chrominance QP (QPc); obtaining the QPi based at least in a part on the luminance QP; obtaining the mapping function based on the obtained information; and obtaining a QPc based on the obtained mapping function and the obtained QPi.

In a second aspect of a method of the first aspect, the mapping function associates each element x of a set X, where the set X corresponds to QPis in allowed QPi range supported by the decoder, or any subset of the set X, to one element y of a set Y, where the set Y corresponds to QPcs in allowed QPc range supported by the decoder.

In a third aspect of a method according to the second aspect, the mapping function is a monotonically increasing (non-decreasing) function.

In a fourth aspect of a method according to the second or third aspect, the set X includes a subset A on which mapping function f is non-increasing, e.g.:

$f(x)-f(x-1)=0$ for any $x$ of the subset $A$.

In a fifth aspect of a method according to the fourth aspect, the set X includes a subset B, on which mapping function f is increasing, i.e.: $f(x)-f(x-1)=c$ for any x of the subset B, where A+B=X and c is a natural number no less than 1.

In a sixth aspect of a method according to any one of the second to fourth aspects, the set X includes a subset B, on which mapping function f is increasing, i.e.: $f(x)-f(x-1)=c$ for any x of the subset B, where c is a natural number no less than 1.

In a seventh aspect of a method according to the fifth or sixth aspect, the mapping function f on the subset B is defined as follows: $f(x)-f(x-1)=1$, for any x of the subset B.

In an eighth aspect of a method according any one of the first to seventh aspects, the information of the mapping function comprises information of the size of the subset A (sizeA) and elements $a_i$ of the subset A.

In a ninth aspect of a method according any one of the first to eighth aspects, the information of the mapping function comprises the size of the subset A.

In a tenth aspect of a method according to any one of the first to ninth aspects, the information of the mapping function comprises direct values of elements $a_i$ of the subset A.

In an eleventh aspect of a method according to any one of the eighth to tenth aspects, the information of the mapping function comprises a difference (delta_$a_i$) between a current value of the element $a_i$ and a previous value of the element $a_{i+1}$, and values $a_i$ are obtained as follows: $a_i=a_{i+1}$+delta_$a_i$, for any i>0.

In a twelfth aspect of a method according to any one of the eighth to tenth aspects, the information of the mapping function comprises a difference (delta_$a_0$) between a first value $a_0$ and a starting_point_value, where the first value $a_0$ of the subset A is obtained based on the difference (delta_$a_0$) as follows: $a_0$=starting-point value+delta_$a_0$, where starting_point_value is either signaled in the bitstream or is a predefined value, e.g. 0, 21, 30, maxQPi>>1, where maxQPi is the maximum QPi value supported by the decoder, e.g. 63.

In a thirteenth aspect of a method according to any one of the first to twelfth aspects, the information of the mapping function is signaled in the bitstream using any of the following codes: binary, fixed length, unary, truncated unary, truncated binary, Golomb or Exp-Golomb code.

In a fourteenth aspect of a method according to any one of the first to thirteenth aspects, the mapping function is obtained using defined function behavior on subsets A and B, i.e. for any input argument x from subset B function increase e.g. by 1 such as f(x)−$f$(x−1)1, and for any input argument x from subset A function as flat such as, $f$(x)−$f$(x−1)=0; taking an assumption that first value of mapping function corresponding to x=0 is 0; E.g., it can be implemented iteratively using following pseudo code:

```
chroma_qp_mapping_table[0] = 0;        // initialization
for (i = 1; i <= maxQP; i++)           // maxQP is maximum QP supported by decoder
{
   int incStep = 1;                    // function increment for set B
   for (j = 0; j < cQpFlatSize; j++) // cQpFlatSize is size of set A
   {
      if (i == cQpFlat[j])             // cQpFlat array with elements of set A
      {
         incStep = 0;                  // zero function increment for set A (flat)
         break;
      }
   }
   chroma_qp_mapping_table[i] = chroma_qp_mapping_table[i-1] + incStep;
}.
```

In a fifteenth aspect of a method according to any one of the fourth to fourteenth aspects, the information of the mapping function comprises information of values b of the subset B, and the subset A is obtained as A=X−B.

In a sixteenth aspect of a method according to any one of the fourth to fourteenth aspects, the subset B includes a sub-subset $B_k$, where the sub-subset $B_k$ includes elements x at which the mapping function has same increment $c_k$: $f(x)-f(x-1)=c_k$, if x∈$B_k$, where $c_k$ is a natural number. E.g., $c_k$ equal to 0, 1, 2, 3, 4 . . . . In other words, subset B may be split on different sub-subsets depending on amount of mapping function incensement at points x of sub-subset $B_k$.

In a seventeenth aspect of a method according to the sixteenth aspect, the information of the mapping function comprises information of the size of at least one of the sub-subsets $B_k$ (size $B_k$) and elements b, of at least one of the sub-subsets $B_k$.

In an eighteenth aspect of a method according to the sixteenth or seventeenth aspect, the information of the mapping function comprises information of the value of increment of the mapping function at points of sub-subset $B_k$.

In a nineteenth aspect of a method according to the sixteenth or seventeenth aspect, the information of the mapping function comprises information of the amount of sub-subsets $B_k$.

In a twentieth aspect of a method according to any one of the sixteenth to nineteenth aspects, at least a part of the information of the mapping function (e.g., the information of the sub-subsets $B_k$) is obtained using following syntax:

| | |
|---|---|
| cqp_set_num_m1 | ue(v) |
| for ( k = 0; k <= cqp_set_num_m1; k++ ) { | |
|   cqp_set_inc[ k ] | ue(v) |
|   cqp_set_size_m1[ k ] | ue(v) |
|   cqp_set_p0[k] | ue(v) |
|   for ( i = 1; i <= cqp_set_size_m1[ k ]; i++ | |
|   ) | |
|     cqp_set_delta_m1[ k ][ i ] | ue(v) |
| } | |

In a twenty-first aspect of a method according to any one of the sixteenth to nineteenth aspects, at least a part of the information of the mapping function (e.g., the information of the sub-subsets $B_k$) is obtained using following syntax:

| | |
|---|---|
| cqp_set_num_m1 | ue(v) |
| for ( k = 0; k <= cqp_set_num_m1; k++ ) { | |
|   cqp_set_inc[ k ] | ue(v) |
|   cqp_set_size_m1[ k ] | ue(v) |
|   cqp_set_p0[k] | u(7) |
|   for ( i = 1; i <= cqp_set_size_m1[ k ]; i++ | |
|   ) | |
|     cqp_set_delta_m1[ k ][ i ] | ue(v) |
| } | |

In a twenty-second aspect of a method according to the second or third aspect, the mapping function is a piecewise function, and the information of the mapping function comprises breakpoints, or change points, or pivot points of the piecewise function.

In a twenty-third aspect of a method according to the twenty-second aspect, the amount of breakpoints, or change points, or pivot points and its x and y coordinates are signaled in the bitstream in direct form or using differences between a current point coordinates and a previous point coordinates.

In a twenty-fourth aspect of a method according to the twenty-second or twenty-third aspect, the mapping function is a piecewise function based on: linear equation; exponential equation; logarithmic equation; or combinations of equations above.

In a twenty-fifth aspect of a method according to the twenty-fourth aspect, parameters of the piecewise functions are obtained based on pivot points, e.g. as an example for linear equation: slope (Ey−Dy) (Ex−Dx), b=Dy+slope*Dx; where D (94) and E (95) are exemplary change points with coordinates Dx, Dy and Ex, Ey correspondingly, and slope and b are parameters of linear equation, such as y=slope*x+ b.

In a twenty-sixth aspect of a method according to the second or third aspect, the set X includes a subset C; the information of the mapping function comprises information of starting index (x start) of the subset C and ending index (x_end) of the subset C.

In a twenty-seventh aspect of a method according to the twenty-fifth or twenty-sixth aspect, the information of the mapping function comprises information of the delta values of the mapping function $f(x)-f(x-1)$, for any x of the subset C.

In a twenty-eighth aspect of a method according to the twenty-seventh aspect, the delta values is obtained using the following syntax:

| | |
|---|---|
| sps_qpc_x_start | u(7) |
| sps_qpc_x_end | u(7) |
| for( i = sps_qpc_x_start; i <= sps_qpc_x_end; i++ ) | |
|   sps_qpc_cb_delta[ i ] | ue(v) | where sps_qpc_cb_delta[ i ] represents the delta values.

In a twenty-ninth aspect of a method according to the twenty-seventh aspect, In a the delta values is in the range of 0 to 1.

In a thirtieth aspect of a method according to the twenty-ninth aspect, the delta values is obtained using the following syntax:

| | |
|---|---|
| sps_qpc_x_start | u(7) |
| sps_qpc_x_end | u(7) |
| for( i = sps_qpc_x_start; i <= sps_qpc_x_end; i++ ) | |
|   sps_qpc_cb_delta[ i ] | ue(1) | where sps_qpc_cb_delta[ i ] represents the delta values.

In a thirty-first aspect of a method according to any one of the twenty-sixth to thirtieth aspects, the information of the mapping function is signaled using any of the following codes: binary, fixed length, unary, truncated unary, truncated binary, Golomb or Exp-Golomb code.

In a thirty-second aspect of a method according to any one of the first to thirty-first aspects, the decoder further comprises a predefined mapping function, and the bitstream comprises a indicator indicating whether to use the predefined mapping function or use a mapping function signaled in the bitstream.

In a thirty-third aspect of a method according to any one of the first to thirty-second aspects, the information of the mapping function is signaled for both Cb and Cr components (chrominance components).

In a thirty-fourth aspect of a method according to any one of the first to thirty-third aspects, the information of the mapping function comprises an indicator indicating whether mapping function is signaled for Cb and Cr components separately or jointly.

In a thirty-fifth aspect of a method according to any one of the first to thirty-fourth aspects, the information of the mapping function is signaled at: sequence level in sequence parameter set, or picture level in picture parameter set, or tile group level in tile group parameter set, or in adaptation parameter set, or in supplemental enhancement information (SEI) message.

In a thirty-sixth aspect of a method according to any one of the first to thirty-fifth aspects, the mapping function is expressed as a table as following:

| qPi  | <30   | 30 | 31 | 32 | 33 | 34 | 35 | 36 | 37 | 38 | 39 | 40 | 41 | 42 | 43 | >43      |
|------|-------|----|----|----|----|----|----|----|----|----|----|----|----|----|----|----------|
| QpC  | = qPi | 29 | 30 | 31 | 32 | 33 | 34 | 35 | 36 | 37 | 37 | 38 | 39 | 40 | 40 | = qPi −3 |

In a thirty-seventh aspect of a method according to any one of the first to thirty-seventh aspects, the mapping function is expressed as a table as following:

| qPi    | <35   | 35 | 36 | 37 | 38 | 39 | 40 | 41 | 42 | 43 | >43       |
|--------|-------|----|----|----|----|----|----|----|----|----|-----------|
| $Qp_C$ | = qPi | 34 | 35 | 36 | 37 | 37 | 38 | 39 | 40 | 40 | = qPi − 3 |

In a thirty-eighth aspect of a method according to any one of the first to thirty-sixth aspects, the information of the mapping function is signaled in the bitstream directly or indirectly.

A thirty-ninth aspect of a decoder (30) includes processing circuitry for carrying out the method according to any one of the first to thirty-eighth aspect.

A fortieth aspect of a computer program product includes a program code for performing the method according to any one of the first to thirty-eighth aspect.

A forty-first aspect of a decoder, includes: one or more processors; and a non-transitory computer-readable storage medium coupled to the processors and storing programming for execution by the processors, where the programming, when executed by the processors, configures the decoder to carry out the method according to any one of the first to thirty-eighth aspect.

Furthermore, the present disclosure discloses the following further forty-one aspects, listed from the first to twenty-fifth aspects as follows:

A first aspect of a method of obtaining quantization parameter (QP) for chrominance components based on QP for luminance component, where the method is performed by a decoder, includes:
  obtaining a luminance QP;
  obtaining, by parsing a received bitstream, information for obtaining a mapping function ($f$) which associates the luminance QP to the chrominance QP;
  obtaining the mapping function based on the obtained information;
  obtaining a chrominance QP based on the mapping function.

In a second aspect of a method of the first aspect, the mapping function associates each element x of a set X, where the set X corresponds to luminance QPs in allowed luminance QP range supported by the decoder, (e.g. 0 to 63 or another part of supported range e.g. 20 to 50) or any subset of the set X, to one element y of a set Y, where the set Y corresponds to chrominance QPs in allowed chrominance QP range supported by the decoder (e.g. 0 to 63 or another part of supported range e.g. 0 to 59 or 18 to 46). E.g., the luminance QP range and the chrominance QP range may be the same, or may be different.

In a third aspect of a method according to the second aspect, the mapping function is a monotonically increasing (non-decreasing) function.

In a third aspect of a method according to the second aspect, the set X includes a subset A on which mapping function f is non-increasing, e.g.: $f(x)-f(x-1)=0$ for any x of set A (e.g. A={30, 39, 43}). E.g., $f(30)-f(29)=0$, $f(39)-f(38)=0$, or $f(43)-f(42)=0$.

In a fifth aspect of a method according to the second aspect, the set X includes a subset B, on which mapping function f is increasing, i.e.: $f(x)-f(x-1)=c$, where c is function of x and $c(x)>=1$, for any x of the subset B. E.g., the subset B may equal to X −A, in other words, the subset A and the subset B are two non-overlapping subsets of X such as A+B=X.

In a sixth aspect of a method according to the fifth aspect, the mapping function f on the subset B is defined as follows: $f(x)-f(x-1)=1$, for any x of the subset B.

In a seventh aspect of a method according to any one of the first to sixth aspects, the information for obtaining mapping function signaled in the bitstream comprises information for obtaining size of the subset A (sizeA) and elements $a_i$ of the subset A.

In an eighth aspect of a method according to the seventh aspect, the information for obtaining mapping function signaled in the bitstream comprises size of the subset A.

In a ninth aspect of a method according the seventh aspect, the information for obtaining mapping function signaled in the bitstream comprises direct values of elements $a_i$.

In a tenth aspect of a method according the seventh aspect, the information for obtaining mapping function signaled in the bitstream comprises a difference (delta_$a_i$) between a current value of the element $a_i$ and a previous value of the element $a_{i-1}$, and values $a_i$ are obtained as follows: $a_i=a_{i+1}+\text{delta}\_a_i$, for any i>0.

In an eleventh aspect of a method according the seventh aspect, a first value $a_0$ of the subset A is obtained based on a difference (delta_$a_0$) between $a_0$ and a starting_point_value, and where the difference (delta_$a_0$) is signaled in the bitstream, and the first value $a_0$ is obtained as follows: $a_0$=starting_point_value+delta_$a_0$, where starting_point_value is either signaled in the bitstream or is a predefined value, e.g. 0, 21, 30, maxQP>>1, where maxQP is the maximum QP value supported by the decoder, e.g. 63.

In a twelfth aspect of a method according to any one of the seventh to eleventh aspects, the information for obtaining mapping function from the bitstream is signaled using any of the following codes: binary, unary, truncated unary, truncated binary, Golomb or Exp-Golomb code.

In a thirteenth aspect of a method according to any one of the first to eleventh aspects, the mapping function is obtained using defined function behavior on subsets A and B, i.e. for any input argument x from subset B function increase e.g. by 1 such as $f(x)-f(x-1)=1$, and for any input argument x from subset A function as flat such as, $f(x)-f(x-1)=0$; taking an assumption that first value of mapping function corresponding to x=0 is 0. E.g., it can be implemented iteratively using following pseudo code:

```
chroma_qp_mapping_table[0] = 0;      // initialization
for (i = 1; i <= maxQP; i++)         // maxQP is maximum QP supported by decoder
{
    int incStep = 1;                 // function increment for set B
```

```
    for (j = 0; j < cQpFlatSize; j++) // cQpFlatSize is size of set A
    {
      if (i == cQpFlat[j])             // cQpFlat array with elements of set A
      {
        incStep = 0;                   // zero function increment for set A (flat)
        break;
      }
    }
    chroma_qp_mapping_table[i] = chroma_qp_mapping_table[i-1] + incStep;
}.
```

In a fourteenth aspect of a method according to any one of the fourth to twelfth aspects, the information for obtaining mapping function signaled in the bitstream comprises information for obtaining values b of the subset B, and the subset A is obtained as A=X-B.

In a fifteenth aspect of a method according to the second aspect, the mapping function is a piecewise function, and the information for obtaining mapping function signaled in the bitstream comprises breakpoints (or change points, or pivot points) of the piecewise function.

In a sixteenth aspect of a method according to the fifteenth aspect, the amount of breakpoints (or change points, or pivot points) and its x and y coordinates are signaled in the bitstream in direct form or using differences between a current point coordinates and a previous point coordinates.

In a seventeenth aspect of a method according to the fifteenth or sixteenth aspect, the mapping function is a piecewise function based on: linear equation; exponential equation; logarithmic equation; or combinations of equations above.

In an eighteenth aspect of a method according to the seventeenth aspect, parameters of the piecewise functions are obtained based on pivot points, e.g. as an example for linear equation: slope (Ey −Dy) (Ex−Dx), b=Dy+slope*Dx. where D (94) and E (95) are exemplary change points with coordinates Dx, Dy and Ex, Ey correspondingly, and slope and b are parameters of linear equation, such as y=slope*x+b.

In a nineteenth aspect of a method according to any one of the first to eighteenth aspects, the decoder further comprises a predefined mapping function, and the bitstream comprises a indicator indicating whether to use the predefined mapping function or use a mapping function signaled in the bitstream.

In a twentieth aspect of a method according to any one of the first to nineteenth aspect, the information for obtaining mapping function is signaled for both Cb and Cr components (chrominance components).

In a twenty-first aspect of a method according to any one of the first to twentieth aspects, the information for obtaining mapping function comprises an indicator indicating whether mapping function is signaled for Cb and Cr components separately or jointly.

In a twenty-second aspect of a method according to any one of the first to twenty-first aspects, the information for obtaining mapping function is signaled at: sequence level in sequence parameter set, picture level in picture parameter set, or tile group level in tile group parameter set in adaptation parameter set.

A twenty-third aspect of a decoder (30) includes processing circuitry for carrying out the method according to any one of the first to twenty-second aspects.

A twenty-fourth aspect of a computer program product includes a program code for performing the method according to any one of the first to twenty-second aspects.

A twenty-fifth aspect of a decoder, includes: one or more processors; and a non-transitory computer-readable storage medium coupled to the processors and storing programming for execution by the processors, where the programming, when executed by the processors, configures the decoder to carry out the method according to any one of the first to twenty-second aspects.

Furthermore, the present disclosure discloses the following further forty-one aspects, listed from the first to thirty-second aspects as follows.

A first aspect of a method of obtaining a chrominance quantization parameter (QP) for chrominance components based on a luminance QP for luminance component, where the method is performed by a decoder, includes: parsing a received bitstream to obtain the luminance QP and information of a mapping function (Q) which associates a QP index (QPi) to the chrominance QP (QPc); obtaining the QPi based at least in a part on the luminance QP; obtaining the mapping function based on the obtained information; and obtaining a QPc based on the obtained mapping function and the obtained QPi.

In a second aspect of a method of the first aspect, the mapping function associates each element x of a set X, where the set X corresponds to QPis in allowed QPi range supported by the decoder, or any subset of the set X, to one element y of a set Y, where the set Y corresponds to QPcs in allowed QPc range supported by the decoder.

In a third aspect of a method according to the second aspect, the mapping function is a monotonically increasing (non-decreasing) function.

In a fourth aspect of a method according to the second aspect, the set X includes a subset A on which mapping function f is non-increasing, e.g.: $f(x)-f(x-1)=0$ for any x of the subset A.

In a fifth aspect of a method according to the fourth aspect, the set X includes a subset B, on which mapping function f is increasing, i.e.: $f(x)-f(x-1)=c$ for any x of the subset B, where A+B=X and c is a natural number no less than 1.

In a sixth aspect of a method according to any one of the second to fourth aspects, the set X includes a subset B, on which mapping function f is increasing, i.e.: $f(x)-f(x-1)=c$ for any x of the subset B, where c is a natural number no less than 1.

In a seventh aspect of a method according to the fifth or sixth aspect, the mapping function f on the subset B is defined as follows: $f(x)-f(x-1)=1$, for any x of the subset B.

In an eighth aspect of a method according any one of the first to seventh aspects, the information for obtaining mapping function signaled in the bitstream comprises information for obtaining size of the subset A (sizeA) and elements $a_i$ of the subset A.

In a ninth aspect of a method according to the eighth aspect, the information for obtaining mapping function signaled in the bitstream comprises size of the subset A.

In a tenth aspect of a method according to the eighth aspect, the information for obtaining mapping function signaled in the bitstream comprises direct values of elements $a_i$.

In an eleventh aspect of a method according to the eighth aspect, the information for obtaining mapping function signaled in the bitstream comprises a difference (delta_$a_i$) between a current value of the element $a_i$ and a previous value of the element $a_{i+1}$-, and values $a_i$ are obtained as follows: $a_i = a_{i+1} - + \text{delta}\_a_i$, , for any i>0.

In a twelfth aspect of a method according to the eighth aspect, a first value $a_0$ of the subset A is obtained based on a difference (delta_$a_0$) between $a_0$ and a starting_point_value, and where the difference (delta_$a_0$) is signaled in the bitstream, and the first value $a_0$ is obtained as follows: $a_0$=starting_point_value+delta_$a_0$, where starting_point_value is either signaled in the bitstream or is a predefined value, e.g. 0, 21, 30, maxQPi>>1, where maxQPi is the maximum QPi value supported by the decoder, e.g. 63.

In a thirteenth aspect of a method according to any one of the eighth to twelfth aspects, the information for obtaining mapping function from the bitstream is signaled using any of the following codes: binary, unary, truncated unary, truncated binary, Golomb or Exp-Golomb code.

In a fourteenth aspect of a method according to any one of the first to eleventh aspects, the mapping function is obtained using defined function behavior on subsets A and B, i.e. for any input argument x from subset B function increase e.g. by 1 such as $f(x)-f(x-1)1$, and for any input argument x from subset A function as flat such as, $f(x)-f(x-1)=0$; taking an assumption that first value of mapping function corresponding to x=0 is 0. E.g., it can be implemented iteratively using following pseudo code:

In an eighteenth aspect of a method according to the sixteenth or seventeenth aspect, the information for obtaining mapping function signaled in the bitstream comprises information for obtaining value of increment of mapping function at points of sub-subset $B_k$.

In a nineteenth aspect of a method according to the sixteenth or seventeenth aspect, the information for obtaining mapping function signaled in the bitstream comprises information for obtaining amount of sub-subsets $B_k$.

In a twentieth aspect of a method according to the second aspect, the mapping function is a piecewise function, and the information for obtaining mapping function signaled in the bitstream comprises breakpoints (or change points, or pivot points) of the piecewise function.

In a twenty-first aspect of a method according to the twentieth aspect, amount of breakpoints (or change points, or pivot points) and its x and y coordinates are signaled in the bitstream in direct form or using differences between a current point coordinates and a previous point coordinates.

In a twenty-second aspect of a method according to the twentieth or twenty-first aspect, the mapping function is a piecewise function based on: linear equation; exponential equation; logarithmic equation; or combinations of equations above.

In a twenty-third aspect of a method according to the twenty-second aspect, parameters of the piecewise functions are obtained based on pivot points, e.g. as an example for linear equation: slope (Ey −Dy) (Ex−Dx), b Dy+slope*Dx. where D (94) and E (95) are exemplary change points with coordinates Dx, Dy and Ex, Ey correspondingly, and slope and b are parameters of linear equation, such as y=slope**x+b.

```
chroma_qp_mapping_table[0] = 0;         // initialization
for (i = 1; i <= maxQP; i++)            // maxQP is maximum QP supported by decoder
{
   int incStep = 1;                     // function increment for set B
   for (j = 0; j < cQpFlatSize; j++)    // cQpFlatSize is size of set A
   {
      if (i == cQpFlat[j])              // cQpFlat array with elements of set A
      {
         incStep = 0;                   // zero function increment for set A (flat)
         break;
      }
   }
   chroma_qp_mapping_table[i] = chroma_qp_mapping_table[i-1] + incStep;
}.
```

In a fifteenth aspect of a method according to any one of the fourth to thirteenth aspects, the information for obtaining mapping function signaled in the bitstream comprises information for obtaining values b of the subset B, and the subset A is obtained as A=X-B.

In a sixteenth aspect of a method according to any one of the fourth to thirteenth aspects, the subset B includes a sub-subset $B_k$, where the sub-subset $B_k$ includes elements x at which the mapping function has same increment $c_k$: $f(x)-f(x-1)=c_k$ if $x \in B_k$, where $c_k$ is a natural number. E.g., $c_k$ equal to 0, 1, 2, 3, 4 . . . . In other words, subset B may be split on different sub-subsets depending on amount of mapping function incensement at points x of sub-subset $B_k$.

In a seventeenth aspect of a method according to the sixteenth aspect, the information for obtaining mapping function signaled in the bitstream comprises information for obtaining size of at least one of the sub-subsets $B_k$ (size $B_k$) and elements b, of at least one of the sub-subsets $B_k$.

In a twenty-fourth aspect of a method according to any one of the first to twenty-third aspects, the decoder further comprises a predefined mapping function, and the bitstream comprises a indicator indicating whether to use the predefined mapping function or use a mapping function signaled in the bitstream.

In a twenty-fifth aspect of a method according any one of the first to twenty-fourth aspects, the information for obtaining mapping function is signaled for both Cb and Cr components (chrominance components).

In a twenty-sixth aspect of a method according to any one of the first to twenty-fifth aspects, the information for obtaining mapping function comprises an indicator indicating whether mapping function is signaled for Cb and Cr components separately or jointly.

In a twenty-seventh aspect of a method according to any one of the first to twenty-sixth aspects, the information for obtaining mapping function is signaled at: sequence level in sequence parameter set, or picture level in picture parameter set, or tile group level in tile group parameter set, or in adaptation parameter set, or in supplemental enhancement information (SEI) message.

In a twenty-eighth aspect of a method according to any one of the first to twenty-seventh aspects, the mapping function is expressed as a table as following:

| qPi | <30 | 30 | 31 | 32 | 33 | 34 | 35 | 36 | 37 | 38 | 39 | 40 | 41 | 42 | 43 | >43 |
|---|---|---|---|---|---|---|---|---|---|---|---|---|---|---|---|---|
| QpC | = qPi | 29 | 30 | 31 | 32 | 33 | 34 | 35 | 36 | 37 | 37 | 38 | 39 | 40 | 40 | = qPi − 3 |

In a twenty-ninth aspect of a method according to any one of the first to twenty-seventh aspects, the mapping function is expressed as a table as following:

| qPi | <35 | 35 | 36 | 37 | 38 | 39 | 40 | 41 | 42 | 43 | >43 |
|---|---|---|---|---|---|---|---|---|---|---|---|
| $Qp_C$ | = qPi | 34 | 35 | 36 | 37 | 37 | 38 | 39 | 40 | 40 | = qPi − 3 |

A thirtieth aspect of a decoder (30) includes processing circuitry for carrying out the method according to any one of the first to twenty-ninth aspects.

A thirty-first aspect of a computer program product includes a program code for performing the method according to any one of the first to twenty-ninth aspects.

A thirty-second aspect of a decoder, includes: one or more processors; and a non-transitory computer-readable storage medium coupled to the processors and storing programming for execution by the processors, where the programming, when executed by the processors, configures the decoder to carry out the method according to any one of the first to twenty-ninth aspects.

Furthermore, the present disclosure discloses the following further forty-one aspects, listed from the first to forty-first aspects as follows.

A first aspect of a method of obtaining a chrominance quantization parameter (QP) for chrominance components based on a luminance QP for luminance component, where the method is performed by a decoder, includes: parsing a received bitstream to obtain the luminance QP and information of a mapping function (Q) which associates a QP index (QPi) to the chrominance QP (QPc); obtaining the QPi based at least in a part on the luminance QP; obtaining the mapping function based on the obtained information; and obtaining a QPc based on the obtained mapping function and the obtained QPi.

Having chroma QP mapping information in the bitstream allows to adjust to specific properties of an input video signal, such as SDR or HDR, or different intensity and distribution on luminance and chrominance channels, and therefore to improve compression efficiency and to improve balancing between chroma and luma components in reconstructed video.

In a second aspect of a method of the first aspect, the mapping function associates each element x of a set X, where the set X corresponds to QPis in allowed QPi range supported by the decoder, or any subset of the set X, to one element y of a set Y, where the set Y corresponds to QPcs in allowed QPc range supported by the decoder.

In a third aspect of a method according to the second aspect, the mapping function is a monotonically increasing (non-decreasing) function.

Putting this restriction on the mapping function allows avoiding configuring of the mapping function with "weird", e.g. unexpected and undesirable behavior when chroma QP decreases with increasing of luma QP, in other words avoiding the case when chroma quality increases with decreasing quality of luma. Having monotonic increasing constrain allows luma and chroma quality to be synchronized. As additional advantage, this restriction allows to save bits on signaling of mapping function information by excluding necessity to describe negative incensement of the function.

In a fourth aspect of a method according to the second or third aspect, the set X includes a subset A on which mapping function f is non-increasing, e.g.: $f(x)-f(x-1)=0$ for any x of the subset A.

In a fifth aspect of a method according to the fourth aspect, the set X includes a subset B, on which mapping function f is increasing, i.e.: $f(x)-f(x-1)=c$ for any x of the subset B, where A+B=X and c is a natural number no less than 1.

In a sixth aspect of a method according to any one of the second to fourth aspects, the set X includes a subset B, on which mapping function f is increasing, i.e.: $f(x)-f(x-1)=c$ for any x of the subset B, where c is a natural number no less than 1.

In a seventh aspect of a method according to the fifth or sixth aspect, the mapping function f on the subset B is defined as follows: $f(x)-f(x-1)=1$, for any x of the subset B.

In an eighth aspect of a method according any one of the first to seventh aspects, the information of the mapping function comprises information of the size of the subset A (sizeA) and elements $a_i$ of the subset A.

This beneficially allows saving bits by signaling only points (subset A) where function behavior differs from normal, predefined behavior (subset B).

In a ninth aspect of a method according any one of the first to eighth aspects, the information of the mapping function comprises the size of the subset A.

In a tenth aspect of a method according to any one of the first to ninth aspects, the information of the mapping function comprises direct values of elements $a_i$ of the subset A.

In an eleventh aspect of a method according to any one of the eighth to tenth aspects, the information of the mapping function comprises a difference (delta_$a_i$) between a current value of the element $a_i$ and a previous value of the element $a_{i+1}$-, and values $a_i$ are obtained as follows:

$a_i=a_{i-1}+\text{delta}\_a_i$, for any $i>0$.

Signaling differences instead of direct values allows additionally to save bits.

In a twelfth aspect of a method according to any one of the eighth to tenth aspects, the information of the mapping function comprises a difference (delta_$a_0$) between a first value $a_0$ and a starting_point_value, where the first value $a_0$ of the subset A is obtained based on the difference (delta_$a_0$) as follows:

$a_0=\text{starting\_point\_value}+\text{delta}\_a_0$, where starting_point_value is either signaled in the bitstream or is a predefined value, e.g. 0, 21, 30, maxQPi>>1, where maxQPi is the maximum QPi value supported by the decoder, e.g. 63.

In a thirteenth aspect of a method according to any one of the first to twelfth aspects, the information of the mapping function is signaled in the bitstream using any of the following codes: binary, fixed length, unary, truncated unary, truncated binary, Golomb or Exp-Golomb code.

In a fourteenth aspect of a method according to any one of the first to thirteenth aspects, the mapping function is obtained using defined function behavior on subsets A and B, i.e. for any input argument x from subset B function increase e.g. by 1 such as $f(x)-f(x-1)1$, and for any input argument x from subset A function as flat such as, $f(x)-f(x-1)=0$; taking an assumption that first value of mapping function corresponding to x=0 is 0; E.g., it can be implemented iteratively using following pseudo code:

```
chroma_qp_mapping_table[0] = 0;        // initialization
for (i = 1; i <= maxQP; i++)            // maxQP is maximum QP supported by decoder
{
  int incStep = 1;                      // function increment for set B
  for (j = 0; j < cQpFlatSize; j++)    // cQpFlatSize is size of set A
  {
    if (i == cQpFlat[j])                // cQpFlat array with elements of set A
    {
      incStep = 0;                      // zero function increment for set A (flat)
      break;
    }
  }
  chroma_qp_mapping_table[i] = chroma_qp_mapping_table[i-1] + incStep;
}.
```

In a fifteenth aspect of a method according to any one of the fourth to fourteenth aspects, the information of the mapping function comprises information of values b of the subset B, and the subset A is obtained as A=X-B.

This allows obtaining the function behavior for entire set X of supported values of QPi with minimized signaling overhead by signaling only those points, where the function behavior differs from predefined behavior.

In a sixteenth aspect of a method according to any one of the fourth to fourteenth aspects, the subset B includes a sub-subset $B_k$, where the sub-subset $B_k$ includes elements x at which the mapping function has same increment $c_k$: $f(x)-f(x-1)=c_k$, if $x \in B_k$, where $c_k$ is a natural number. E.g., $c_k$ equal to 0, 1, 2, 3, 4 . . . . In other words, subset B may be split on different sub-subsets depending on amount of mapping function incensement at points x of sub-subset $B_k$.

This allows increasing flexibility of mapping function definition by adding points where function may have different speed of incensements ($c_k$).

In a seventeenth aspect of a method according to the sixteenth aspect, the information of the mapping function comprises information of the size of at least one of the sub-subsets $B_k$ (size $B_k$) and elements b, of at least one of the sub-subsets $B_k$.

In an eighteenth aspect of a method according to the sixteenth or seventeenth aspect, the information of the mapping function comprises information of the value of increment of the mapping function at points of sub-subset $B_k$.

In a nineteenth aspect of a method according to the sixteenth or seventeenth aspect, the information of the mapping function comprises information of the amount of sub-subsets $B_k$.

In a twentieth aspect of a method according to any one of the sixteenth to nineteenth aspects, at least a part of the information of the mapping function (e.g., the information of the sub-subsets $B_k$) is obtained using following syntax:

| | |
|---|---|
| cqp_set_num_m1 | ue(v) |
| for ( k = 0; k <= cqp_set_num_m1; k++ ) { | |
|   cqp_set_inc[ k ] | ue(v) |
|   cqp_set_size_m1[ k ] | ue(v) |
|   cqp_set_p0[k] | ue(v) |
|   for ( i = 1; i <= cqp_set_size_m1[ k ]; i++ ) | |
|     cqp_set_delta_m1[ k ][ i ] | ue(v) |
| } | |

In a twenty-first aspect of a method according to any one of the sixteenth to nineteenth aspects, at least a part of the information of the mapping function (e.g., the information of the sub-subsets $B_k$) is obtained using following syntax:

| | |
|---|---|
| cqp_set_num_m1 | ue(v) |
| for ( k = 0; k <= cqp_set_num_m1; k++ ) { | |
|   cqp_set_inc[ k ] | ue(v) |
|   cqp_set_size_m1[ k ] | ue(v) |
|   cqp_set_p0[k] | u(7) |
|   for ( i = 1; i <= cqp_set_size_m1[ k ]; i++ ) | |
|     cqp_set_delta_m1[ k ][ i ] | ue(v) |
| } | |

In a twenty-second aspect of a method according to the second or third aspect, the mapping function is a piecewise function, and the information of the mapping function comprises breakpoints, or change points, or pivot points of the piecewise function.

This aspect allows to describe function behavior with limited signaling overhead by signaling only points where function changes its behavior (e.g. slope of the line), and then describe the function as piecewise between change points or pivot point.

In a twenty-second aspect of a method according to the second or third aspect, the amount of breakpoints, or change points, or pivot points and its x and y coordinates are signaled in the bitstream in direct form or using differences between a current point coordinates and a previous point coordinates.

Signaling differences allows additionally to save bits in contrast with signaling of direct values of pivot points coordinates.

In a twenty-fourth aspect of a method according to the twenty-second or twenty-third aspect, the mapping function is a piecewise function based on: linear equation; exponential equation; logarithmic equation; or combinations of equations above.

Using a predefined equation form for piecewise function (e.g. linear equation) allows to obtain function values between pivot points without explicit signaling of it, that beneficially reduces signaling overhead on describing mapping function.

In a twenty-fifth aspect of a method according to the twenty-fourth aspect, parameters of the piecewise functions are obtained based on pivot points, e.g. as an example for linear equation: slope (Ey −Dy) (Ex−Dx), b Dy+slope*Dx; where D (94) and E (95) are exemplary change points with coordinates Dx, Dy and Ex, Ey correspondingly, and slope and b are parameters of linear equation, such as y=slope*x+b.

In order to achieve monotonically increasing of the mapping function the slope should be non-negative, which can be achieved by applying restriction on deltas (Ey Dy) and (Ex−Dx), of having same sign, in particular be non-negative, e.g. greater or equal to zero. To achieve that, unsigned codes can be used to signal the differences, e.g. unsigned integer 0-th order Exp-Golomb code. As additional technical benefit, having monastically increasing restriction allows to use unsigned code to signal the deltas, which allows saving bits on sign of deltas.

In a twenty-sixth aspect of a method according to the second or third aspect, the set X includes a subset C; the information of the mapping function comprises information of starting index (x start) of the subset C and ending index (x_end) of the subset C.

In a twenty-seventh aspect of a method according to the twenty-fifth or twenty-sixth aspect, the information of the mapping function comprises information of the delta values of the mapping function $f(x)-f(x-1)$, for any x of the subset C.

In a twenty-eighth aspect of a method according to the twenty-seventh aspect, the delta values is obtained using the following syntax:

```
sps_qpc_x_start                              u(7)
sps_qpc_x_end                                u(7)
for( i = sps_qpc_x_start; i <= sps_qpc_x_end;
i++ )
   sps_qpc_cb_delta[ i ]                     ue(v)
``` where sps_qpc_cb_delta[i ] represents the delta values.

In a twenty-ninth aspect of a method according to the twenty-seventh aspect, the delta values is in the range of 0 to 1.

In a thirtieth aspect of a method according to the twenty-ninth aspect, the delta values is obtained using the following syntax:

```
sps_qpc_x_start                              u(7)
sps_qpc_x_end                                u(7)
for( i = sps_qpc_x_start; i <= sps_qpc_x_end;
i++ )
   sps_qpc_cb_delta[ i ]                     ue(1)
``` where sps_qpc_cb_delta[i ] represents the delta values.

In a thirty-first aspect of a method according to any one of the twenty-sixth to thirtieth aspects, the information of the mapping function is signaled using any of the following codes: binary, fixed length, unary, truncated unary, truncated binary, Golomb or Exp-Golomb code.

In a thirty-second aspect of a method according to any one of the first to thirty-first aspects, the decoder further comprises a predefined mapping function, and the bitstream comprises a indicator indicating whether to use the predefined mapping function or use a mapping function signaled in the bitstream.

This aspect allows to signal information about mapping function only for cases when it is beneficial, that is, when luma and chroma channel characteristics differs significantly from common cases, like for HDR signal, and use predefined mapping function appropriate for common cases. That allows saving signaling overhead for most common cases.

In a thirty-third aspect of a method according to any one of the first to thirty-second aspects, the information of the mapping function is signaled for both Cb and Cr components (chrominance components).

In a thirty-fourth aspect of a method according to any one of the first to thirty-third aspects, the information of the mapping function comprises an indicator indicating whether mapping function is signaled for Cb and Cr components separately or jointly.

This aspect allows further increase flexibility of controlling quantization process for the cases when different chroma channels (Cb and Cr) have different signal characteristics, which in turn allows to further increase compression efficiency.

In a thirty-fifth aspect of a method according to any one of the first to thirty-fourth aspects, the information of the mapping function is signaled at: sequence level in sequence parameter set, or picture level in picture parameter set, or tile group level in tile group parameter set, or in adaptation parameter set, or in supplemental enhancement information (SEI) message.

In a thirty-sixth aspect of a method according to any one of the first to thirty-fifth aspects, the mapping function is expressed as a table as following:

| qPi | <30 | 30 | 31 | 32 | 33 | 34 | 35 | 36 | 37 | 38 | 39 | 40 | 41 | 42 | 43 | >43 |
|---|---|---|---|---|---|---|---|---|---|---|---|---|---|---|---|---|
| QpC | = qPi | 29 | 30 | 31 | 32 | 33 | 34 | 35 | 36 | 37 | 37 | 38 | 39 | 40 | 40 | = qPi − 3 |

In a thirty-seventh aspect of a method according to any one of the first to thirty-seventh aspects, the mapping function is expressed as a table as following:

| qPi | <35 | 35 | 36 | 37 | 38 | 39 | 40 | 41 | 42 | 43 | >43 |
|---|---|---|---|---|---|---|---|---|---|---|---|
| $Qp_C$ | = qPi | 34 | 35 | 36 | 37 | 37 | 38 | 39 | 40 | 40 | = qPi − 3 |

In a thirty-eighth aspect of a method according to any one of the first to thirty-sixth aspects, the information of the mapping function is signaled in the bitstream directly or indirectly.

A thirty-ninth aspect of a decoder (30) includes processing circuitry for carrying out the method according to any one of the first to thirty-eighth aspects.

A fortieth aspect of a computer program product includes a program code for performing the method according to any one of the first to thirty-eighth aspects.

A forty-first aspect of a decoder, includes: one or more processors; and a non-transitory computer-readable storage medium coupled to the processors and storing programming for execution by the processors, where the programming, when executed by the processors, configures the decoder to carry out the method according to any one of the first to thirty-eighth aspects.

The invention claimed is:
1. A method of obtaining a chrominance quantization parameter (QP) for chrominance components based on a luminance QP for a luminance component, wherein the method is performed by a decoder comprising one or more processors, the method comprising:
receiving a bitstream;
parsing the bitstream to obtain both a luminance QP and information of at least one chroma QP mapping table which associates a QP index (QPi) to a chrominance QP (QPc), wherein the luminance QP and the information of the at least one chroma QP mapping table are different from each other;
obtaining a QPi based at least in a part on the luminance QP;
obtaining at least one chroma QP mapping table based on the information of the at least one chroma QP mapping table;
obtaining a first QPc based on the at least one chroma QP mapping table and the QPi, wherein the first QPc corresponds to a Cb component and a Cr component, and wherein:
when the information of the at least one chroma QP mapping table signals the Cb component and the Cr component separately, using two chroma QP mapping tables that are different from each other to obtain the Cb component and the Cr component based on:

$qP_{Chroma}$=Clip3($-QpBd$Offset,63,$QpY$), wherein $Qpy$ is luma quantization parameter;

$qP_{Cb}$=Chroma$Qp$Table[0][$qP_{Chroma}$];

$qP_{Cr}$=Chroma$Qp$Table[1][$qP_{Chroma}$]; and when the information of the at least one chroma QP mapping table signals the Cb component and the Cr component jointly, using one chroma QP mapping table to obtain the Cb component and the Cr component based on $qP_{CbCr}$=Chroma$Qp$Table[2][$qP_{Chroma}$]; and obtaining a second chrominance quantization parameter based on the first QPc.

2. The method of claim 1, wherein
the ChromaQpTable is the at least one chroma QP mapping table;
chroma quantization parameters for the Cb component and the Cr component, $Qp'_{Cb}$ and $Qp'_{Cr}$, and joint Cb-Cr coding $Qp'_{CbCr}$ are derived as follows:

$Qp'_{Cb}$=Clip3($-QpBd$Offset,63,$qP_{Cb}$+pps_cb_qp_offset+slice_cb_qp_offset+$CuQp$ Offset$_{Cb}$)+$QpBd$Offset;

$Qp'_{Cr}$=Clip3($-QpBd$Offset,63,$qP_{Cr}$+pps_cr_qp_offset+slice_cr_qp_offset+$CuQpO$ ffset$_{Cr}$)+$QpBd$Offset;

$Qp'_{CbCr}$=Clip3($-QpBd$Offset,63,$qP_{CbCr}$+pps_joint_cbcr_qp_offset_value+slice_joint_cbcr_qp_offset+CuQpOffset$_{CbCr}$)+$QpBd$Offset;

wherein the QPi corresponds to the $qP_{Chroma}$;
wherein the first QPc corresponds to the $qP_{Cb}$, $qP_{Cr}$ and $qP_{CbCr}$;

wherein the QpBdOffset is a bit depth offset calculated based on a bit depth of samples of luma and chroma arrays using a following formula:

$QpBd$Offset=6*bit_depth_minus8, wherein bit_depth_minus8 is in a range of 0 to 8, inclusive;
wherein pps_cb_qp_offset and pps_cr_qp_offset specify offsets to a luma quantization parameter $Qp'_Y$ used for deriving $Qp'_{Cb}$ and $Qp'_{Cr}$, respectively;
wherein pps_joint_cbcr_qp_offset_value specifies an offset to the luma quantization parameter $Qp'_Y$ used for deriving $Qp'_{CbCr}$;
wherein slice_cr_qp_offset specifies a difference to be added to a value of pps_cr_qp_offset when determining a value of the $Qp'_{Cr}$ quantization parameter;
wherein slice_cb_qp_offset specifies a difference to be added to the value of pps_cb_qp_offset when determining a value of the $Qp'_{Cb}$ quantization parameter;
wherein slice_joint_cbcr_qp_offset specifies a difference to be added to the value of pps_joint_cbcr_qp_offset_value when determining the value of the $Qp'_{CbCr}$; and
wherein variables CuQpOffsetCb, CuQpOffset$_{Cr}$, and CuQpOffset$_{CbCr}$, specify values to be used for determining the respective values of the $Qp'_{Cb}$, $Qp'_{Cr}$, and $Qp'_{CbCr}$ quantization parameters for the decoder.

3. The method of claim 1, wherein the at least one chroma QP mapping table associates each element x of a set X, or any subset of the set X, to one element y of a set Y, wherein the set X corresponds to QPis in an allowed QPi range supported by the decoder, wherein the set Y corresponds to QPcs in an allowed QPc range supported by the decoder.

4. The method of claim 2, wherein values of the at least one chroma QP mapping table satisfy a mapping function $f$.

5. The method of claim 4, wherein the mapping function is a monotonically increasing function.

6. The method of claim 4, wherein the at least one chroma QP mapping table associates each element x of a set X, or any subset of the set X, to one element y of a set Y, wherein the set X corresponds to QPis in an allowed QPi range supported by the decoder, wherein the set Y corresponds to QPcs in an allowed QPc range supported by the decoder, and wherein the set X includes at least one of
a subset A on which the mapping function f is a non-increasing sub-function satisfying: $f(x)-f(x-1)=0$ for any x of the subset A; and
a subset B on which mapping function f is an increasing sub-function satisfying: $f(x)-f(x-1)=c$ for any x of the subset B, wherein c is a natural number not less than 1.

7. The method of claim 6, wherein information of the mapping function comprises one of the following:
information of a size of the subset A (sizeA) and elements $a_i$ of the subset A; and
a size of the subset A.

8. The method of claim 6, wherein the information of elements $a_i$ of the subset A comprises at least one of the following:
direct values of elements $a_i$ of the subset A;
a difference (delta_$a_i$) between a current value of the element $a_i$ and a previous value of the element $a_{i-1}$, and values $a_i$ are obtained as following: $a_i=a_{i-1}$+delta_$a_i$, for any i>0; and
a difference (delta_$a_0$) between a first value $a_0$ and a starting point value, denoted by starting_point_value, wherein the first value $a_0$ of the subset A is obtained based on the difference (delta_$a_0$) as following:

$a_0$=starting_point_value+delta_$a_0$, wherein the starting point value starting_point_value is either signaled in the bitstream or is a predefined value.

9. The method of claim 8, wherein the starting point value starting-point value is one of 0, 21, 30, maxQPi>>1, wherein maxQPi is a maximum QPi value supported by the decoder.

10. The method of claim 4, wherein the mapping function is obtained using a defined functional behavior on subsets A and B as following:
for any input argument x from subset B, the mapping function increases by an integer value equal to or larger than one, and
for any input argument x from subset A, the mapping function is a flat function satisfies $f(x)-f(x-1)=0$;
wherein a first value of the mapping function corresponding to x=0 is 0.

11. The method of claim 6, wherein the information of the mapping function comprises information of values b of the subset B, and the subset A is obtained as A=X-B.

12. The method of claim 6, wherein the subset B includes one or more sub-subsets $B_k$, wherein the sub-subsets $B_k$ include elements x at which the mapping function has same increment $c_k$ as following:

$f(x)-f(x-1)=c_k$, if $x \in B_k$, wherein $c_k$ is a natural number.

13. The method of claim 1, wherein the bitstream comprises an indicator indicating whether to use a predefined chroma QP mapping table or use the at least one chroma QP mapping table signaled in the bitstream.

14. The method of claim 13, wherein the predefined chroma QP mapping table is expressed as follows:

| qPi | <30 | 30 | 31 | 32 | 33 | 34 | 35 | 36 | 37 | 38 | 39 | 40 | 41 | 42 | 43 | >43 |
|---|---|---|---|---|---|---|---|---|---|---|---|---|---|---|---|---|
| QpC | = qPi | 29 | 30 | 31 | 32 | 33 | 34 | 35 | 36 | 37 | 37 | 38 | 39 | 40 | 40 | = qPi − 3 | or

| qPi | <35 | 35 | 36 | 37 | 38 | 39 | 40 | 41 | 42 | 43 | >43 |
|---|---|---|---|---|---|---|---|---|---|---|---|
| $Qp_C$ | = qPi | 34 | 35 | 36 | 37 | 37 | 38 | 39 | 40 | 40 | = qPi − 3 |

15. A decoder, comprising:
one or more processors; and
a non-transitory computer-readable storage medium coupled to the processors and storing programming for execution by the processors, wherein the programming, when executed by the processors, configures the decoder to:
receive a bitstream;
parse the bitstream to obtain both a luminance QP and information of at least one chroma QP mapping table which associates a QP index (QPi) to a chrominance QP (QPc), wherein the luminance QP and the information of the at least one chroma QP mapping table are different from each other;
obtain a QPi based at least in a part on the luminance QP;
obtain at least one chroma QP mapping table based on the information of the at least one chroma QP mapping table;
obtain a first QPc based on the at least one chroma QP mapping table and the QPi, wherein the first QPc corresponds to a Cb component and a Cr component, and wherein:
when the information of the at least one chroma QP mapping table signals the Cb component and the Cr component separately, use two chroma QP mapping tables that are different from each other to obtain the Cb component and the Cr component based on:

$qP$Chroma=Clip3(−$QpBd$Offset,63,$QpY$), wherein $Qpy$ is luma quantization parameter;

$qP_{Cb}$=Chroma$Qp$Table[0][$qP_{Chroma}$], $qP_{Cr}$=Chroma$Qp$Table[1][$qP_{Chroma}$]; and when the information of the at least one chroma QP mapping table signals the Cb component and the Cr component jointly, use one chroma QP mapping table to obtain the Cb component and the Cr component based on qP$_{CbCr}$=Chroma$Qp$Table[2][qP$_{Chroma}$]; and
obtain a second chrominance quantization parameter based on the first QPc.

16. The decoder of claim 15, wherein
the ChromaQpTable is the at least one chroma QP mapping table;
wherein chroma quantization parameters for the Cb component and the Cr component,
Qp'$_{Cb}$ and Qp'$_{Cr}$, and joint Cb-Cr coding Qp'$_{CbCr}$ are derived as follows:

$Qp'_{Cb}$=Clip3(−$QpBd$Offset,63,$qP_{Cb}$+pps_cb_qp_offset+slice_cb_qp_offset+$CuQp$ Offset$_{Cb}$)+$QpBd$-Offset;

$Qp'_{Cr}$=Clip3(−$QpBd$Offset,63,$qP_{Cr}$+pps_cr_qp_offset+slice_cr_qp_offset+$CuQp$Offset$_{Cr}$)+$QpBd$-Offset;

$Qp'_{CbCr}$=Clip3(−$QpBd$Offset,63,$qP_{CbCr}$+pps_joint_cbcr_qp_offset_value+slice_joint_cbcr_qp_offset+$CuQp$Offset$_{CbCr}$)+$QpBd$Offset;

wherein the QPi corresponds to the qP$_{Chroma}$;
wherein the first QPc corresponds to the qP$_{Cb}$, qP$_{Cr}$ and qP$_{CbCr}$;
wherein the QpBdOffset is a bit depth offset calculated based on a bit depth of samples of the luma and chroma arrays using a following formula:

$QpBd$Offset=6*bit_depth_minus8, wherein bit_depth_minus8 is in a range of 0 to 8, inclusive;
wherein pps_cb_qp_offset and pps_cr_qp_offset specify offsets to the luma quantization parameter Qp'$_Y$ used for deriving Qp'$_{Cb}$ and Qp'$_{Cr}$, respectively;
wherein pps_joint_cbcr_qp_offset_value specifies an offset to the luma quantization parameter Qp'$_Y$ used for deriving Qp'$_{CbCr}$;
wherein slice_cr_qp_offset specifies a difference to be added to a value of pps_cr_qp_offset when determining a value of the Qp'$_{Cr}$ quantization parameter;
wherein slice_cb_qp_offset specifies a difference to be added to the value of pps_cb_qp_offset when determining a value of the Qp'$_{Cb}$ quantization parameter;

wherein slice_joint_cbcr_qp_offset specifies a difference to be added to a value of pps_joint_cbcr_qp_offset_value when determining a value of the Qp'$_{CbCr}$; and
wherein variables CuQpOffsetCb, CuQpOffset$_{Cr}$, and CuQpOffset$_{CbCr}$, specify values to be used for determining the respective values of the Qp'$_{Cb}$, Qp'$_{Cr}$, and Qp'$_{CbCr}$ quantization parameters for the decoder.

17. The decoder of claim 15, wherein the at least one chroma QP mapping table associates each element x of a set X, or any subset of the set X, to one element y of a set Y, wherein the set X corresponds to QPis in an allowed QPi range supported by the decoder, wherein the set Y corresponds to QPcs in an allowed QPc range supported by the decoder.

18. The decoder of claim 16, wherein values of the at least one chroma QP mapping table satisfy a mapping function $f$.

19. The decoder of claim 18, wherein the mapping function is a monotonically increasing function.

20. The decoder of claim 18, wherein the at least one chroma QP mapping table associates each element x of a set X, or any subset of the set X, to one element y of a set Y, wherein the set X corresponds to QPis in an allowed QPi range supported by the decoder, wherein the set Y corresponds to QPcs in an allowed QPc range supported by the decoder, and wherein the set X includes at least one of
a subset A on which the mapping function f is a non-increasing sub-function satisfying: $f(x)-f(x-1)=0$ for any x of the subset A; and
a subset B on which mapping function f is an increasing sub-function satisfying: $f(x)-f(x-1)=c$ for any x of the subset B, wherein c is a natural number not less than 1.

21. The decoder of claim 20, wherein the information of the mapping function comprises one of the following:
information of a size of the subset A (sizeA) and elements $a_i$ of the subset A; and
a size of the subset A.

22. The decoder of claim 20, wherein information of elements $a_i$ of the subset A comprises at least one of the following:
direct values of elements $a_i$ of the subset A;
a difference (delta_$a_i$) between a current value of the element $a_i$ and a previous value of the element $a_{i-1}$, and values $a_i$ are obtained as following: $a_i=a_{i-1}+\text{delta\_}a_i$, for any i>0; and
a difference (delta_$a_0$) between a first value $a_0$ and a starting point value, denoted by starting_point_value, wherein the first value $a_0$ of the subset A is obtained based on the difference (delta_$a_0$) as following: $a_0=\text{starting\_point\_value}+\text{delta\_}a_0$, wherein the starting point value starting_point_value is either signaled in the bitstream or is a predefined value.

23. The decoder of claim 22, wherein the starting point value starting_point_value is one of 0, 21, 30, maxQPi>>1, wherein maxQPi is a maximum QPi value supported by the decoder.

24. The decoder of claim 18, wherein the mapping function is obtained using a defined functional behavior on subsets A and B as following:
for any input argument x from subset B, the mapping function increases by an integer value equal to or larger than one, and for any input argument x from subset A, the mapping function is a flat function satisfies $f(x)-f(x-1)=0$;
wherein a first value of the mapping function corresponding to x=0 is 0.

25. The decoder of claim 20, wherein the information of the mapping function comprises information of values b of the subset B, and the subset A is obtained as A=X-B.

26. The decoder of claim 20, wherein the subset B includes one or more sub-subsets $B_k$, wherein the sub-subsets $B_k$ include elements x at which the mapping function has same increment $c_k$ as following:

$f(x)-f(x-1)=c_k$, if $x \in B_k$, wherein $c_k$ is a natural number.

27. The decoder of claim 15, wherein the bitstream comprises an indicator indicating whether to use a predefined chroma QP mapping table or use the at least one chroma QP mapping table signaled in the bitstream.

28. The decoder of claim 27, wherein the predefined chroma QP mapping table is expressed as follows:

| qPi | <30 | 30 | 31 | 32 | 33 | 34 | 35 | 36 | 37 | 38 | 39 | 40 | 41 | 42 | 43 | >43 |
|---|---|---|---|---|---|---|---|---|---|---|---|---|---|---|---|---|
| QpC | = qPi | 29 | 30 | 31 | 32 | 33 | 34 | 35 | 36 | 37 | 37 | 38 | 39 | 40 | 40 | = qPi − 3 | or

| qPi | <35 | 35 | 36 | 37 | 38 | 39 | 40 | 41 | 42 | 43 | >43 |
|---|---|---|---|---|---|---|---|---|---|---|---|
| Qp$_C$ | = qPi | 34 | 35 | 36 | 37 | 37 | 38 | 39 | 40 | 40 | = qPi − 3 |

29. A non-transitory computer-readable storage medium storing computer instructions, that when executed by one or more processors, cause the one or more processors to:
receive a bitstream;
parse the bitstream to obtain both a luminance QP and information of at least one chroma QP mapping table which associates a QP index (QPi) to a chrominance QP (QPc), wherein the luminance QP and the information of the at least one chroma QP mapping table are different from each other;
obtain a QPi based at least in a part on the luminance QP;
obtain at least one chroma QP mapping table based on the information of a chroma QP mapping table;
obtain a first QPc based on the at least one chroma QP mapping table and the QPi, wherein the first QPc corresponds to a Cb component and a Cr component, and wherein:
when the information of the at least one chroma QP mapping table signals the Cb component and the Cr component separately, use two chroma QP mapping tables that are different from each other to obtain the Cb component and the Cr component based on:

$qP_{Chroma}=\text{Clip3}(-QpBd\text{Offset},63,Qp_Y)$, wherein $Qp_Y$ is luma quantization parameter;

$qP_{Cb}=\text{Chroma}Qp\text{Table}[0][qPChroma]$;

$qP_{Cr}=\text{Chroma}Qp\text{Table}[1][qP_{Chroma}]$; and when the information of the at least one chroma QP mapping table signals the Cb component and the Cr component jointly, use one chroma QP mapping table to obtain the Cb component and the Cr component based on $qP_{CbCr}$=ChromaQpTable[2][$qP_{Chroma}$]; and obtain a second chrominance quantization parameter based on the first QPc.

* * * * *

UNITED STATES PATENT AND TRADEMARK OFFICE
CERTIFICATE OF CORRECTION

PATENT NO. : 12,160,578 B2
APPLICATION NO. : 17/509324
DATED : December 3, 2024
INVENTOR(S) : Sergey Yurievich Ikonin et al.

Page 1 of 1

It is certified that error appears in the above-identified patent and that said Letters Patent is hereby corrected as shown below:

On the Title Page

Item (30) Foreign Application Priority data should list one PCT application --PCT/RU2019/000444--.

In the Claims

In Column 78, Claim 7, Line 54, delete "$a_i$of the subset A" and insert --$a_i$ of the subset A--.

Column 78, Claim 8, Line 54, delete "$a_i$of the subset A" and insert --$a_i$ of the subset A--.

Column 78, Claim 8, Line 59, delete "$a_i$of the subset A" and insert --$a_i$ of the subset A--.

Column 81, Claim 21, Line 41, delete "$a_i$of the subset A" and insert --$a_i$ of the subset A--.

Column 81, Claim 22, Line 44, delete "$a_i$of the subset A" and insert --$a_i$ of the subset A--.

Signed and Sealed this
Fifteenth Day of April, 2025

Coke Morgan Stewart
*Acting Director of the United States Patent and Trademark Office*